US012065939B2

(12) United States Patent
Saenz

(10) Patent No.: US 12,065,939 B2
(45) **Date of Patent: *Aug. 20, 2024**

(54) CLEANING METHOD FOR JET ENGINE

(71) Applicant: AeroCore Technologies LLC, Indianapolis, IN (US)

(72) Inventor: Jorge Ivan Saenz, Indianapolis, IN (US)

(73) Assignee: AeroCore Technologies LLC, Lebanon, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/862,393

(22) Filed: Jul. 11, 2022

(65) Prior Publication Data

US 2023/0003139 A1 Jan. 5, 2023

Related U.S. Application Data

(63) Continuation of application No. 16/173,690, filed on Oct. 29, 2018, now Pat. No. 11,643,946, which is a (Continued)

(51) Int. Cl.
*B08B 3/02* (2006.01)
*B08B 3/10* (2006.01)
*F01D 25/00* (2006.01)

(52) U.S. Cl.
CPC .............. *F01D 25/002* (2013.01); *B08B 3/10* (2013.01); *F05D 2220/323* (2013.01); *F05D 2260/80* (2013.01)

(58) Field of Classification Search
None
See application file for complete search history.

(56) References Cited

U.S. PATENT DOCUMENTS 2,715,045 A 8/1955 Thompson
2,765,048 A * 10/1956 Hersey, Jr. ......... B01D 46/2403 55/294

(Continued)

FOREIGN PATENT DOCUMENTS

CN 201578144 9/2010
JP S55058252 4/1980

(Continued)

OTHER PUBLICATIONS

KR 10-2016-7011615, KIPO, Office Action, 3 pgs. Dec. 18, 2020.

(Continued)

*Primary Examiner* — Eric W Golightly
(74) *Attorney, Agent, or Firm* — John V. Daniluck; Gerald W. Roberts; Dentons Bingham Greenebaum LLP

(57) ABSTRACT

Turbines and associated equipment are normally cleaned via water or chemical pressure washing via a mist, spray systems. However, these systems fail to reach deep across the gas path to remove fouling materials. Various embodiments herein pertain to apparatus and methods that utilize the water and exiting chemicals to generate a foam. The foam can be introduced at that gas-path entrance of the equipment, where it contacts the stages and internal surfaces. In one embodiment, the method can include: forming a first foam with a liquid cleaning agent and pressurized gas; flowing the first foam over a member or matrix and increasing the size of the cells of the first foam to form a second foam; and flowing the second foam through a structure such as a mesh or one or more apertured plates and decreasing the size of the cells of the second foam to form a third foam.

18 Claims, 58 Drawing Sheets

Related U.S. Application Data continuation of application No. 15/026,512, filed as application No. PCT/US2014/058865 on Oct. 2, 2014, now Pat. No. 10,364,699.

(60) Provisional application No. 61/900,749, filed on Nov. 6, 2013, provisional application No. 61/885,777, filed on Oct. 2, 2013.

(56) References Cited

U.S. PATENT DOCUMENTS

| | | | | |
|---|---|---|---|---|
| 3,388,868 | A | 6/1968 | Watson et al. | |
| 8,322,633 | B2 * | 12/2012 | Hubert .................. | A62C 31/12 239/432 |
| 2007/0158467 | A1 | 7/2007 | Knowles | |
| 2013/0087175 | A1 | 4/2013 | Petter | |

FOREIGN PATENT DOCUMENTS

| | | |
|---|---|---|
| JP | S6190727 | 5/1986 |
| JP | H0723876 | 1/1995 |
| JP | 2004308616 | 11/2004 |
| JP | 2011179508 | 9/2011 |
| JP | 2011529155 | 12/2011 |
| WO | 9305224 | 3/1993 |

OTHER PUBLICATIONS

EP 22193022.5, EPO, Extended Search Report and Search Opinion, 9 pgs Jan. 4, 2023.
JP Appln. 2022-098559, Office Action, 6 pgs Jun. 23, 2023.
IN Appln. 202218006207, First Examination Report, 8 pgs Feb. 17, 2023.
CIPO, CA 3167660, Filing Receipt, 2pgs Aug. 11, 2022.

* cited by examiner

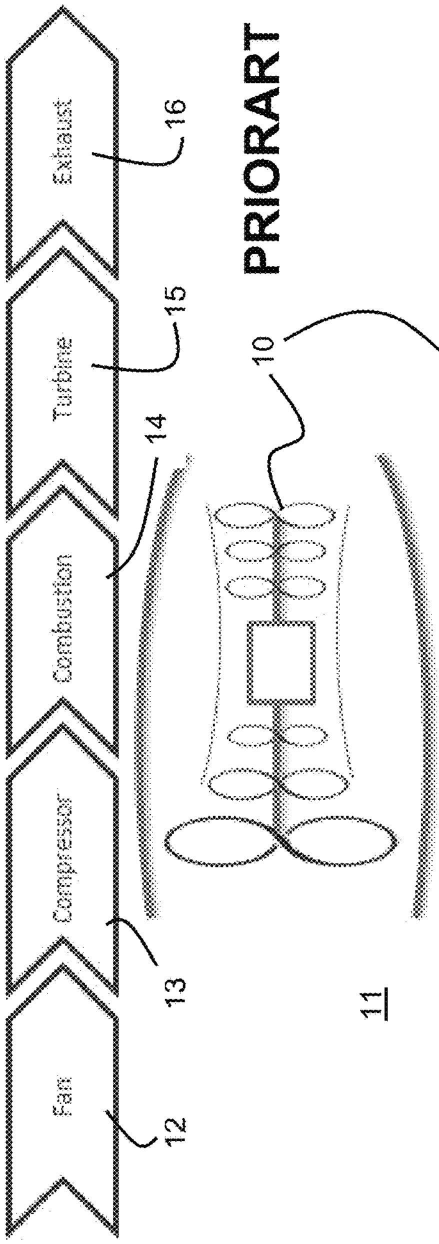
PRIORART
FIG.1

CLEANING METHOD FOR JET ENGINE

CROSS REFERENCE TO RELATED APPLICATION

This application is a continuation of U.S. patent application Ser. No. 16/173,690, filed Oct. 29, 2018, now issued as U.S. Pat. No. 11,643,946 which is a continuation of U.S. patent application Ser. No. 15/026,512, filed Mar. 31, 2016, now issued as U.S. Pat. No. 10,364,699, which is a 35 U.S.C. § 371 national-stage filing of International Patent Application PCT/US2014/058865, filed Oct. 2, 2014, which claims the benefit of priority to U.S. Provisional Patent Application No. 61/900,749, filed Nov. 6, 2013, and which claims the benefit of priority to U.S. Provisional Patent Application No. 61/885,777, filed Oct. 2, 2013, all of which are incorporated herein by reference.

FIELD OF THE INVENTION

Various embodiments of the present invention pertain to apparatus and methods for cleaning devices that include the gas path including a combustion chamber, and in particular to apparatus and methods for cleaning of a gas turbine engine.

BACKGROUND

Turbine engines extract energy to supply power across a wide range of platforms. Energy can range from steam to fuel combustion. Extracted power is then utilized for electricity, propulsion, or general power. Turbines work by turning the flow of fluids and gases into usable energy to power helicopters, airplanes, tanks, power plants, ships, specialty vehicles, cities, etc. Upon use, the gas-path of such devices becomes fouled with debris and contaminants such as minerals, sand, dust, soot, carbon, etc. When fouled, the performance of the equipment deteriorates, requiring maintenance and cleaning.

It is well known that turbines come in many forms such as jet engines, industrial turbines, or ground-based and ship-based aero-derived units. The internal surfaces of the equipment, such as that of an airplane or helicopter engine, accumulate fouling material, deteriorating airflow across the engine, and diminishing performance. Correlated to this trend, fuel consumption increases, engine life shortens, and power available decreases. The simplest means and most cost effective means to maintain engine health and restore performance is to properly clean an engine. There are many methods available, such as mist, sprays, and vapor systems. However, all fail to reach deep or across the entire engine gas-path.

Telemetry or diagnostic tools on engine have become routine functions to monitor engine health. Yet, using such tools to monitor, trigger, or quantify improvement from foam engine cleaning have not been utilized in the past.

Various embodiments of the present invention provide novel and unobvious methods and apparatus for the cleaning of such power plants.

SUMMARY OF THE INVENTION

Foam material is introduced at the gas-path entry of turbine equipment while off-line. The foam will coat and contact the internal surfaces, scrubbing, removing, and carrying fouling material away from equipment.

One aspect of the present invention pertains to an apparatus for foaming a cleaning agent. Some embodiments include a housing defining an internal flowpath having first, second, and third flow portions, a gas inlet, a liquid inlet for the cleaning agent, and a foam outlet. The first flow portion includes a gas plenum that is adapted and configured for receiving gas under pressure from the gas inlet and including a plurality of apertures, the plenum and the interior of the housing forming a mixing region that provides a first foam of the liquid and the gas. The second flow portion receives the first foam and flows the first foam past a foam growth matrix adapted and configured to provide surface area for attachment and merging of the cells. The third flow portion flows the second foam through a foam structuring member downstream of either the first portion or the second portion adapted and configured to reduce the size of at least some of the cells. It is understood that yet other embodiments of the present invention contemplate a housing having only a first portion; or a first and second portion; or only a first and third portion in various other nucleation devices.

Another aspect of the present invention pertains to a method for foaming a liquid cleaning agent. Some embodiments include mixing the liquid cleaning agent and a pressurized gas to form a first foam. Other embodiments include flowing the first foam over a member or matrix and increasing the size of the cells of the first foam to form a second foam. Yet other embodiments include flowing the second foam through a structure such as a mesh or one or more apertured plates and decreasing the size of the cells of the second foam to form a third foam.

Yet another aspect of the present invention pertains to a system for providing an air-foamed liquid cleaning agent. Other embodiments include an air pump or pressurized gas reservoir providing air or gas at pressure higher than ambient pressure, and a liquid pump providing the liquid at pressure. Still other embodiments include a nucleation device receiving pressurized air, a liquid inlet receiving pressurized liquid, and a foam outlet, the nucleation device turbulently mixing the pressurized air and the liquid to create a foam. Yet other embodiments include a nozzle receiving the foam through a foam conduit, the internal passageways of the nozzle and the conduit being adapted and configured to not increase the turbulence of the foam, the nozzle being adapted and configured to deliver a low velocity stream of foam.

Still another aspect pertains to a method for providing an air-foamed liquid cleaning agent to the inlet of a jet engine installed on an airplane. Some embodiments include providing a source of a pressurized liquid cleaning agent, an air pump, a turbulent mixing chamber, and a non-atomizing supply aperture. Other embodiments include mixing pressurized air with pressurized liquid in the mixing chamber and creating a supply of foam. Still other embodiments include streaming the supply of foam into the installed engine either through the inlet or through various tubing attached to the engine from the aperture.

Yet another aspect of the present invention pertains to an apparatus for foaming a water soluble liquid cleaning agent. Some embodiments include means for mixing a pressurized gas with a flowing water soluble liquid to create a foam. Other embodiments include means for growing the size of the cells of the foam and means for reducing the size of the grown cells.

In various embodiments of the invention, the effluent after a cleaning operation is collected and evaluated. This evaluation can include an on-site analysis of the content of the effluent, including whether or not particular metals or compounds are present in the effluent. Based on the results of this evaluation, a decision is made as to whether or not further cleaning is appropriate.

Still further embodiments of the present invention pertain to a method in which the effect of a cleaning operation is assessed, and that assessment is used to evaluate the terms of a contract. As one example, the contract may pertain to the terms of the engine warranty provided by the engine manufacturer to the operator or owner of the aircraft. In still further embodiments the assessment may be used to evaluate the terms of a contract pertaining to the engine cleaning operation itself. In yet further embodiments the assessment of the cleaning effect on the engine may be used to evaluate the engine relative to establish FAA maintenance standards for that engine.

In one embodiment, the assessment method includes operating an engine in a commercial flight environment for more than about one month. It is anticipated that in some embodiments this operation can include multiple flights per day, and usage of the aircraft for up to seven days per week. The method further includes operating the used engine and establishing a baseline characteristic. In some embodiments, the baseline characteristic can be specific fuel consumption at a particular level of thrust, exhaust pressure ratio, or rotor speed. In some alternatives, the method includes correcting this baseline data for ambient atmospheric characteristics. In yet other embodiments, the baseline parameter could be the elapsed time for the start of an engine from zero rpm up to idle speed. In still further embodiments, the baseline assessment of the used engine includes the assessment of engine start time in the following manner: performing a first start of an engine; shutting down the engine; motoring the engine on the starter (without the combustion of fuel) for a predetermined period of time; and after the motoring, performing a second engine start, and using the second engine start time as the baseline start time.

The method further includes cleaning the engine. This cleaning of the engine may include one or more successive cleaning cycles. After the engine is cleaned, the baseline test method is repeated. This second test results (of the cleaned engine) are compared to the baseline test results (of the used engine, as received); and the changes in engine characteristics are assessed against a contractual guarantee. As one example, the operator of the cleaning equipment may have offered contractual terms to the owner or operator of the aircraft with regards to the improvement to be made by the cleaning method. In still further embodiments, the delta improvement provided by the cleaning method (or alternatively, the test results of the cleaned engine considered by itself) can be compared to a contractual guarantee between the manufacturer of the engine (or the facility that performed the previous overhaul of the engine, or the licensee of the engine) to assess whether or not the cleaned engine meets those contractual terms.

In still further embodiments, there is a cleaning method in which a baseline test is performed on a used engine; the engine is cleaned; and the baseline test is performed a second time. The comparison of the baseline test to the clean engine test can be used for any reason.

In yet other embodiments, the cleaning method includes a procedure in which the engine is operated in a cleaning cycle, and that cleaning cycle (or a different cleaning cycle), is subsequently applied to the engine. Preferably, the cleaning chemicals are provided to the engine at relatively low rotational speeds, and preferably less than about one-half the typical idle speed for that engine.

In still further embodiments, such as in those engines supported substantially vertically, the cleaning chemical can be applied to the engine when the engine is static (i.e., zero rpm). After applying a sufficient amount of chemicals, the engine can then be rotated at any speed, and the cleaning chemicals subsequently flushed.

Yet other embodiments of the present invention pertain to methods for cleaning an engine that include manipulation of the temperature of the cleaning chemicals and/or manipulation of the temperature of the engine that is being cleaned. In one embodiment, the cleaning system includes a heater that is adapted and configured to heat the cleaning chemicals prior to the creation of a cleaning foam. In still further embodiments, the method includes a heater for heating the air being used to create the foam with the cleaning liquids. In still further embodiments, the cleaning apparatus includes one or more air blowers that provide a source of heated ambient air (similar to "alligator" space heaters used at construction sites). These hot air blowers can be positioned at the inlet of the engine, and the engine can be motored (i.e., rotated on the starter, without combustion of fuel) for either a predetermined period of time (which may be based on ambient conditions), or motored until thermocouples or other temperature measurement devices in the engine hot section have reached a predetermined temperature. In still further embodiments, the temperature of the engine prior to the introduction of the cleaning foam can be raised by starting the engine and operating the engine at idle conditions for a predetermined period of time, and subsequently shut down the engine prior to introduction of the cleaning foam. In still further embodiments, the engine can be motored after the shutdown from idle and before the introduction of chemicals to further achieve a consistent baseline temperature condition prior to introduction of the foam. Still further embodiments of the present invention contemplate any combination of preheated liquid chemicals, preheated compressed air used for foaming, externally heated engines, and engines made "warm" by one or more recent periods of operation.

In still further embodiments of the present invention, the cleaning foam can be heated by providing a heating element within the device used to mix and create the cleaning foam.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

FIG. 1 is a schematic representation of a gas turbine engine.

FIGS. 16A-16R are cutaway schematic representations of a nucleation chamber according to various embodiments of the present invention.

FIGS. 16L-16R present various schematic representations of a nucleation chamber according to one embodiment of the present invention. FIG. 16L is the cross sectional view AA of a nucleation chamber 1260.

FIG. 16M is an end view of the nucleation chamber 1260, as if viewed from 16M-16M of FIG. 16L.

FIG. 16N is a close-up of a portion of the apparatus of FIG. 16L.

FIGS. 16O, 16P, 16Q and 16R are close-up schematic representations of portions of the apparatus of FIG. 16L.

ELEMENT NUMBERING

Figure 2:
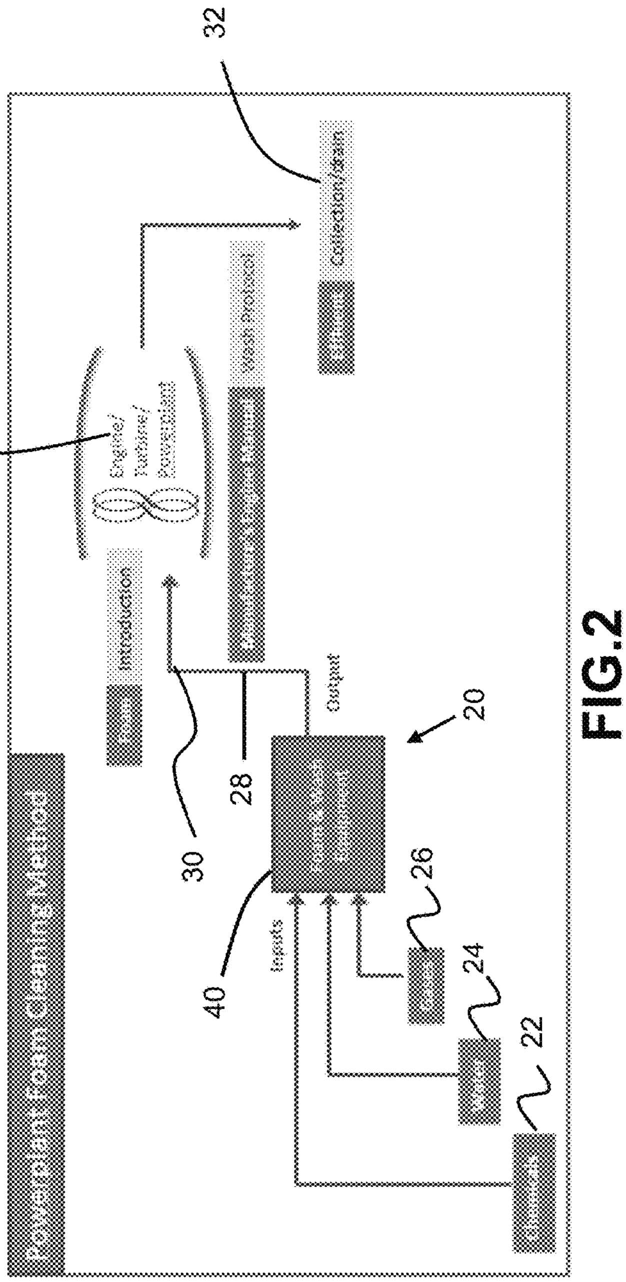
FIG. 2 is a schematic representation of a cleaning apparatus according to one embodiment of the present invention.

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety.

| | |
|---|---|
| 10 | engine |
| 11 | inlet |
| 12 | fan |
| 13 | compressor |
| 14 | combustor |
| 15 | turbine |

-continued

| | |
|---|---|
| 16 | exhaust |
| 20 | washing system |
| 21 | vehicle |
| 22 | source of chemicals |
| 23 | boom |
| 24 | source of water |
| 25 | source of water |
| 26 | source of gas (compressed air) |
| 28 | foam output |
| 30 | nozzle |
| 32 | effluent collector |
| 32.1 | trailer |
| 32.2 | effluent pool |
| 32.3 | exhaust collector |
| 32.31 | enclosure, sheet |
| 32.32 | ribs |
| 32.33 | vertical support |
| 32.34 | inlet |
| 32.35 | drain |
| 32.4 | inlet collector |
| 32.41 | sheet, concave |
| 32.42 | ribs |
| 32.43 | vertical support |
| 33 | housing |
| 34 | support |
| 35 | reservoir |
| 36 | outlet |
| 37 | containment wall |
| 38 | heater |
| 40 | foaming system |
| 41 | foam connection |
| 42 | cabinet |
| 43 | tubing |
| 44 | flow meters; peristaltic pumps |
| 46 | pressure gauges |
| 48 | pressure regulators |
| 50 | pump and motor |
| 60 | nucleation chamber; means for foaming a cleaning agent |
| 61 | housing |
| 62 | gas inlet |
| 63 | liquid inlet |
| 64 | outlet |
| 65 | mixing or nucleation section; means for mixing a liquid and gas |
| 66 | gas tube or sleeve; gas chamber or plenum |
| 68 | central passage |
| 70 | nucleation jets or perforations |
| 71 | angle of attack |
| 72 | nucleation zones |
| 74 | growth section; means for increasing the quantity and/or size of a foam cell |
| 75 | material |
| 78 | cell structuring section; means for homogenizing a foam |
| 79 | material |
| 80 | processing unit (recycle, purify) |
| 82 | laminar flow section; means for reducing turbulence in a foam |
| 84 | motor |
| 86 | impeller |
| 90 | aircraft |

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention.

It is understood that any reference to “the invention” is a reference to an embodiment of a family of inventions, with no single embodiment including an apparatus, process, or composition that should be included in all embodiments, unless otherwise explicitly stated. Further, although there may be discussion with regards to “advantages” provided by some embodiments of the present invention, it is understood that yet other embodiments may not include those same advantages, or may include yet different advantages. Any advantages described herein are not to be construed as limiting to any of the claims. The usage of words indicating preference, such as “preferably,” refers to features and aspects that are present in at least one embodiment, but which are optional for some embodiments.

The use of an N-series prefix for an element number (NXX.XX) refers to an element that is the same as the non-prefixed element (XX.XX), except as shown and described. As an example, an element 1020.1 would be the same as element 20.1, except for those different features of element 1020.1 shown and described. Further, common elements and common features of related elements may be drawn in the same manner in different figures, and/or use the same symbology in different figures. As such, it is not necessary to describe the features of 1020.1 and 20.1 that are the same, since these common features are apparent to a person of ordinary skill in the related field of technology. Further, it is understood that the features 1020.1 and 20.1 may be backward compatible, such that a feature (NXX.XX) may include features compatible with other various embodiments (MXX.XX), as would be understood by those of ordinary skill in the art. This description convention also applies to the use of prime ('), double prime ("), and triple prime (''') suffixed element numbers. Therefore, it is not necessary to describe the features of 20.1, 20.1', 20.1", and 20.1''' that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word “about” prefaced each quantity. Further, with discussion pertaining to a specific composition of matter, that description is by example only, and does not limit the applicability of other species of that composition, nor does it limit the applicability of other compositions unrelated to the cited composition.

What follows are paragraphs that express particular embodiments of the present invention. In those paragraphs that follow, some element numbers are prefixed with an “X” indicating that the words pertain to any of the similar features shown in the drawings or described in the text.

What will be shown and described herein, along with various embodiments of the present invention, is discussion of one or more tests that were performed. It is understood that such examples are by way of example only, and are not to be construed as being limitations on any embodiment of the present invention. Further, it is understood that embodiments of the present invention are not necessarily limited to or described by the mathematical analysis presented herein.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

Various references may be made to one or more methods of manufacturing. It is understood that these are by way of example only, and various embodiments of the invention can be fabricated in a wide variety of ways, such as by casting, centering, welding, electrodischarge machining, milling, as examples. Further, various other embodiment may be fabricated by any of the various additive manufacturing methods, some of which are referred to 3-D printing.

This document may use different words to describe the same element number, or to refer to an element number in a specific family of features (NXX.XX). It is understood that such multiple usage is not intended to provide a redefinition of any language herein. It is understood that such words demonstrate that the particular feature can be considered in various linguistical ways, such ways not necessarily being additive or exclusive.

What will be shown and described herein are one or more functional relationships among variables. Specific nomenclature for the variables may be provided, although some relationships may include variables that will be recognized by persons of ordinary skill in the art for their meaning. For example, "t" could be representative of temperature or time, as would be readily apparent by their usage. However, it is further recognized that such functional relationships can be expressed in a variety of equivalents using standard techniques of mathematical analysis (for instance, the relationship F=ma is equivalent to the relationship F/a=m). Further, in those embodiments in which functional relationships are implemented in an algorithm or computer software, it is understood that an algorithm-implemented variable can correspond to a variable shown herein, with this correspondence including a scaling factor, control system gain, noise filter, or the like.

A wide variety of methods have been used to clean gas turbine engines. Some users utilize water sprayed into the inlet of the engine, others utilize a cleaning fluid sprayed into the inlet of the engine, and still further users provide solid, abrading material to the inlet of the engine, such as walnut shells.

These methods achieve varying degrees of success, and further create varying degrees of problems. For example, some cleaning agents that are strong enough to clean the hot section of the engine and are chemically acceptable on hot section materials, are chemically unacceptable on material used in the cold section of the engine. Water washes are mild enough to be used on any materials in the engine, but are also not particularly effective in removing difficult deposits, and still further can leave deposits of silica in some stages of the compressor. A number of water-soluble cleaning agents are recognized in MIL-PRF-85704C, but many users of these cleaning agents consider them to be marginally successful in restoring performance to an engine operating parameter, and still other users have noted that simple washes with these MIL cleaning agents can actually degrade some operational parameters.

Therefore, many operators of aircraft are suspicious of the claims made with regards to some liquid cleaning methods, as to how effective liquids will be in restoring performance to the engine. There are expenses incurred by liquid washing of an engine, including the cost of the liquid wash and the value of the time that the air vehicle is removed from operation. Often, the benefits of the liquid wash do not outweigh the incurred costs, or provide only negligible commercial benefit.

Various embodiments of the present invention indicate a substantial commercial benefit to be gained by washing of gas turbine engines with a foam. As will be shown herein, the foam cleaning of an engine can provide substantial improvements in operating parameters, including improvements not obtainable with liquid washing. The reason for the substantial improvement realized by foam washing is not fully understood. Back-to-back engine tests have been performed on the same specific engine, with the introduction of atomized liquid into the inlet, followed by the introduction of a foam of that same liquid into the inlet. In all cases, the liquid (or the foam) was observed in the engine exhaust section, indicating that the liquid (or the foam) appears to be wetting the entire gaspath. Nonetheless, the use of a foamed version of a liquid provides significant improvements over and above any liquid washing improvements in important operational parameters, such as engine start times, specific fuel consumption, and turbine temperatures required to achieve a particular power output.

Some embodiments of the present invention pertain to a system for generating a foam from a water-soluble cleaning agent. It has been found that there are differences in the apparatus and methods of creating an acceptable foam with a water-soluble chemical, or a non-water-soluble chemical. Various embodiments of the present invention pertain to systems including nucleation chambers provided with pressurized liquid and also pressurized air.

It has been found that injecting this foam into an engine inlet by way of conditional atomizing nozzles can reduce the cleaning effectiveness of the foam. Still further, any plumbing, tubing, or hoses that deliver foam from the nucleation chamber to the nozzle should be generally smooth, and substantially free of turbulence-generating features in the flowpath (such as sharp turns, sudden reductions in flow area of the foam flowpath, or delivery nozzles having sections with excessive convergence, such as convergence to increase the velocity of the foam).

It is helpful in various embodiments of the present invention to provide a flowpath for the generated foam that maintains the higher energy state of the foam, and not dissipate that energy prior to delivery. FIG. 3B shows foam being delivered according to one embodiment of the present invention. It can be seen that nozzle 30 provides a stream of foam that is of substantially the same diameter. There is little or no convergence apparent in the photo of FIG. 3B, and no divergence of the flow stream. Further, the ripples or "lumps" in the foam flow stream are indicative of a low velocity delivery system, wherein the disturbance imparted to the foam stream when it impacts the spinner visibly passes upstream toward the nozzle. The amplitude of the "lumps" in the foam flowpath can be seen to be of highest magnitude near the impact of the foam with the spinner, and of lesser magnitude in a direction toward the exit nozzle 30. The foam exiting nozzle 30 is of a substantially constant diameter, and preferably at a velocity less than about fifteen feet per second.

Various embodiments of the present invention also are assisted by the introduction of gas (including air, nitrogen, carbon dioxide, or any other gas) in a pressurized state into a flow of the cleaning liquid. Preferably, air is pressurized to more than about 5 psig and less than about 120 psig, and supplied by a pump or pressurized reservoir. Although some embodiments of the present invention do include the use of airflow eductors that can entrain ambient air, yet other embodiments using pressurized air had been found to provide improved results.

Yet other embodiments of the present invention pertain to the commercial use of foam cleaning with aviation engines. As discussed earlier, the mechanism by which a foamed cleaning agent provides results superior to a non-foamed cleaning agent are not currently well understood. To the converse, many experts in the field of jet engine maintenance initially believe that a foamed cleaning agent will provide the same disappointing results as would be provided by a non-foamed cleaning agent. Therefore, as the use of a foam cleaning agent becomes better understood, the effect of the improved foam cleaning on the financial considerations in supporting a family of engines will become better understood. Some of these improvements may be readily apparent, such as the improvements in operating temperature, specific fuel consumption, and start times indicated by the testing documented herein. Yet other impacts from the use of foam cleaning agents may further impact the design of other, life-limited components in the engine.

For example, engines are currently designed with life-limited parts (such as those based on hours of usage, time at temperature, number of engine cycles, or others), and inspections of those components may be scheduled at times coincident with liquid washing of the engine. However, the use of foam washing may generally increase the time that an engine can be installed on the aircraft, since the foam washing will restore the used engine to a better performance level than liquid washing would. However, an increase in time between foam washings (increased as compared to the interval between liquid washings) could be lengthened to the extent that a foam washing no longer coincides with an inspection of a life-limited part. Under these conditions, it may be financially rewarding to design the life-limited part to a slightly longer cycle. The increase in the cost of the longer-lived life-limited component may be more than offset by the increased time that the foam cleaned engine can remain on the wing.

In such embodiments, there can be a shift in the paradigm of the engine washing, inspection, and maintenance intervals, resulting at least in part by the improved cleaning resulting from foam washing. In some embodiments, the effect of foam washing on an engine performance parameter (such as start time, temperature at max rated power, specific fuel consumption, carbon emission, oxides of nitrogen emission, typical operating speeds of the engine at cruise and take-off, etc.) can be quantified. That quantification can occur within a family of engines, but in some instances may be applicable between different families. As a specific engine within that family is operated on an aircraft, the operator of the aircraft will note some change in an operating parameter that can be correlated with an improvement to be gained by a foam washing of that specific engine. That information taken by the aircraft operator is passed on to the engine owner (which could be the U.S. government, an engine manufacturer, or an engine leasing company), and that owner determines when to schedule a foam cleaning of that specific engine.

It has been found experimentally that various embodiments of the foam washing methods and apparatus described herein are more effective in removing contaminants from a used engine than by way of spray cleaning of a liquid cleaning agent. In some cases, the effluent collected in the turbine after the foam cleaning has been compared to the effluent collected in the turbine after a liquid wash, with the liquid wash having preceded the foam wash. In these cases, the foam effluent was found to have contained in it substantial amounts of dirt and deposits that were not removed by the liquid wash.

It is believed that in some families of engines the use of a foam wash will provide an improvement in the cleanliness of the combustor liner. It is well known that combustor liners include complex arrangements of cooling holes, these cooling holes being designed to not just maintain a safe temperature for the liner itself, but further to reduce gas path temperatures and thereby limit the formation of oxides of nitrogen. It is anticipated that various embodiments of the present invention will demonstrate reductions in the emission of a cleaned engine of the oxides of nitrogen.

FIGS. 1-4 present various representations of a washing or cleaning system 20 according to one embodiment of the present invention. Although what will be shown and described is a washing system 20 applied to the cleaning of a gas turbine engine, it is understood that various embodiments of the present invention contemplate the cleaning of any object.

FIGS. 1 and 2 schematically represent a system 20 being used to clean a jet engine 10. Engine 10 typically includes a cold section including an inlet 11, a fan 12 and one or more compressors 13. Compressed air is provided to the hot section of engine 10, including the combustor 14, one or more turbines 15, and an exhaust system 16, the latter including as examples simple converging nozzles, noise reducing nozzles (as will be seen in FIG. 5), and cooled nozzles (such as those used with afterburning engines, and including convergent and divergent sections).

FIG. 2 schematically shows a system 20 being used to clean engine 10 with a foam. System 20 typically includes a supply 26 of gas, a supply 24 of water, and a supply 22 of cleaning chemicals, all of which are provided to a foaming system 40. Foaming system 40 accepts these input constituents, and provides an output of foam 28 to a nozzle 30 that provides the foam to the inlet 11 of engine 10. However, yet other embodiments contemplate locating nozzle 30 such that the foam is provided first to compressor section 13, or in some embodiments provided first to yet other components of engine 10. System 20 preferably includes an effluent collector 32 placed aft of the exhaust 16 of engine 10, so as to collect within it the spent foam, chemicals, water, and particulate matter removed from engine 10.

Figure 3A:
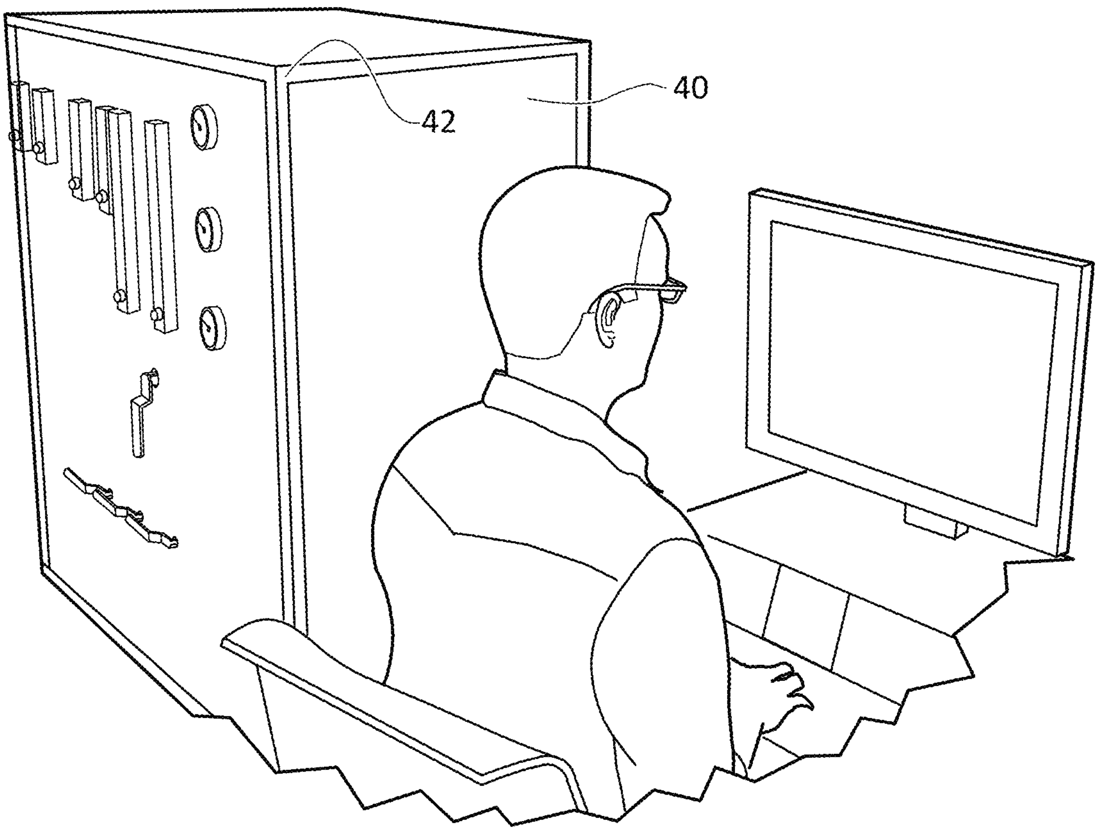
FIG. 3A is a line drawing of a photographic representation of some of the apparatus of FIG. 2.
Figure 3B:
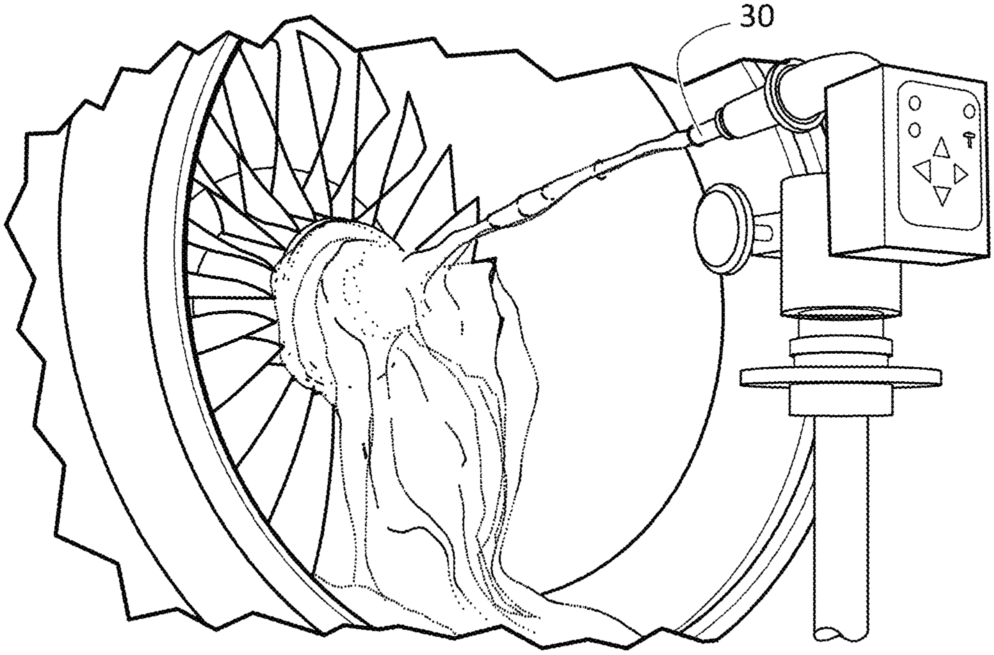
FIG. 3B is a line drawing of a photographic representation of some of the apparatus of FIG. 2, shown providing foam into the inlet of an installed engine.

FIGS. 3A and 3B depict a washing system 20 during operation. In one embodiment, the foaming system 40 is provided within a cabinet 42. Cabinet 42 preferably includes various equipment that is used to create foam 28, including the nucleation chamber, pumps, and various valves and plumbing (which will be shown and described with reference to FIG. 14). Cabinet 42 preferably includes a variety of flow meters or peristaltic pumps 44, pressure gauges 46, and pressure regulators 48 (which will be described with reference to FIGS. 11-13).

Figure 4:
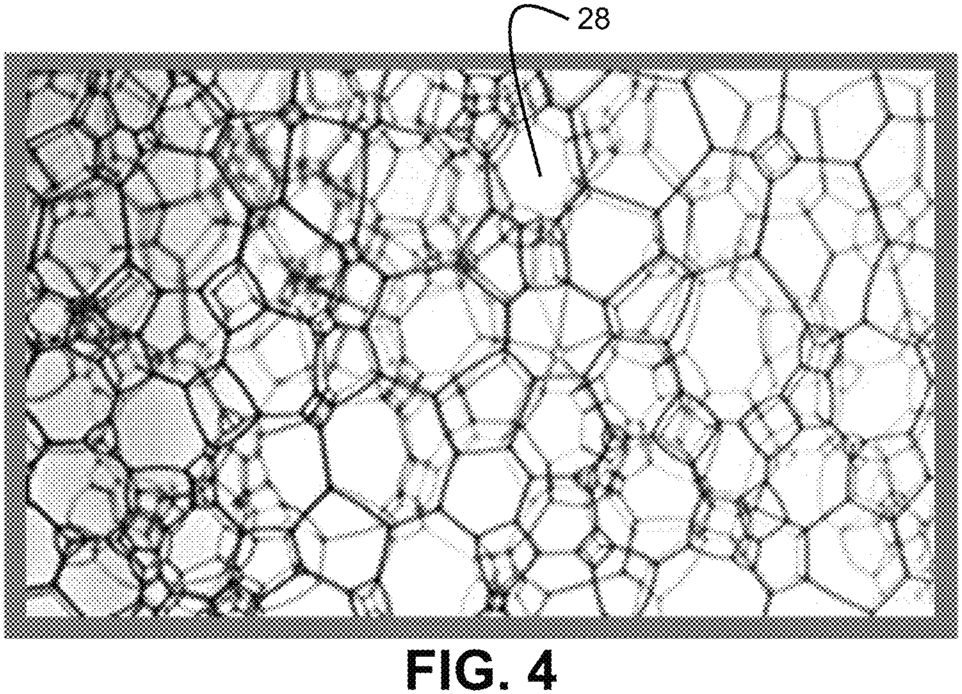
FIG. 4 is a line drawing of a photographic representation of the structure of a foam according to one embodiment of the present invention.

FIG. 3B is a photographic representation of a nozzle 30 injecting foam 28 into the inlet 11 of an engine. FIG. 4 is an enlarged photographic representation of a foam 28 according to one embodiment of the present invention.

Figure 3C:
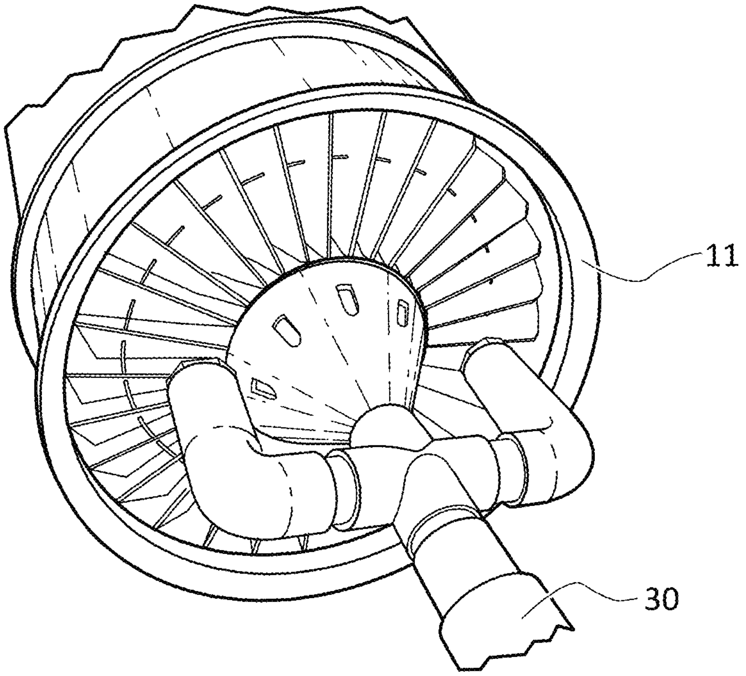
FIG. 3C is a line drawing of a photographic representation of a nozzle according to one embodiment of the present invention in front of an engine inlet.
Figure 3D:
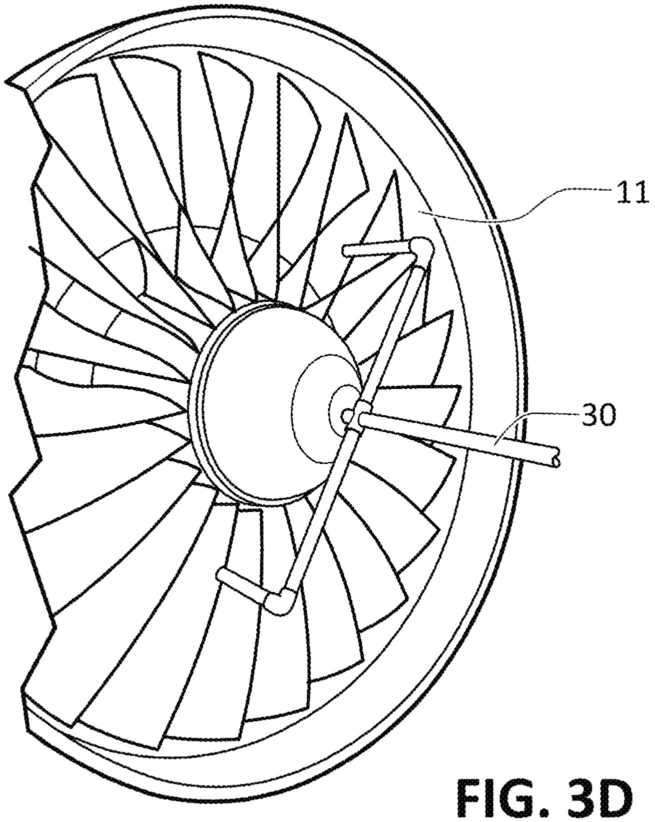
FIG. 3D is a line drawing of a photographic representation of a nozzle according to another embodiment of the present invention in front of an engine inlet.

FIGS. 3C and 3D show nozzles 30 in front of inlets 10 according to other embodiments of the present invention. It can be seen that some embodiments utilize a pair of nozzles that deliver foam to an inlet from substantially the same location and space, except on opposite sides of the engine centerline. Generally, nozzles in some embodiments have non-atomizing nozzles that provide the stream of foam into ambient conditions. As can be seen in FIGS. 3C and 3D, the cross sectional area of the nozzle apparatus 30 generally increases from a unitary central delivery tube, to a pair of side-by-side exit nozzles, each of which substantially the same cross sectional area. Therefore, the cross sectional area as a function of length along the flowpath of apparatus 30 is relatively constant for the central section, but then increases as the central section splits into two side-by-side nozzles.

Figure 5:
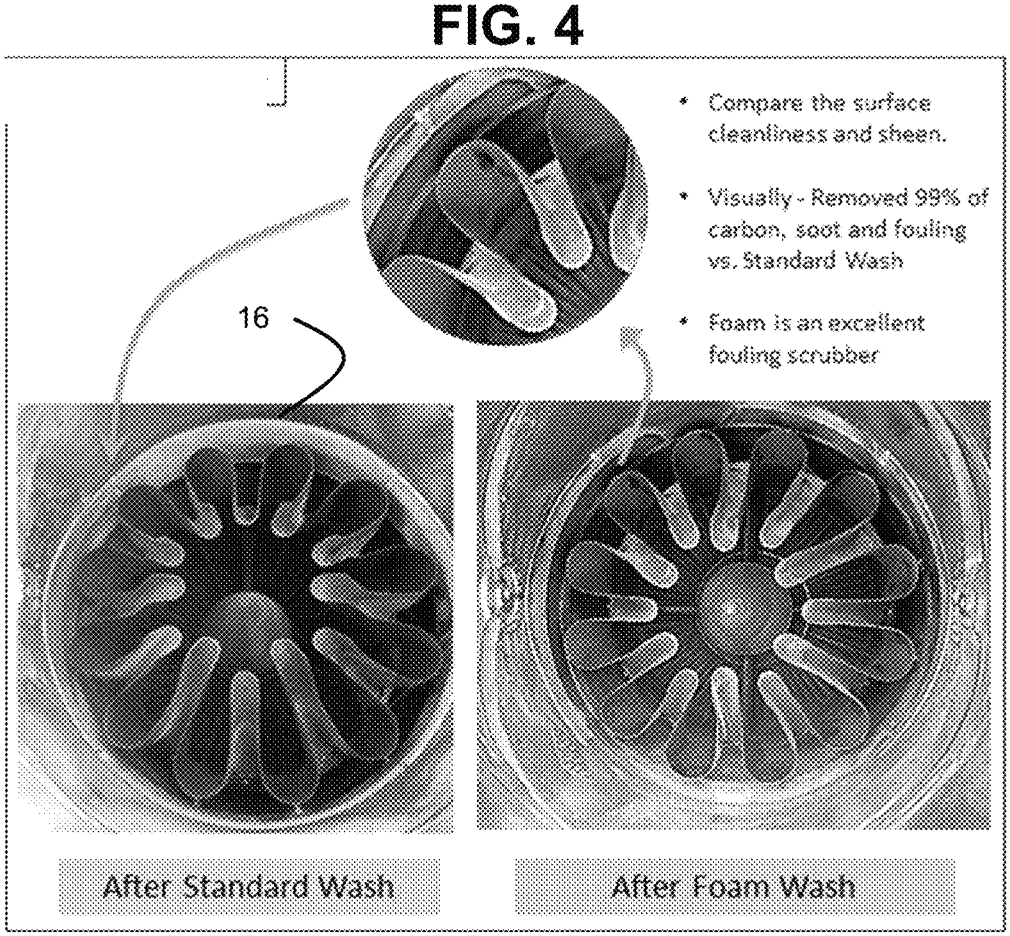
FIG. 5 shows photographic representations of portions of the exhaust structure of an engine before and after being washed in accordance with one embodiment of the present invention.

FIGS. 5-10 pertain to various tests performed with different embodiments of the present invention. FIG. 5 provides views of a corrugated-perimeter noise suppression exhaust nozzle 16, both after a wash according to existing procedures, and also after a wash performed in accordance with one embodiment of the present invention. In comparing the left and right photographs, it can be seen that after a wash performed according to one embodiment of the present invention (right photograph), the exhaust nozzle 16 was cleaned beyond the level of cleanliness previously achieved after a standard washing procedure (left photograph).

Figure 6:
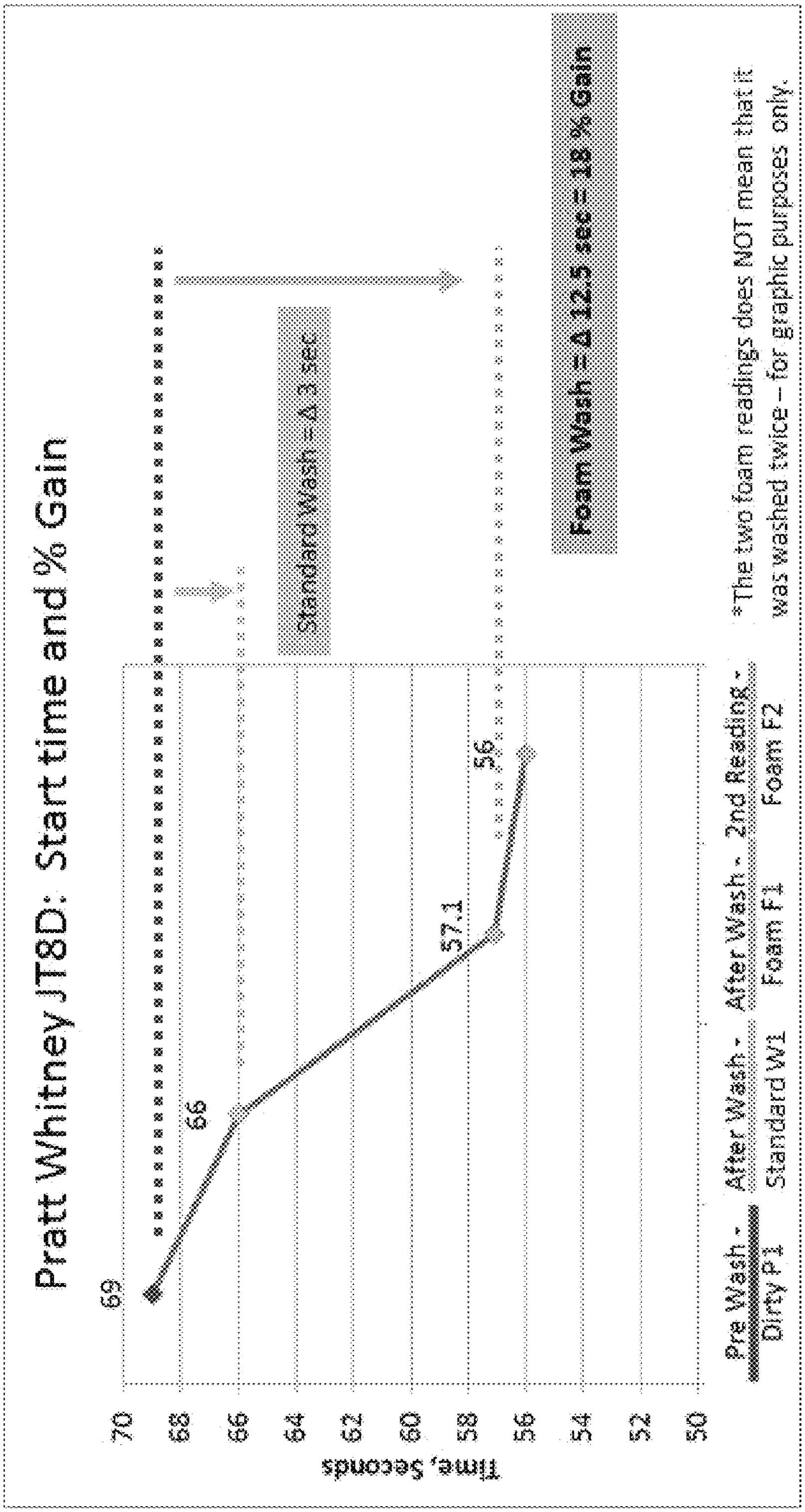
FIG. 6 is a graphical representation of an improvement in engine start time for an engine washed in accordance with one embodiment of the present invention.

FIG. 6 provides pictorial representation of the improvements in engine start time, including results after a standard wash, and after a wash according to one embodiment of the present invention. It can be seen that the standard wash shortened the start time of the particular engine by 3 seconds, from 69 seconds to 66 seconds. However, a subsequent wash of that same engine with an inventive washing system provided an additional reduction in start time of almost 9 seconds, thus showing that a cleaning method according to one embodiment of the present invention is able to improve the engine gaspath flow dynamics beyond the improvement achieved with a standard wash (such as those methods in which a spray of atomized cleaning fluid is provided into the inlet of an engine).

Figure 7:
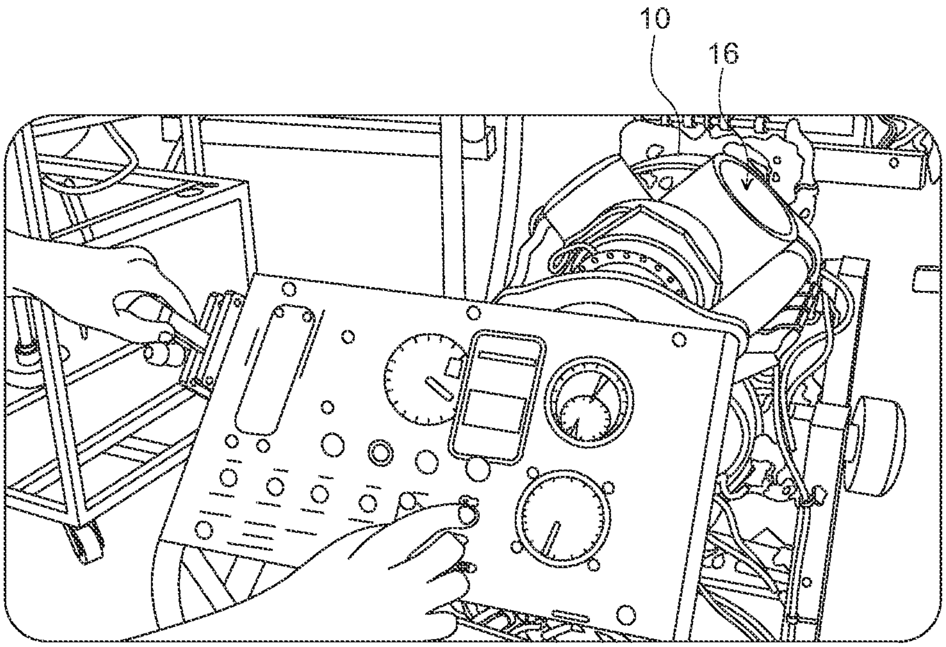
FIG. 7 is a photographic representation of an engine being washed on an engine test stand according to one embodiment of the present invention.
Figure 8:
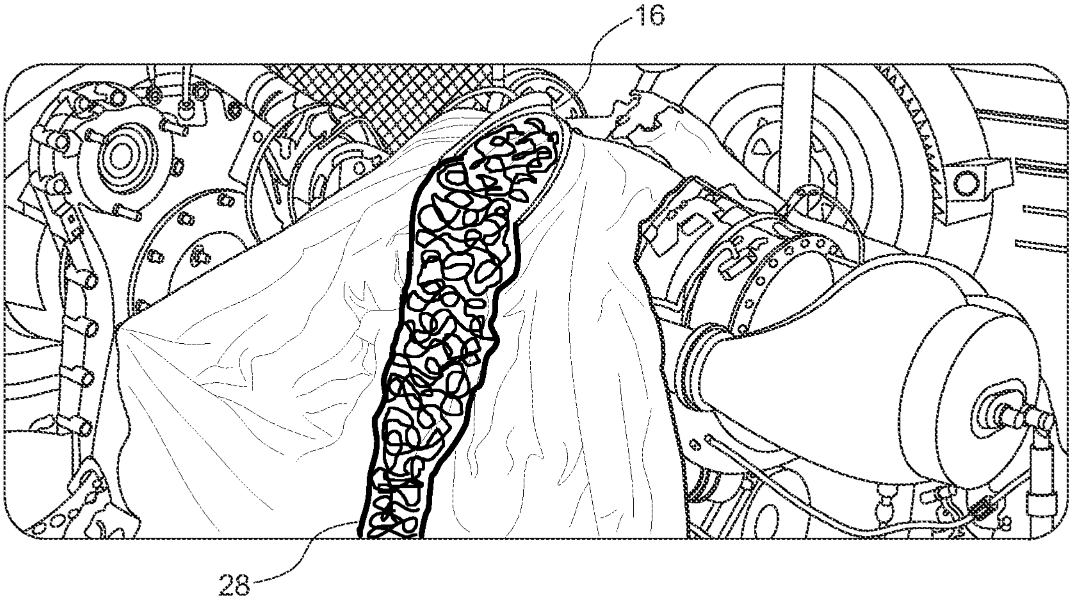
FIG. 8 is a photographic representation of a portion of the apparatus of FIG. 7.
Figure 9:
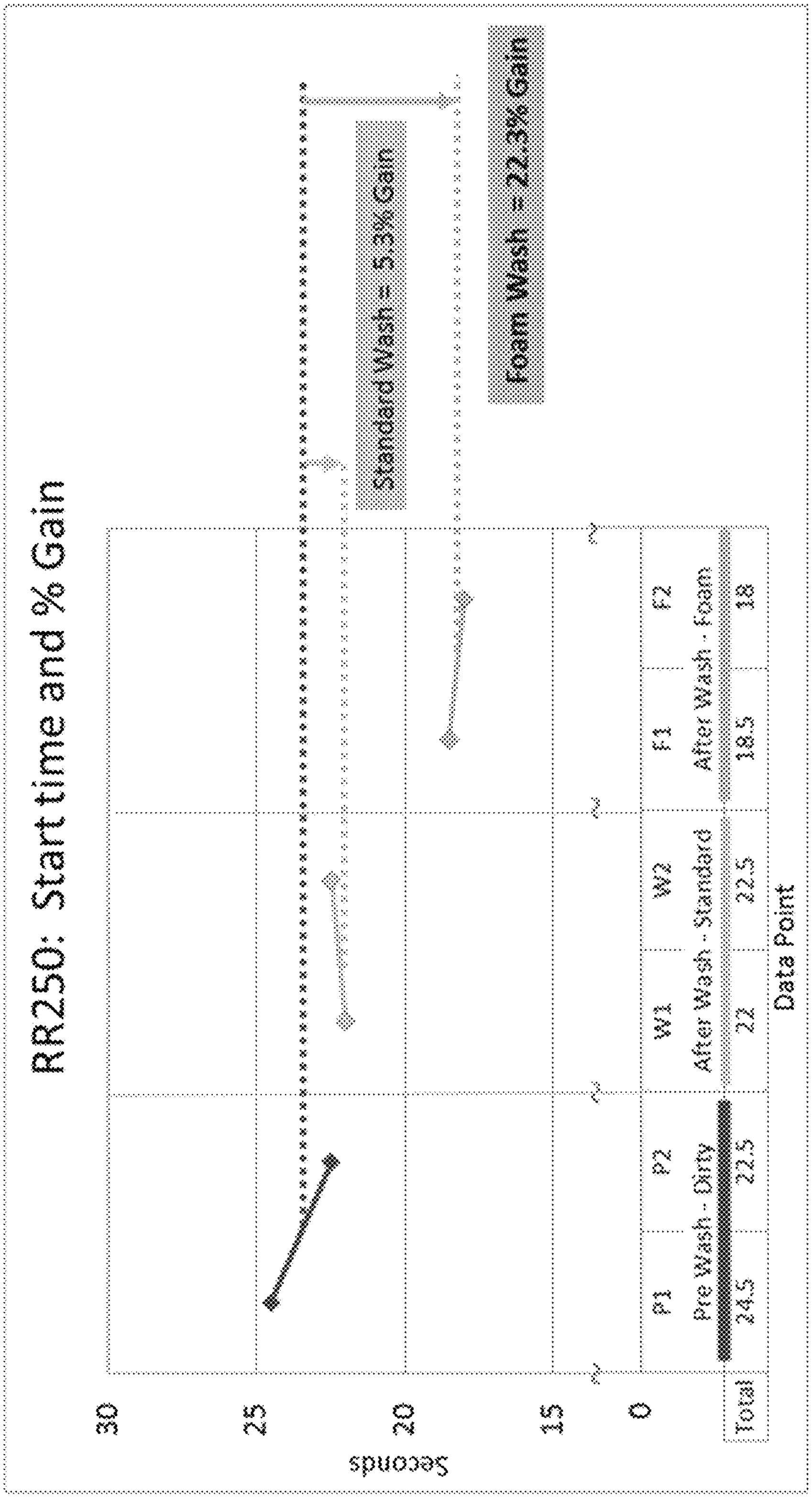
FIG. 9 is a graphical representation of a parametric improvement of an engine washed in accordance with one embodiment of the present invention.

FIGS. 7-10 depict testing and test results performed on a helicopter engine. FIGS. 7 and 8 show the engine 10 being cleaned with the effluent foam 28 exiting the dual exhaust nozzles 16. FIG. 9 shows the results of multiple start tests performed on a helicopter engine. It can be seen that the start time of a used engine was reduced by about 5 percent using an existing washing technique. However, cleaning that same engine with a cleaning system according to one embodiment of the present invention provided still further gains and a decrease in start time (compared to the original, used engine) of over 22 percent.

Figure 10:
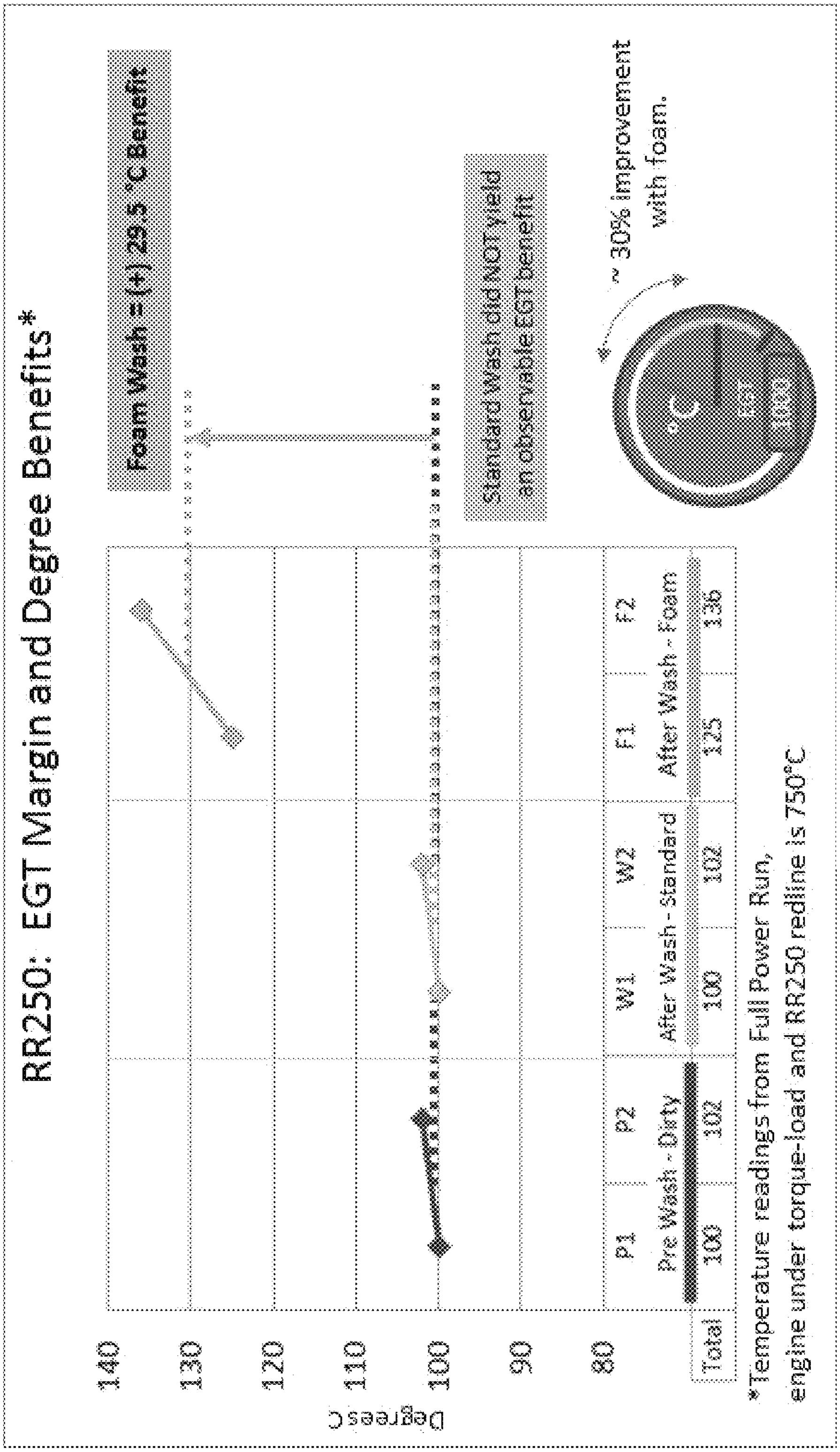
FIG. 10 is a graphical representation of a parametric improvement of an engine washed in accordance with one embodiment of the present invention.

FIG. 10 pictorially represents improvements in exhaust gas temperature margin for a helicopter engine operating at full power before and after cleaning. It can be seen that the use of an existing cleaning system on the engine provided no measurable improvement in EGT margin. However, that same engine experienced an increase in EGT margin (i.e., the ability to run cooler) of more than 30 degrees C. after being cleaned with a system and method according to one embodiment of the present invention.

Figure 11A:
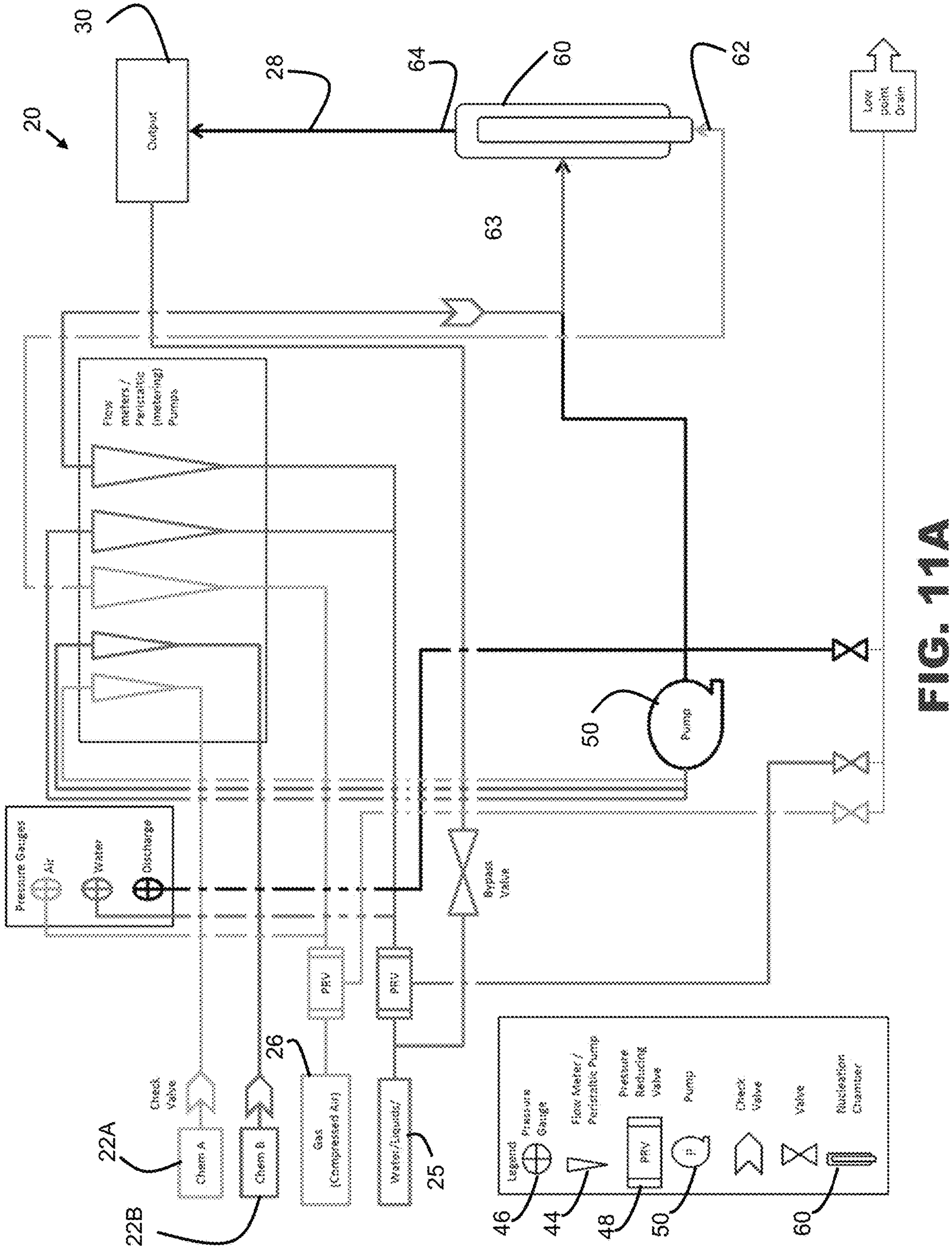
FIG. 11A is a schematic representation of a cleaning system according to one embodiment of the present invention.
Figure 11B:
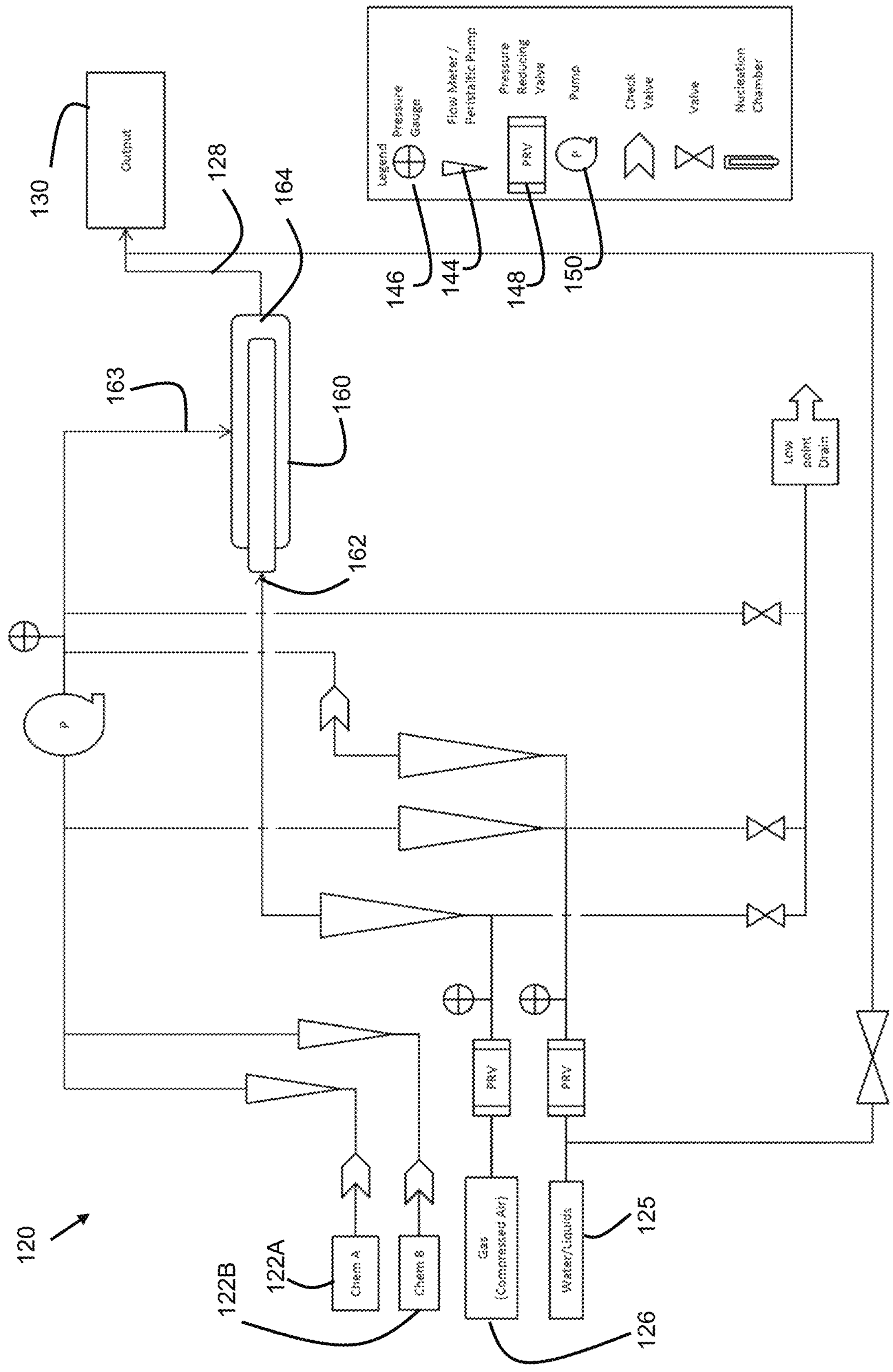
FIG. 11B is a schematic representation of a cleaning system according to another embodiment of the present invention.

FIGS. 11A and 11B depict in schematic format washing systems 20 and 120 according to various embodiments of the present invention. Many of the components schematically depicted in FIGS. 11A and 11B (including the pressure gauges, flow meters, pressure reducing valves, pumps, check valves, nucleation chambers, and other valves and plumbing) are preferably housed within a cabinet 42, which can be seen in FIGS. 12, 13, and 14.

Figure 12A:
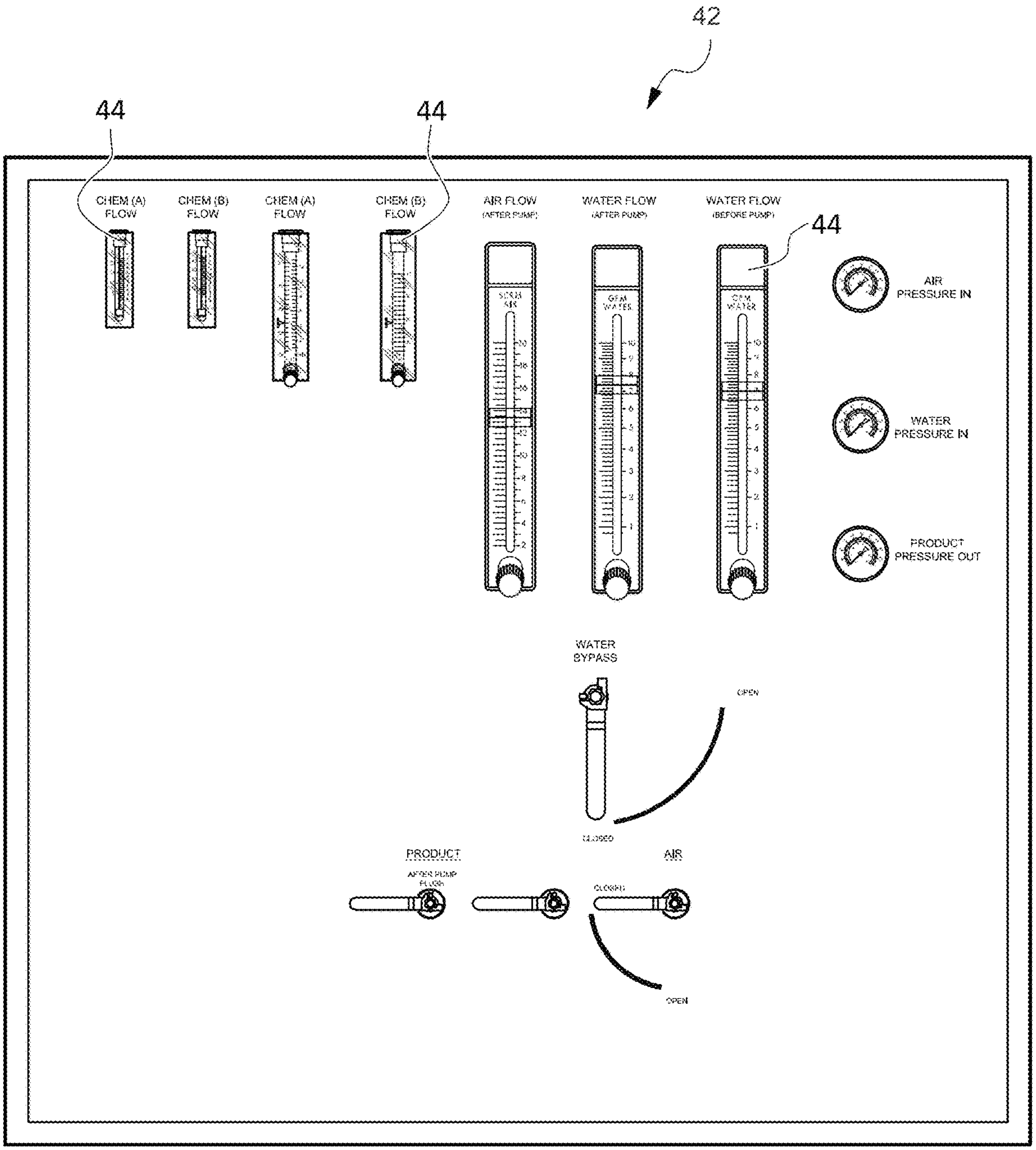
FIGS. 12A, 12B, and 12C are line drawings of photographic representations of one embodiment of a portion of the apparatus of FIG. 11A.
Figure 12B:
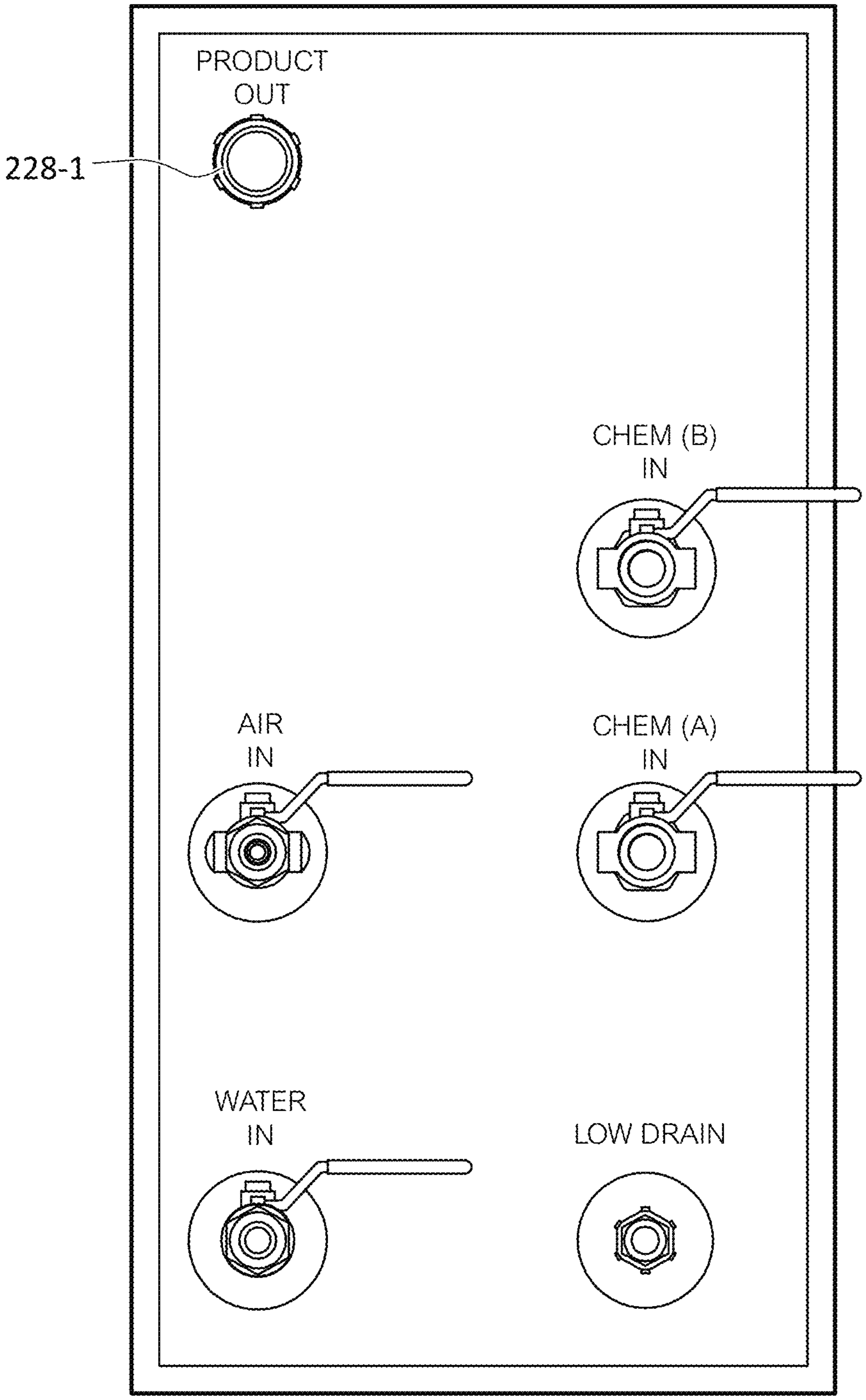
Figure 12C:
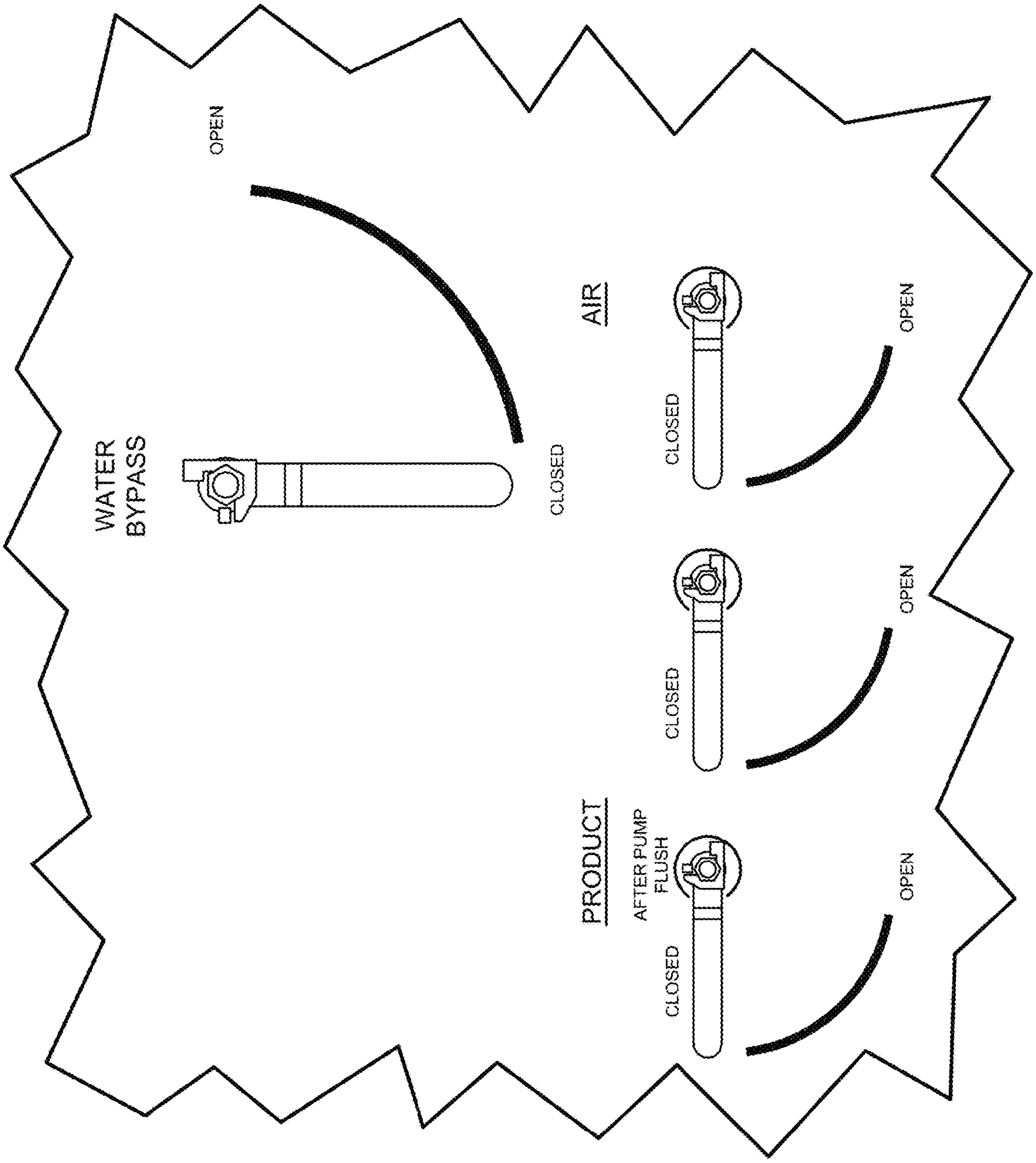
Figure 13B:
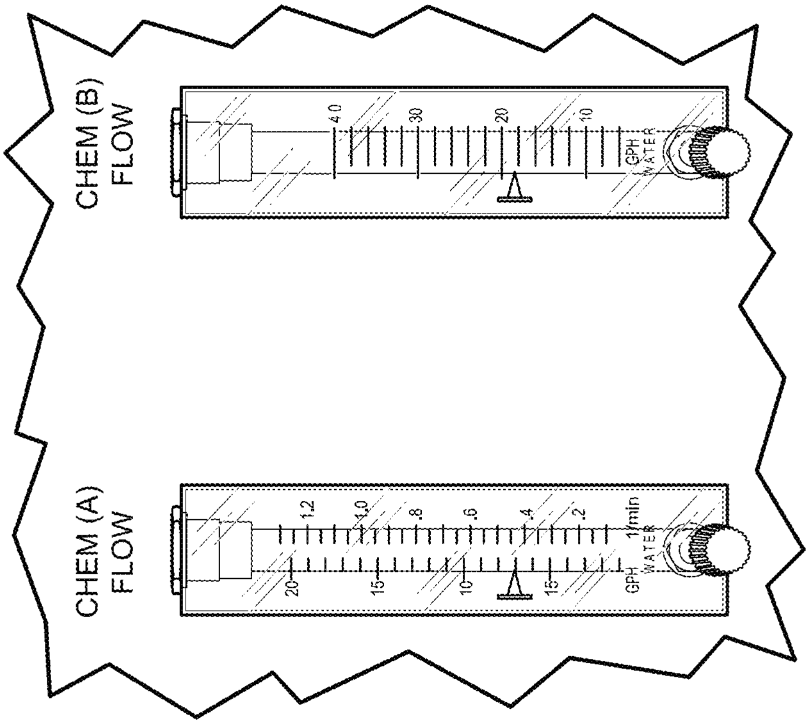
FIGS. 13A, 13B, 13C, and 13D are line drawings of close-up photographic representations of portions of the apparatus of FIG. 12A.
Figure 13A:
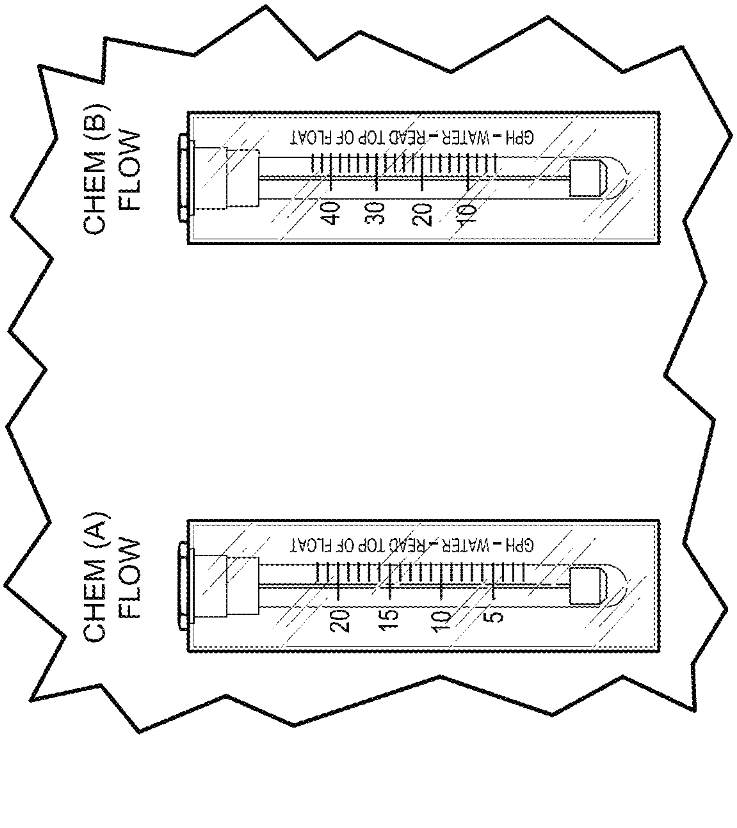
Figure 13C:
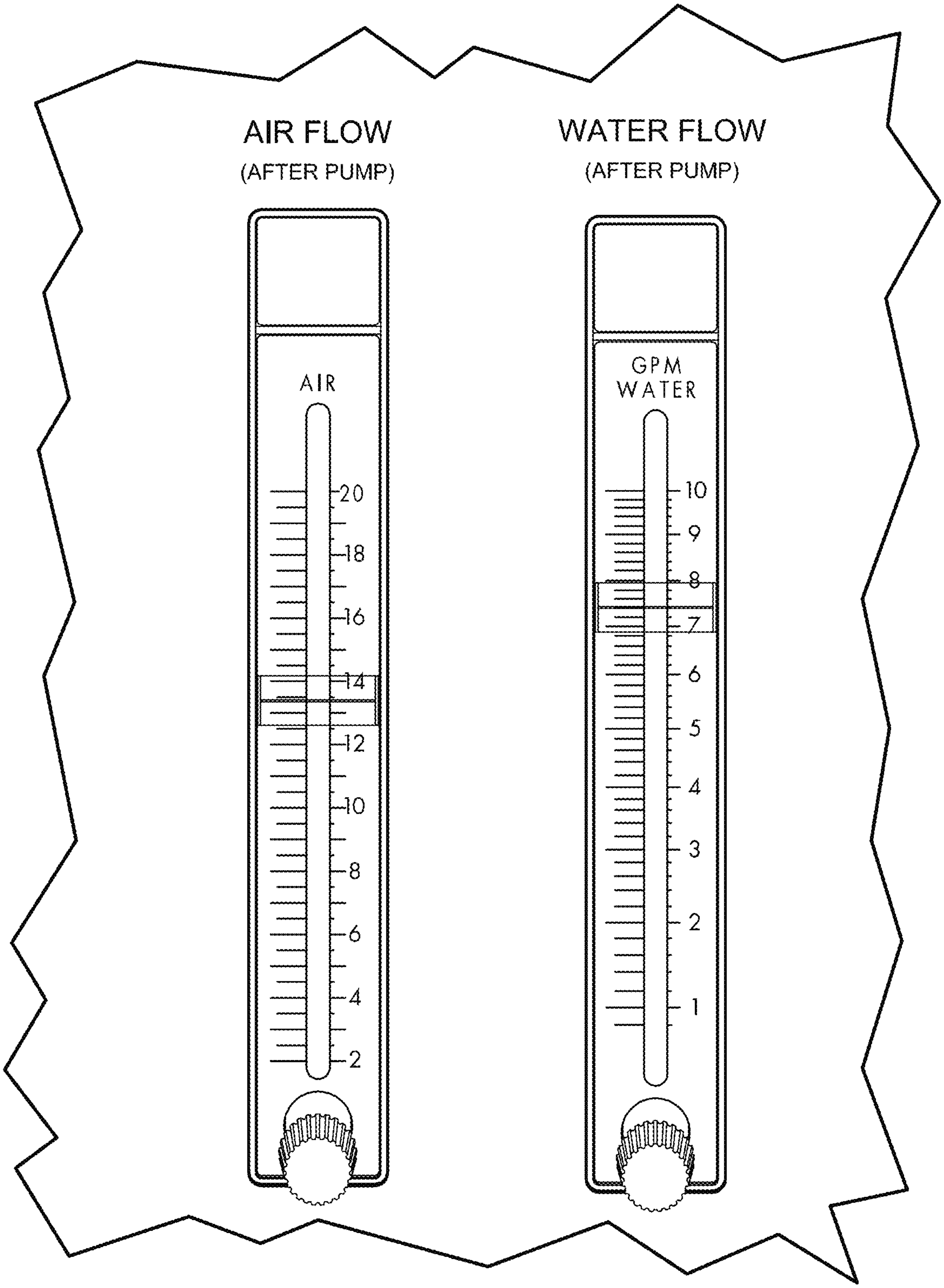
Figure 13D:
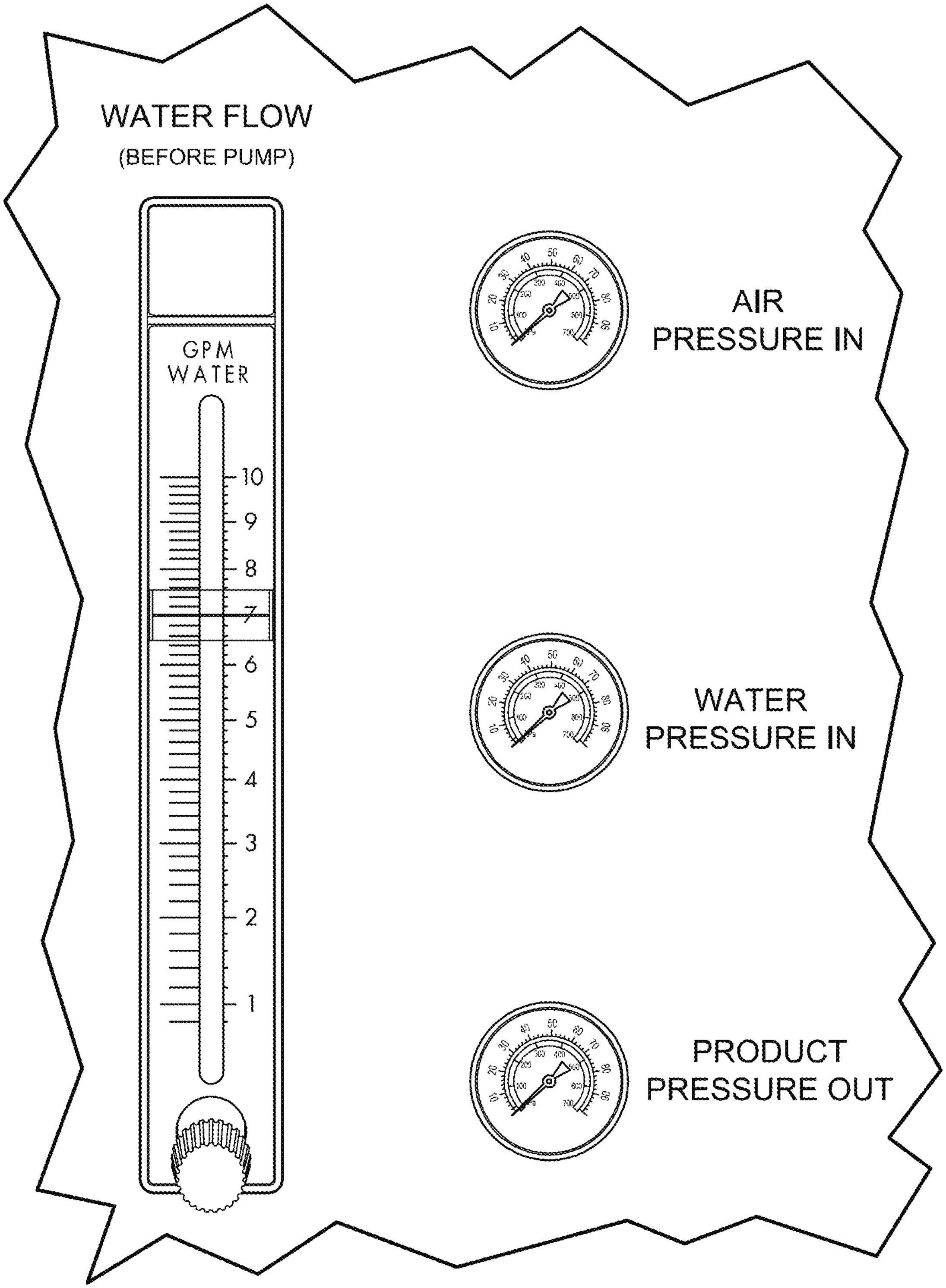

FIGS. 12A, 12B, and 12C are photographic representations of the exterior of a cabinet 42 of a foaming system 40 according to one embodiment of the present invention. The various inlets, shut-off valves, flow meters, pressure gauges, and connections can be seen in these photographic representations. Further, the depictions in FIGS. 12, 13, and 14 are of the same flow system 40, and the various interconnections seen in FIG. 14 can be traced to the cabinet exterior shown in FIGS. 12 and 13.

FIG. 13 are close-up representations of portions of the flow cabinet 42 of FIG. 12A. FIG. 13B shows that in one embodiment chemical A is preferably provided at about 7 gallons per hour, and chemical B is provided at about 19 gallons per hour. FIG. 13C shows that the airflow into the nucleation chamber was between about 13 to 14 standard cubic feet per minute, and the water flow (after the pump) used to create the foam was between about 7 and 8 gallons per minute. FIG. 13D shows the water flow as measured before the pump to be about 7 gallons per minute. The pressure gauges of FIG. 13D indicate an operational pressure of air, water, and foam, of between about 18 to 20 psig. These specific settings are by way of example only, and not to be construed as limiting. Further, these settings were utilized with an embodiment flowing a chemical A of Zok27 and/or chemical B of Turco 5884. Similarly, in accordance with engine manuals, combinations of approved products or basic ingredients (i.e., kerosene, isopropyl alcohol, petroleum solvents) can be utilized. As a point of reference, qualified product lists or approvals are associated by way of the FAA or by the Naval Air Systems Command approvals. Such gas-path approval reports are dictated by MIL-PRF-85704 documentation for industry to follow.

FIG. 14 depict the components and plumbing housed within cabinet 42, and are consistent with FIGS. 12, 13, and 15.

FIGS. 15 and 16 show various embodiments of nucleation chambers X60 according to various embodiments of the present invention. Many of these embodiments include a housing X61 that includes an inlet X62 for gas, an inlet X63 for one or more liquids, and an outlet X64 that provides the foam output 28 to a nozzle X30. In some embodiments, a gas chamber X66 receives gas under pressure from inlet X62. Gas chamber X66 is preferably enclosed within housing X61, and arranged such that portions of gas chamber X66 are in contact with fluid from inlet X63 within housing X61. Several embodiments include gas chambers X66 that have one or more apertures or other features X70 that provide fluid communication from the internal passageway of chamber X66 and the fluid within housing X61.

The introduction of gas through the apertures X70 are adapted and configured to create a foam with the cleaning liquid within a nucleation zone X65. Preferably, the foam is created by nucleation of pre-certified aviation chemicals with proper arrangement of high speed air jets, diffuser sections, growth spikes, and/or centrifugal sheering of the chemicals, any of which can be used to create the foam which is a higher energy, short-lived state of the more stable non-foamed liquid chemical. The resultant foam is provided to outlet X64 for introduction into the inlet of the device being cleaned.

In some embodiments, chamber X60 further includes a cell growth section X74 in which there is material or an apparatus that encourages merging of smaller foam cells into a larger foam cell. In still other embodiments, nucleation chamber X60 can include a cell structuring section X78 that includes material or apparatus for improving the homogeneity of the foam material. Still further embodiments of chamber X60 include a laminar flow section X82 in which the foamed material 28 is made less turbulent so as to increase the longevity of the foam cells and thus increase the number of foam cells delivered to the inlet 11 of the product 10 being cleaned.

Some of the nucleation chambers X60 include nucleation zones, growth sections, and structuring sections that are arranged serially within the foam flowpath. In yet other embodiments these zones and sections are arranged concentrically, with the foam first being created proximate to the centerline of the flowpath. In yet other embodiments the zones and sections are arranged concentrically with the foam being created at the periphery of the flowpath, with the cells being grown and structured progressively toward the center of the flowpath.

Some of the nucleation chambers X60 described herein include nucleation zones, growth sections, and structuring sections that are arranged within a single plenum. However, it is understood that yet other embodiments contemplate a modular arrangement to the nucleation chamber. For example, the nucleation zone can be a separate component that is bolted to a structuring zone, or a to laminar flow zone. For example, the various sections can be attached to one another by flanges and fasteners, threaded fittings, or the like. Still further, the systems X20 are described herein to include a single nucleation chamber. However, it understood that the cleaning system can include multiple nucleation chambers. As one example, a plurality of chambers can be fed from manifolds that provide the liquids and gas. This parallel flow arrangement can provide a foam output that likewise is manifolded together to a single nozzle X28, or to a plurality of nozzles arranged in a pattern to best match the engine inlet geometry.

The various washing systems X20 discussed herein can include a mixture of liquids (such as water, chemical A, and chemical B) that are provided to the inlet of the nucleation chamber, within which gas is injected so as to create a foam from the mixture of liquids. However, the present invention is not so limited, and further includes those embodiments in which the liquids may be foamed separately. For example, a cleaning system according to another embodiment of the present invention may include a first nucleation chamber for chemical A, and a second nucleation chamber for a mixture of chemical B and water. The two resultant foams can then be provided to a single nozzle X28, or can be provided to separate nozzles X28.

The various descriptions that follow pertain to a variety of embodiments of nucleation chambers X60 incorporating numerous differences and numerous similarities. It is understood that each of these is presented by way of example only, and are not intended to place boundaries on the broad ideas expressed herein. As yet another example, the present invention contemplates an embodiment in which the liquid product is provided to an inlet X63 and flows within a flowpath surrounded by a circumferential gas chamber X66. In such embodiments, gas chamber X66 defines an annular flow space and provides gas under pressure from an inlet X62 into the liquid product flowing within the annulus.

Figure 16A:
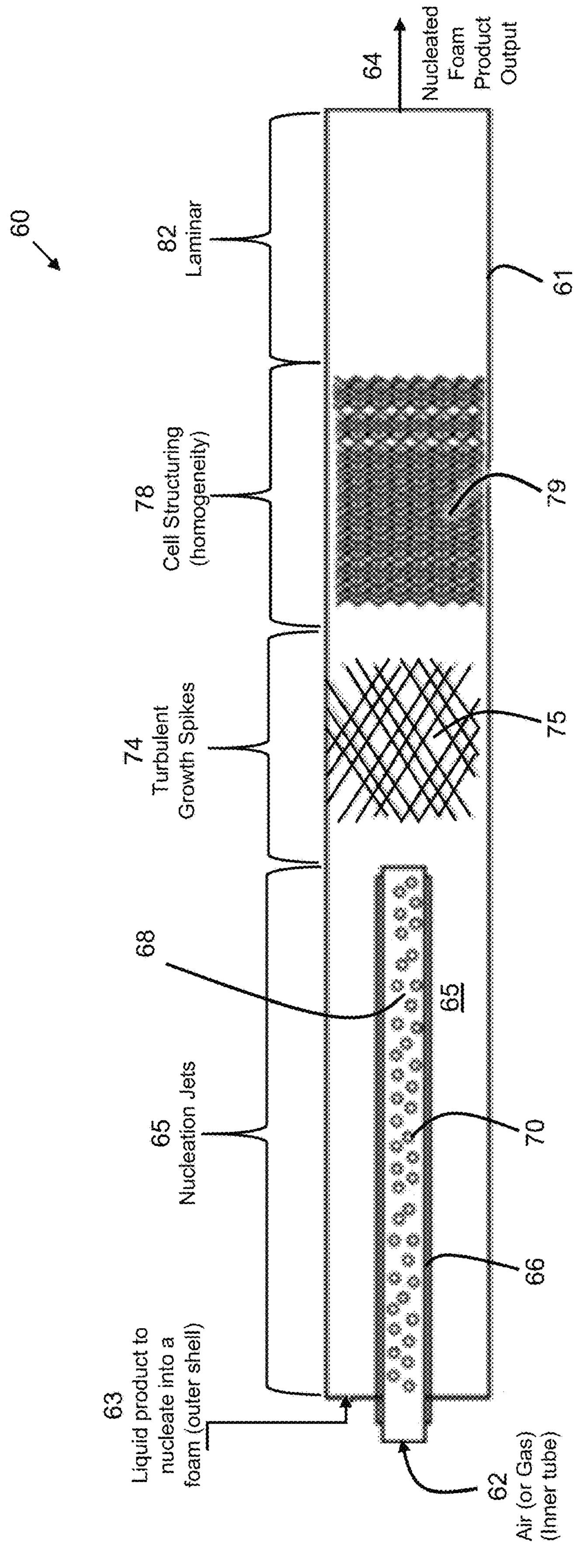
Figure 16B:
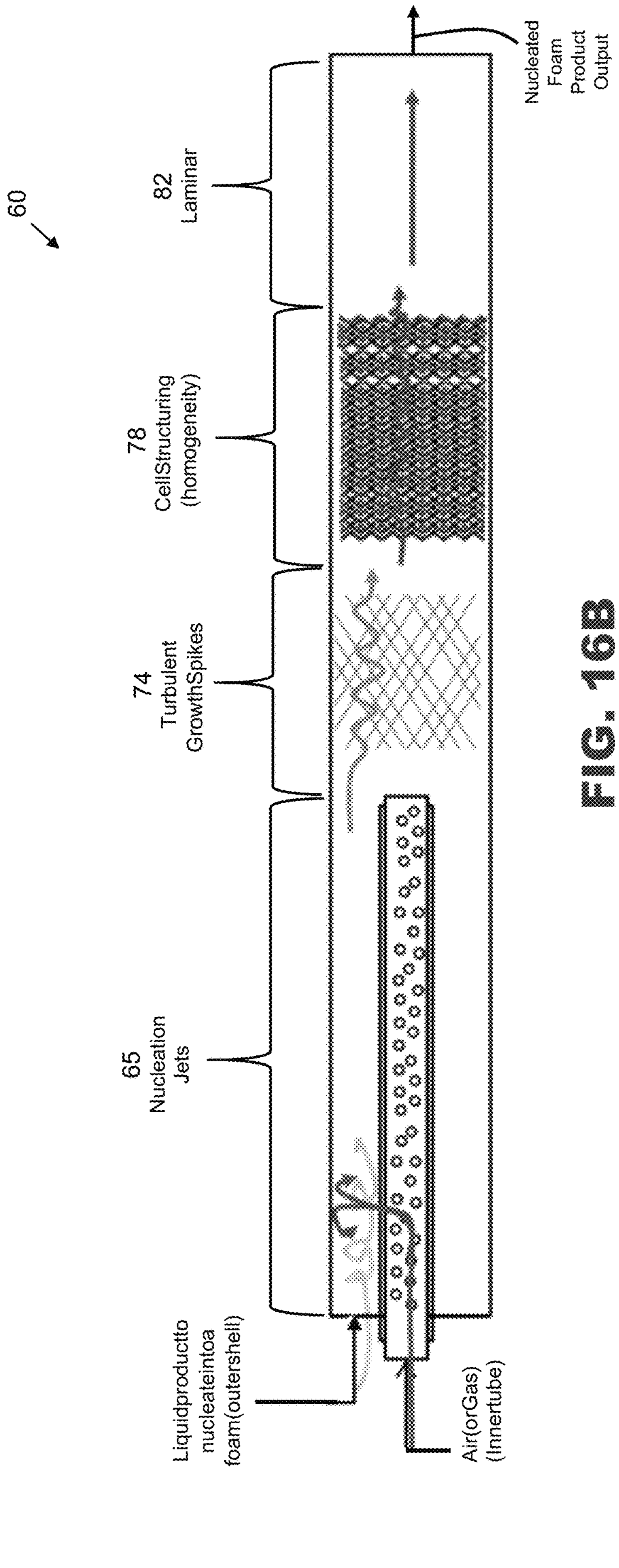

FIGS. 16A and 16B show a nucleation chamber 60 according to one embodiment of the present invention. Housing 61 includes a gas inlet 62, liquid inlet 63, and foam outlet 64, with a foam creation passageway located between the inlets and the outlet. Contained within housing 61 is a generally cylindrical gas tube 66 that receives gas under pressure from inlet 62. Although gas chamber 66 has been described as a cylindrical tube, yet other embodiments of the present invention contemplate internal gas chambers of any size and shape adapted and configured to provide a flow of gas into a flow of liquid such that a foam results.

Gas tube 66 is located generally concentrically within housing 61 (although a concentric location is not required), such that liquid from inlet 63 flows generally around the outer surface of tube 66. Tube 66 preferably includes a plurality of apertures 70 that are adapted and configured to flow gas from within tube 66 generally into the interior foam-creating passageway of housing 61. As shown in FIG. 16A, the apertures 70 are located generally along the length of tube 66, and preferably surrounding the circumference of tube 66. However, yet other embodiments of the present invention contemplate apertures 70 having locations limited to certain select portions of tube 66, such as toward the inlet, toward the outlet, generally in the middle, or any combination thereof.

As one example, the nucleation jets 70 are adapted and configured to have a total flow area that is about equal to the cross sectional flow area of housing 61 or less than that cross sectional area. As one example, the jets 70 have hole diameters from about one-eighth of an inch to about one-sixteenth of an inch.

The foam within nucleation chamber 60 is first created within a nucleation zone 65 that includes the initial mixing of gas and liquid streams as previously discussed. As the foam leaves this zone, it flows into a downstream growth section 74 and passes over a corresponding growth material 75. Material 75 is adapted and configured to provide structural surface area on which individual foam cells can attach and combine with other foam cells to divide into more foam cells. Material 75 includes a plurality of features that cause larger, more energized cells to divide into a number of smaller cells. In some embodiments, material 75 is a mesh preferably formed from a metallic material. Plastic materials can also be substituted, provided that the organic material can withstand exposure to the liquids 22 used for cleaning. It is further contemplated by yet other embodiments that material 75 can be materials other than a mesh.

As the more divided foam cells exit growth section 74, they enter a cell structuring section 78 that preferably includes a material 79 within the internal foam passage of housing 61. The material 79 of cell-structuring section 78 is adapted and configured to receive a first, various distribution of foam cell sizes from section 74, and provide to output 64 a second, smaller, and tighter distribution of cell sizes. In some embodiments, the structuring material 79 includes a mesh formed from a metal, with the cell size of the mesh of section 78 being smaller than the mesh size of growth section 74.

After the merged (more abundant cells) and structured (improved homogeneity) cells exit section 78, they enter a portion of flowpath, parts of which can be within housing 61, and parts of which can be outside of housing 61, in which the flowpath is adapted and configured to provide laminar flow of the foam 28. Therefore, the cross sectional area of the laminar flow section 82 is preferably larger than the representative cross sectional flow areas of nucleation section 65, growth section 74, or structuring section 78. Flow section 82 encourages laminar flow and also discourages turbulence that could otherwise reduce the quantity or quality of the foam. Still further, the output section of apparatus 60, along with the flow passageways extending to nozzle 30, are generally smooth, and with sufficiently gentle turn radii to further encourage laminar flow and discourage turbulence.

FIG. 15 show a nucleation chamber 260 according to one embodiment of the present invention. Housing 261 includes a gas inlet 262, liquid inlet 263, and foam outlet 264, with a foam creation passageway located between the inlets and the outlet. Contained within cylindrical housing 261 is a generally cylindrical gas tube 266 that receives gas under pressure from inlet 262. Although gas chamber 266 has been described as a cylindrical tube, yet other embodiments of the present invention contemplate internal gas chambers of any size and shape adapted and configured to provide a flow of gas into a flow of liquid such that a foam results.

Figure 15A:
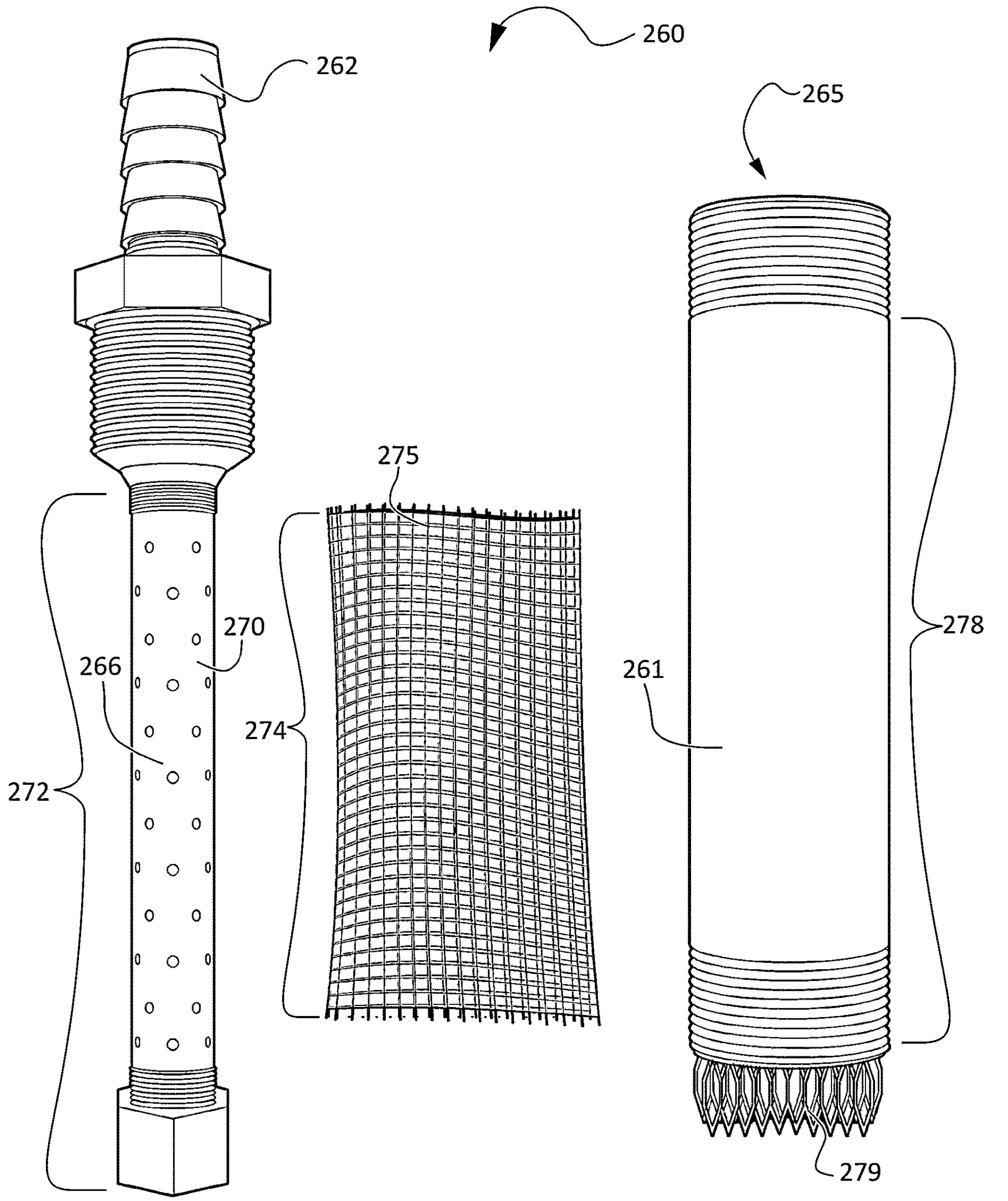
FIGS. 15A, 15B, 15C, 15D, 15E, and 15F are line drawings of photographic representations of a component shown in FIG. 14B.
Figure 15B:
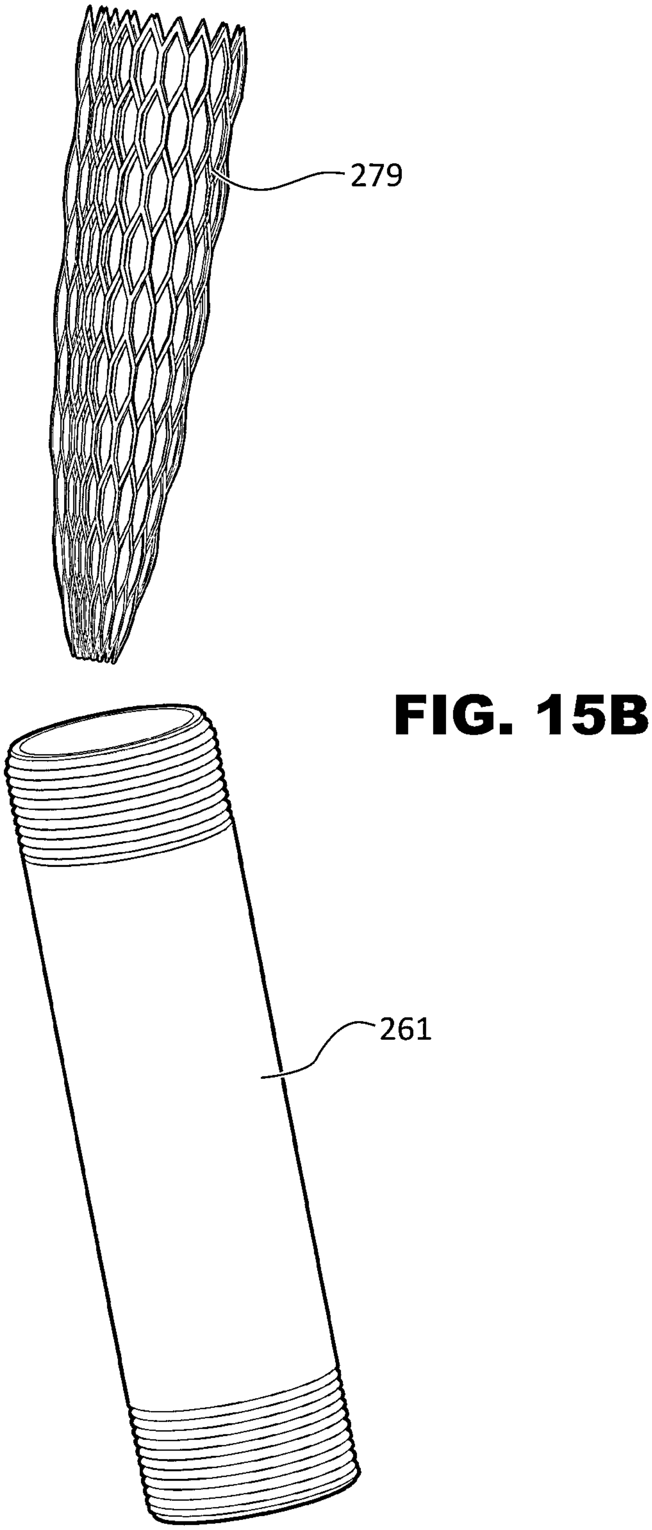
Figure 15C:
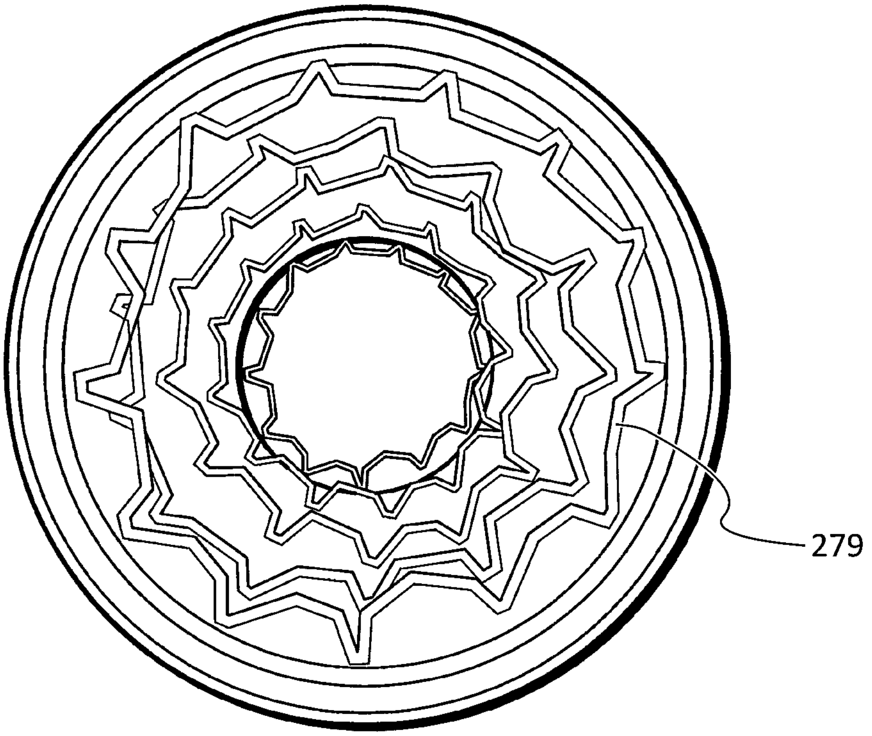
Figure 15D:
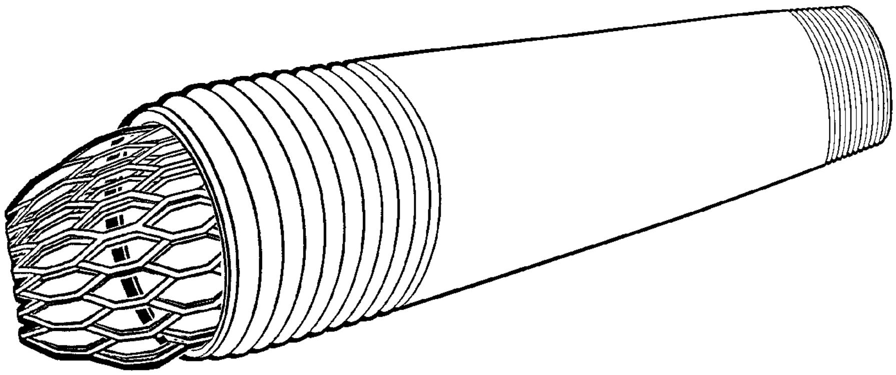

Gas tube 266 is located generally concentrically within housing 261 (although a concentric location is not required), such that liquid from inlet 263 flows generally around the outer surface of tube 266. Tube 266 preferably includes a plurality of regularly-spaced apertures 270 that are adapted and configured to flow gas from within tube 266 generally into the interior foam-creating passageway of housing 261. As shown in FIG. 15A the apertures 270 are located generally along the length of tube 266, and preferably surrounding the circumference of tube 266.

Figure 15E:
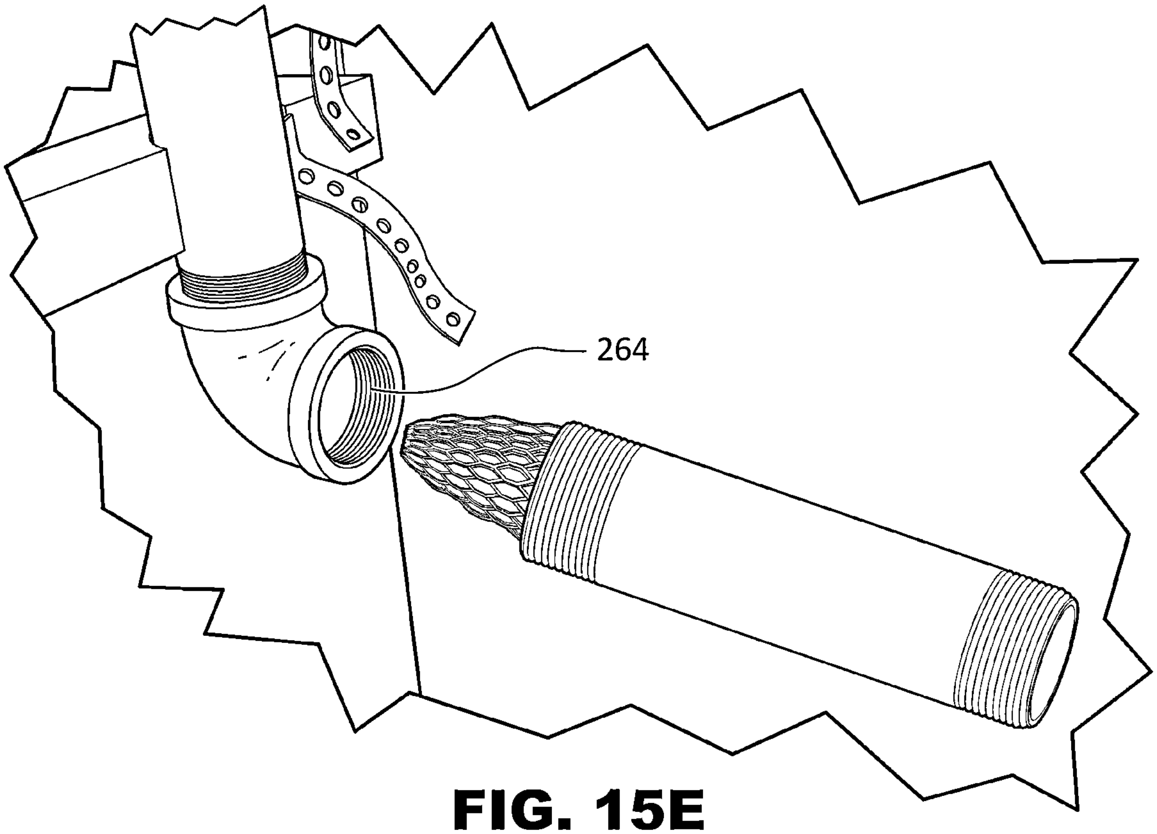
Figure 15F:
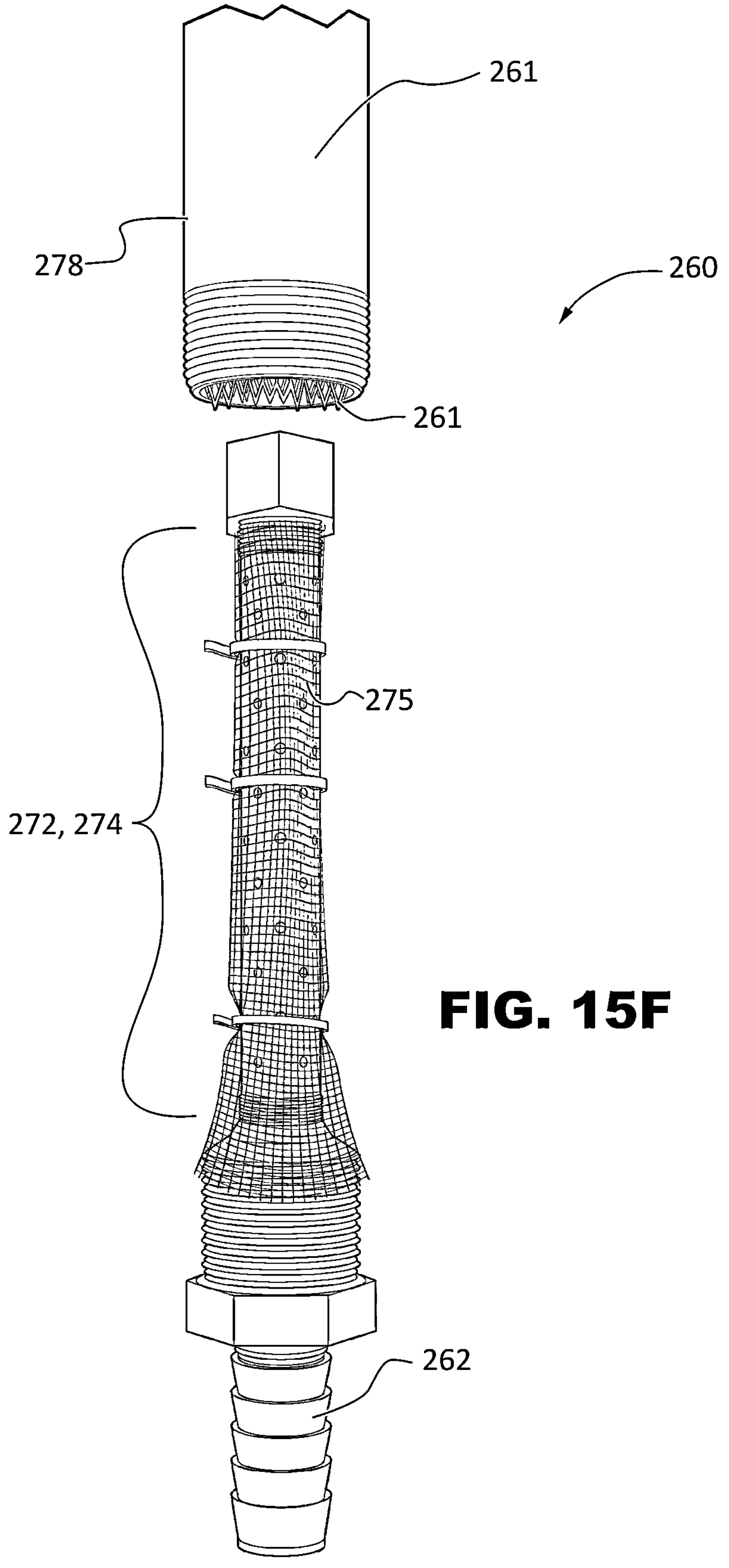

The nucleation, growth, and cell structuring zones (272, 274, and 278, respectively) are arranged concentrically. The nucleation zone 272 is created between the outer periphery of tube or pipe 266. Wire mesh material 275 of growth section 274 wraps around the outer periphery of tube 266, as best seen in FIG. 15F (where it is shown held in place by three electrical connection strips). The nucleation section 272 is created between the outer surface of pipe 266 and the inner most surfaces of growth material 275. As the gas bubbles are emitted from apertures 270 and pass through nucleation zone 272, the foam is created, and the foam cells pass through one or more generally concentric layers of mesh material 275. As the larger foam cells exit the material 275 of growth section 274, the larger cells then pass into an annularly arranged woven metal material 279 that comprises the cell structuring and homogenizing section 278 (as best seen with reference to FIGS. 15C and 15F). Referring to FIG. 15E, it can be seen that the material 279 of homogenizing section 278 in one embodiment tapers toward the centerline of nucleation chamber 260. The foam cells are created by the mixing of liquid and gas, increased in size, and homogenized in a manner as previously discussed.

Figure 14A:
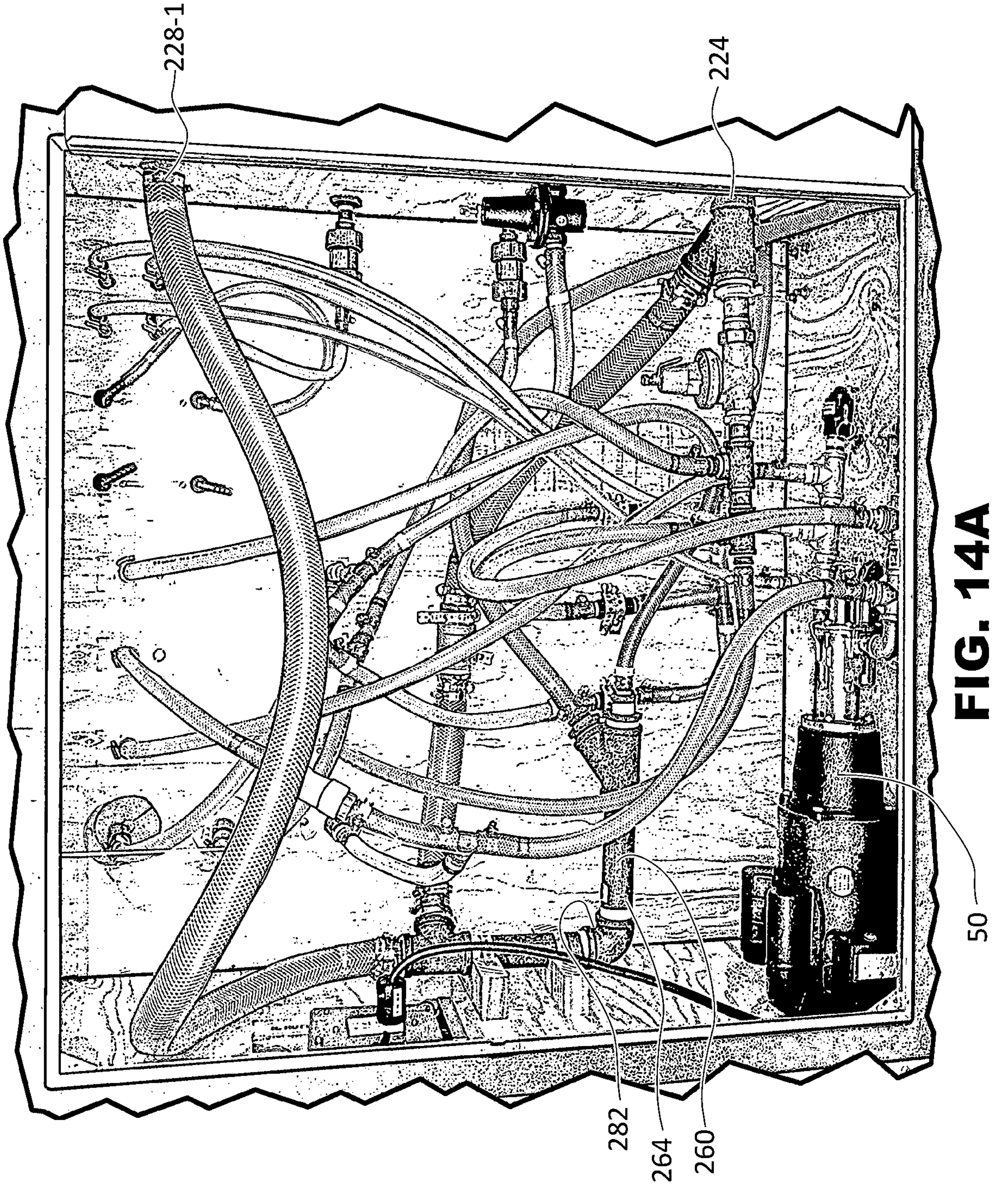
FIGS. 14A, 14B, 14C, 14D are line drawings of photographic representations of the interior of the cabinet of FIG. 12.
Figure 14B:
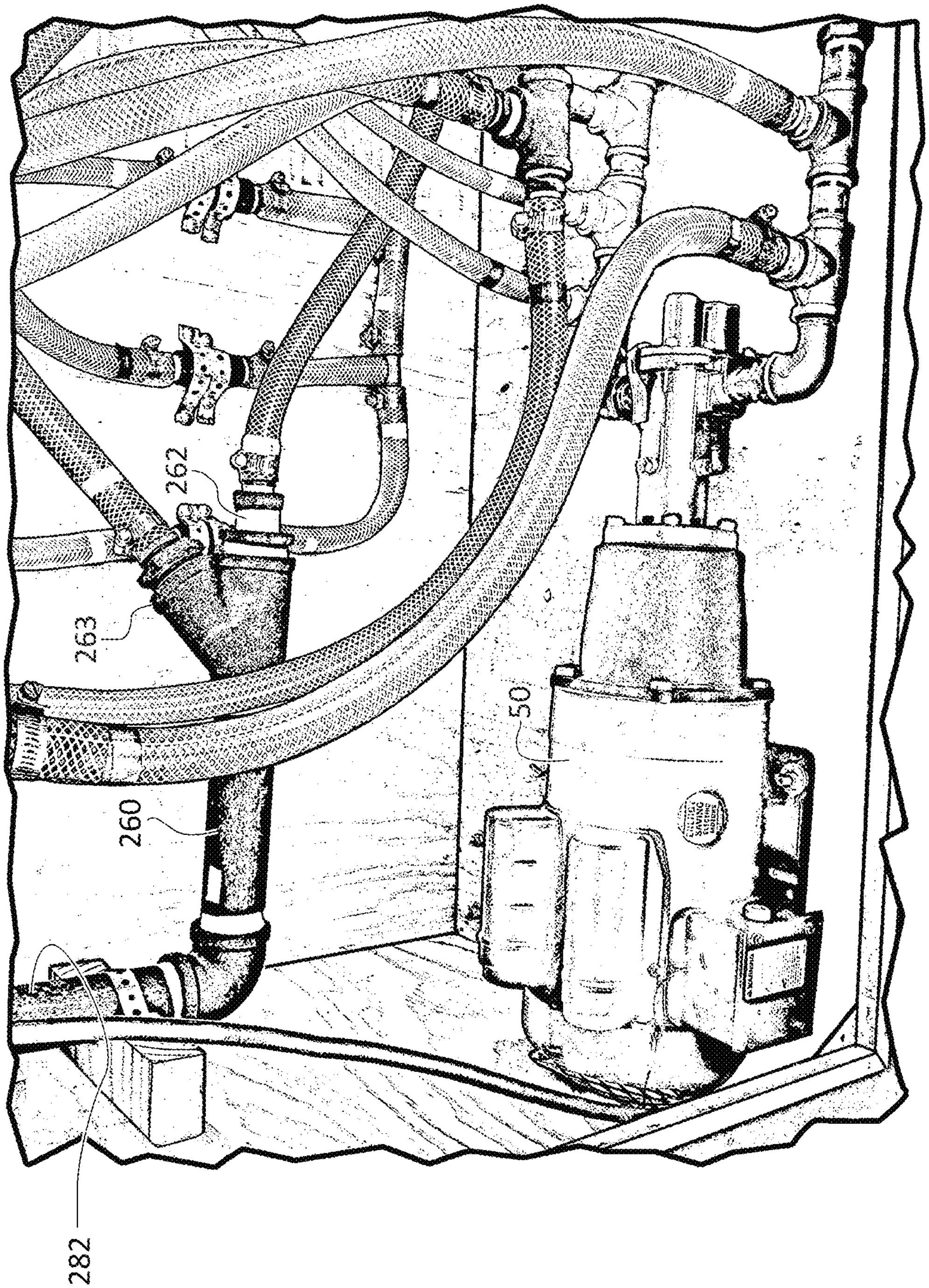
Figure 14C:
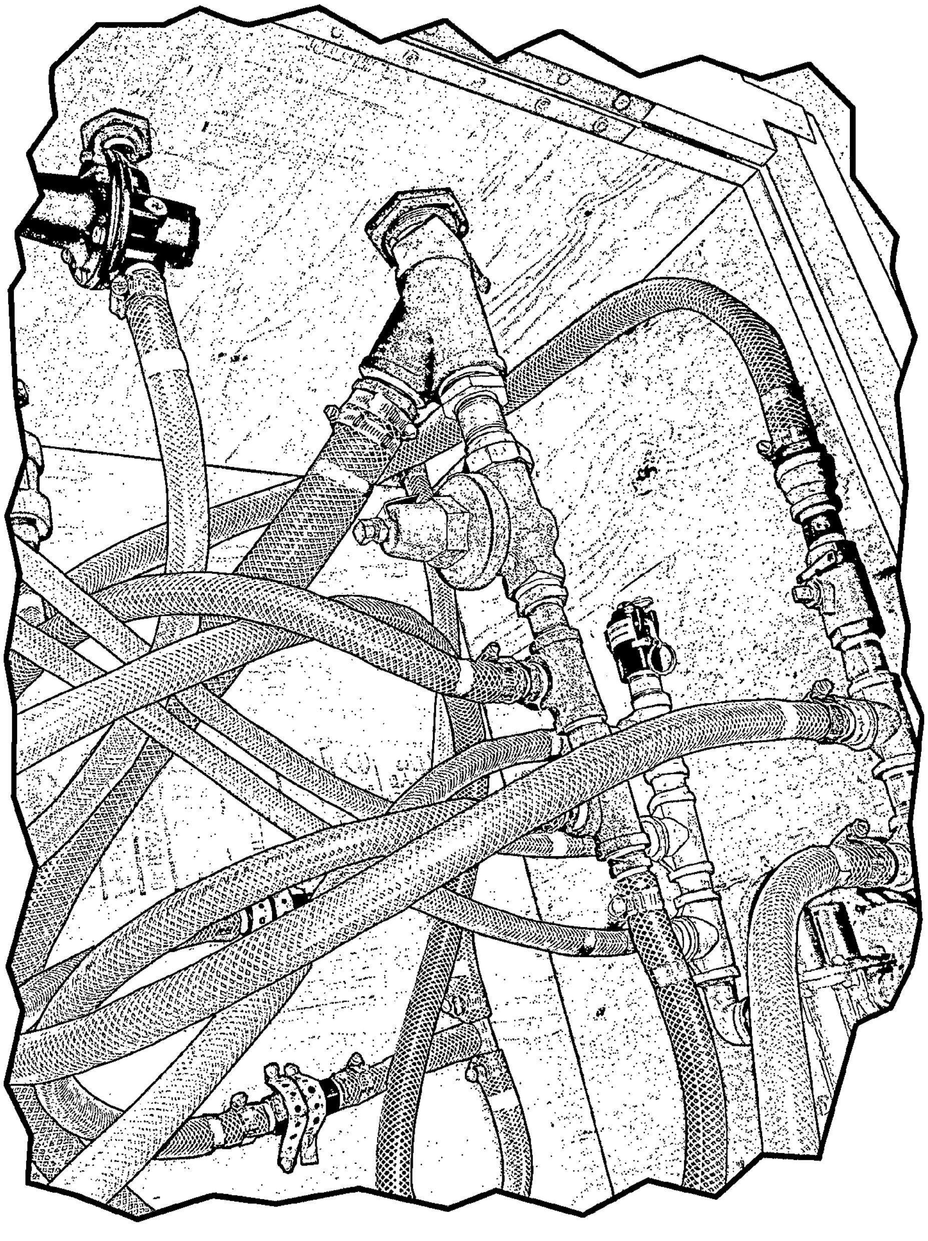
Figure 14D:
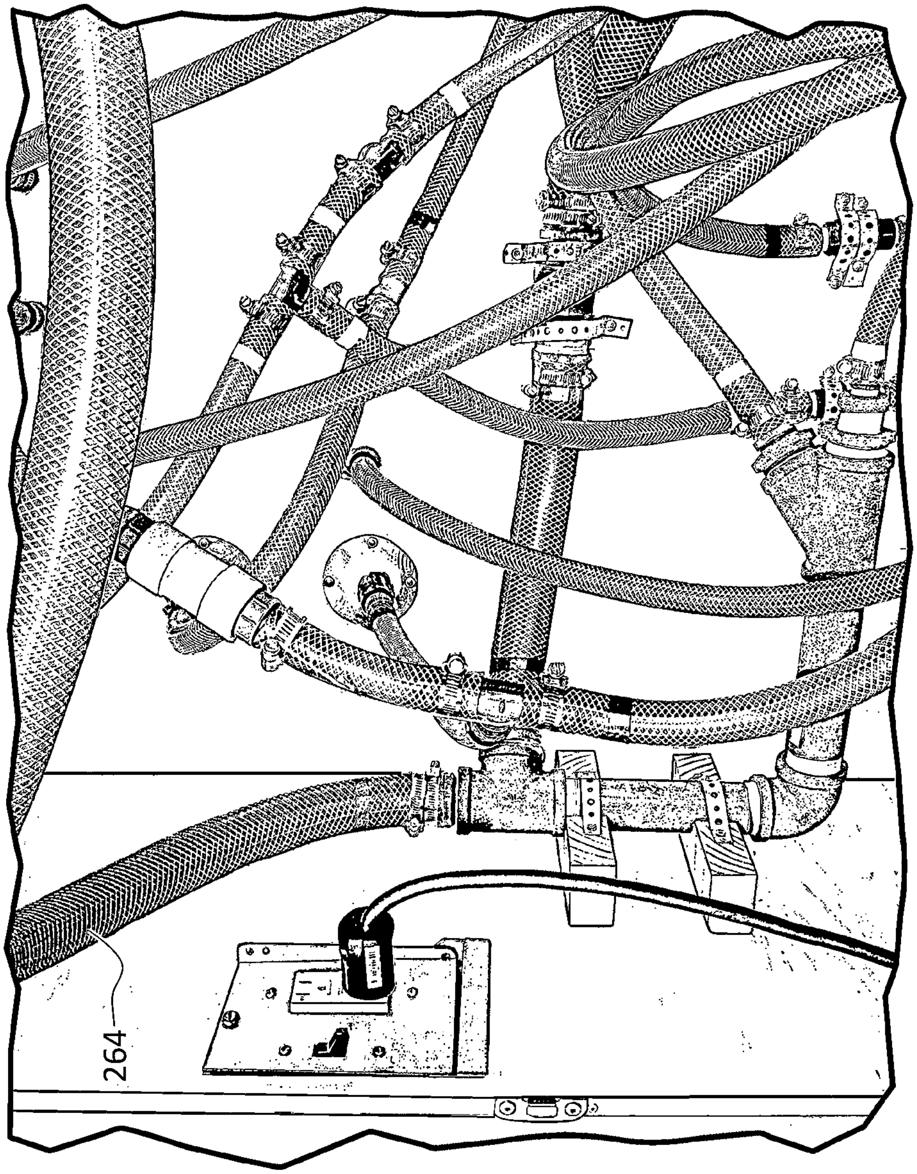

After the merged (grown) and structured (improved homogeneity) cells exit section 278, they enter a portion of flowpath, parts of which can be within housing 261, and parts of which can be outside of housing 261, in which the flowpath is adapted and configured to encourage laminar flow of the foam 228 (as best seen in FIGS. 15E, 14A, and 14B). It can be seen that the outer diameter of the flowpath from the outlet 264 to the outlet 228-1 mounted on cabinet 42 (as best seen in FIGS. 12B and 14A) is of substantially the same size as the outer diameter of nucleation chamber 260. However, the cross section of nucleation chamber 260 (which can be visualized from FIGS. 15A and 15F) has a cross sectional flow area that is less than the cross sectional flow area of the plumbing downstream of exit 264 (as best seen in FIG. 14A), the cross sectional flow area of the foam flowpath within chamber 260 being partially blocked by materials 275 and 279. Flow section 282 (as best seen in FIGS. 14A and 14B) encourages laminar flow and also discourages turbulence that could otherwise reduce the quantity or quality of the foam. Still further, the output section of apparatus 260, along with the flow passageways extending to nozzle 230, are generally smooth, and with sufficiently gentle turn radii to further encourage laminar flow and discourage turbulence.

Figure 16C:
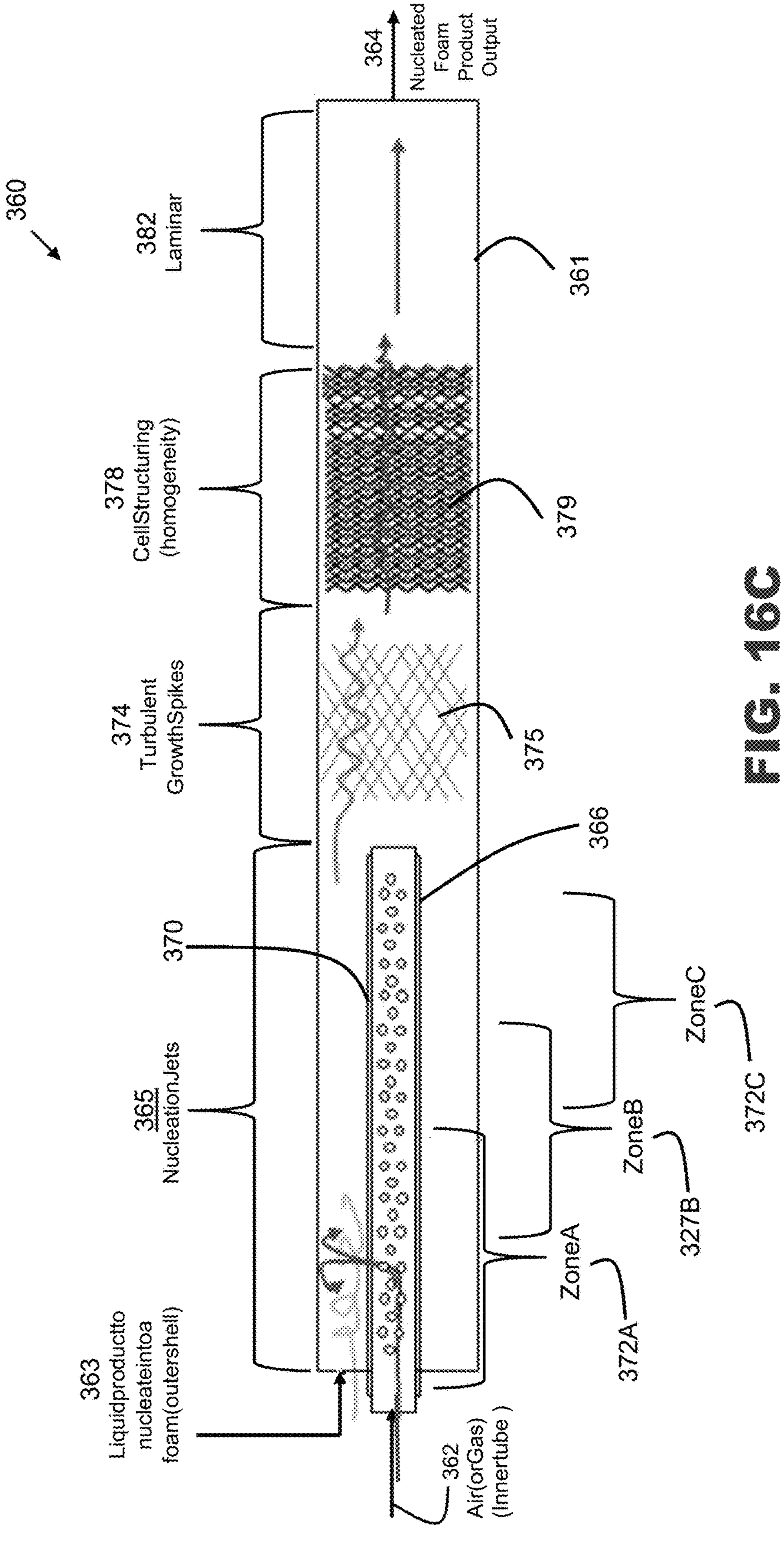

FIG. 16C shows a nucleation chamber 360 according to one embodiment of the present invention. Housing 361 includes a gas inlet 362, liquid inlet 363, and foam outlet 364, with a foam creation passageway located between the inlets and the outlet. Contained within housing 361 is a generally cylindrical gas tube 366 that receives gas under pressure from inlet 362. Although gas chamber 366 has been described as a cylindrical tube, yet other embodiments of the present invention contemplate internal gas chambers of any size and shape adapted and configured to provide a flow of gas into a flow of liquid such that a foam results.

Gas tube 366 is located generally concentrically within housing 361 (although a concentric location is not required), such that liquid from inlet 363 flows generally around the outer surface of tube 366. Tube 366 preferably includes a plurality of apertures 370 that are adapted and configured to flow gas from within tube 366 generally into the interior foam-creating passageway of housing 361. As shown in FIG. 16C, the apertures 370 are located generally along the length of tube 366, and preferably surrounding the circumference of tube 366.

Nucleation zone 365 includes jets or perforations 370 that are arranged in a plurality of subzones, the jets within such subzones 372 introducing gas into the flowing liquid at different angles of attack. A first nucleation zone 372*a* is located upstream of a second, intermediate nucleation zone 372*b*, which is followed by a third nucleation zone 372*c* (each of which is located along and spaced apart along the length of the gas chamber 366). As indicated on FIG. 16C, zone 372*b* overlaps both zones 372*a* and 372*c*, although other embodiments of the present invention contemplate more or less overlapping, including no overlapping.

The jets or perforations 370*a* within zone 372*a* are preferably adapted and configured to have an angle of attack that is generally opposite (or against) the prevailing flow of liquid (which flow is from left to right, as viewed in FIG. 16C). As one example, the centerline of these jets 370*a* are about 30-40 degrees from a line extending normal to the centerline of the foam flowpath within chamber 360 (i.e., forming an angle 60-50 degrees with the centerline). Therefore, air exiting the perforations 370*a* within zone 372*a* imparts energy to the flow of the surrounding liquid that acts to slow the liquid (i.e., a velocity vector for gas exiting a nozzle 370*a* has a component that is opposite to the velocity vector of the liquid flowing from left to right within FIG. 16C of chamber 360).

The nucleation jets 370 within zone 372*b* are angled so as to impart a rotational swirl to the fluid within the foam flowpath. In one embodiment, the nucleation jets 370*b* are angled about 30-40 degrees from a normal line extending from the flowpath centerline, in a direction to impart tornado-like rotation within nucleation chamber 360.

A third nucleation zone 372*c* includes a plurality of jets 370*c* that are angled about 30-40 degrees in a direction so as to axially push liquid generally in the overall direction of flow within the foam flowpath (i.e., from left to right, and generally opposite of the angular orientation of jets 370*a*).

It is further understood that the perforations or nucleation jets 372 within a zone 370 may have angles of attack as previously described in their entirety among all jets or only partly in some of the jets. Yet other embodiments of the present invention contemplate zones 372*a*, 372*b*, 372*c* in which only some of the jets 370*a*, 370*b*, or 370*c*, respectively, are angled as previously described, with the remainder of the jets 370*a*, 370*b*, or 370*c*, respectively, being oriented differently. Still further, although what has been shown and described is a first zone A with an angle of attack opposite to that of fluid flow and followed by a second section zone B having jets with angles of attack oriented to impart swirl, and then followed by a third section zone C having jets with an angle of attack oriented so as to push foam toward the outlet, it is understood that various embodiments of the present invention contemplate still further arrangements of angled jets. As one example, yet other embodiments contemplate a fluid swirling section located at either the beginning or the end of the nucleation zone. As yet another example, still further embodiments contemplate a counter flow section (previously described as zone 372*a*) located toward the distal most end of the nucleation zone (i.e., oriented closer toward the growth section 374). In still further embodiments, there are nucleation zones comprising fewer than all three of the zones A, B, and C, including those embodiments having holes arranged with only one of the characteristics of the previously described zones A, B, and C.

Figure 16D:
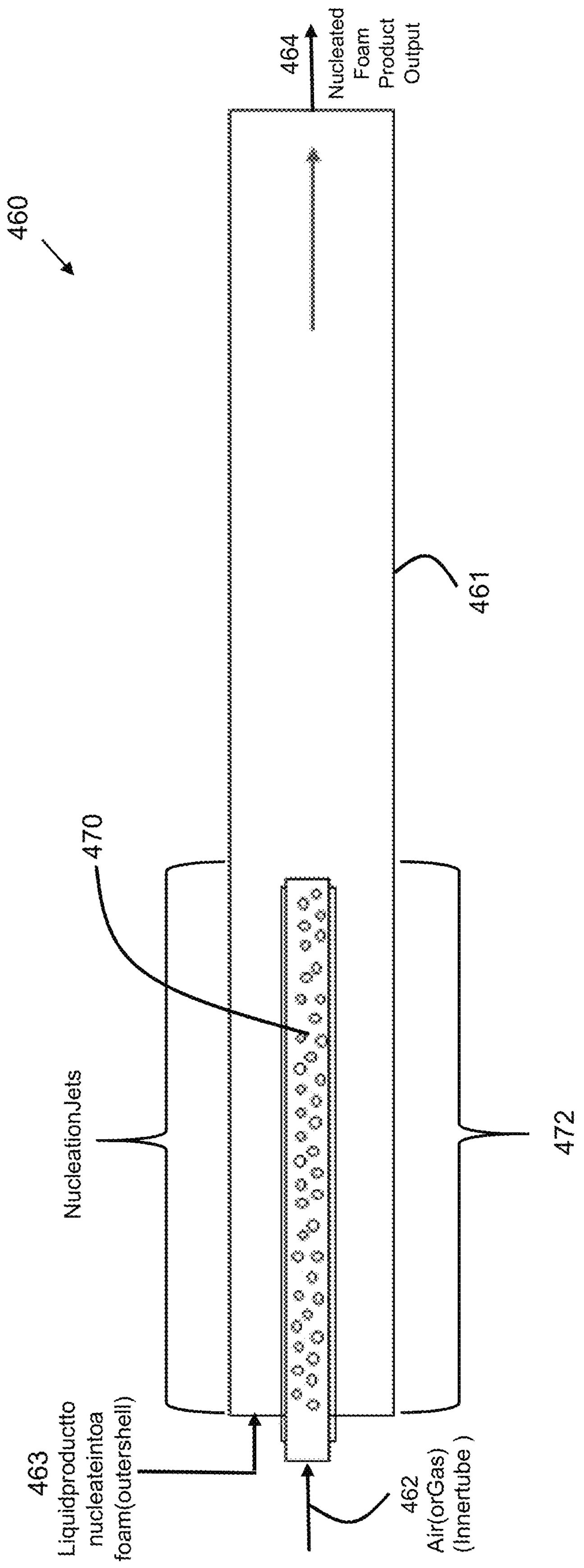

FIG. 16D shows a nucleation chamber 460 according to one embodiment of the present invention. Housing 461 includes a gas inlet 462, liquid inlet 463, and foam outlet 464, with a foam creation passageway located between the inlets and the outlet. Contained within housing 461 is a generally cylindrical gas tube 466 that receives gas under pressure from inlet 462. Although gas chamber 466 has been described as a cylindrical tube, yet other embodiments of the present invention contemplate internal gas chambers of any size and shape adapted and configured to provide a flow of gas into a flow of liquid such that a foam results.

Gas tube 466 is located generally concentrically within housing 461 (although a concentric location is not required), such that liquid from inlet 463 flows generally around the outer surface of tube 466. Tube 466 preferably includes a plurality of apertures 470 that are adapted and configured to flow gas from within tube 466 generally into the interior foam-creating passageway of housing 461. As shown in FIG. 16D, the apertures 470 are located generally randomly along the length of tube 466, and preferably surrounding the circumference of tube 466. However, yet other embodiments of the present invention contemplate apertures 470 having locations limited to certain select portions of tube 466, such as toward the inlet, toward the outlet, generally in the middle, or any combination thereof.

Figure 16E:
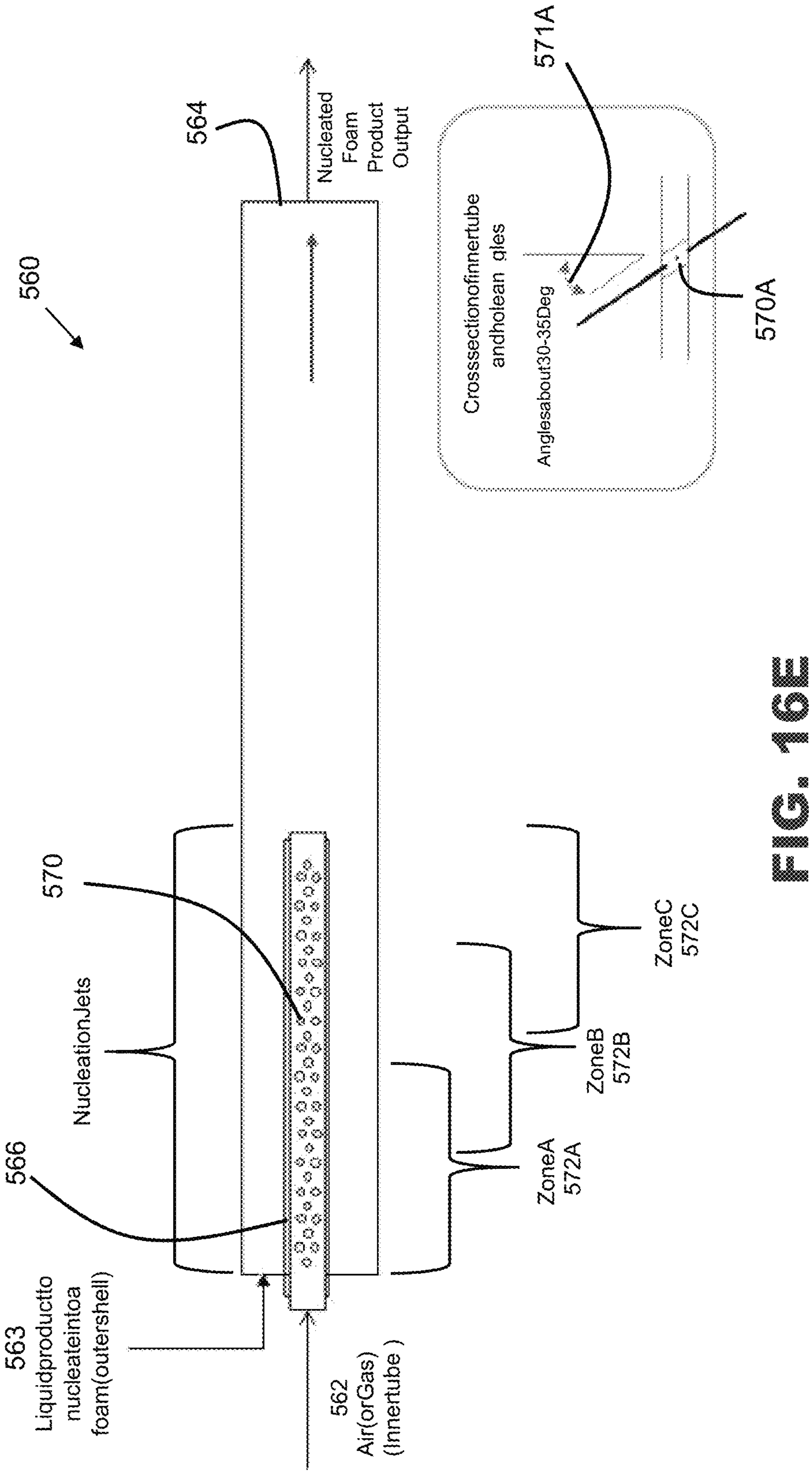

FIG. 16E shows a nucleation chamber 560 according to one embodiment of the present invention. Housing 561 includes a gas inlet 562, liquid inlet 563, and foam outlet 564, with a foam creation passageway located between the inlets and the outlet. Contained within housing 561 is a gas chamber or plenum 566 that receives gas under pressure from inlet 562. Although gas chamber 566 has been described as a cylindrical tube, yet other embodiments of the present invention contemplate internal gas chambers of any size and shape adapted and configured to provide a flow of gas into a flow of liquid such that a foam results.

Gas tube 566 is located generally concentrically within housing 561 (although a concentric location is not required), such that liquid from inlet 563 flows generally around the outer surface of tube 566. Tube 566 preferably includes a plurality of apertures 570 that are adapted and configured to flow gas from within tube 566 generally into the interior foam-creating passageway of housing 561. As shown in FIG. 16E, the apertures 570 are located generally along the length of tube 566, and preferably surrounding the circumference of tube 566. However, yet other embodiments of the present invention contemplate apertures 570 having locations limited to certain select portions of tube 566, such as toward the inlet, toward the outlet, generally in the middle, or any combination thereof.

The apertures within zones 572*a*, 572*b*, and 572*c*, are arranged generally as described previously with regards to nucleation chamber 560. FIG. 16E includes an inset drawing showing a single nucleation jet 570*a* having an angle of attack 571*a*. The velocity vector of the gas exiting jet 570*a* includes a velocity component that is adverse (i.e., upstream) to the overall flow direction of the foam flowpath from inlets 562 and 563 to exit 564.

Figure 16F:
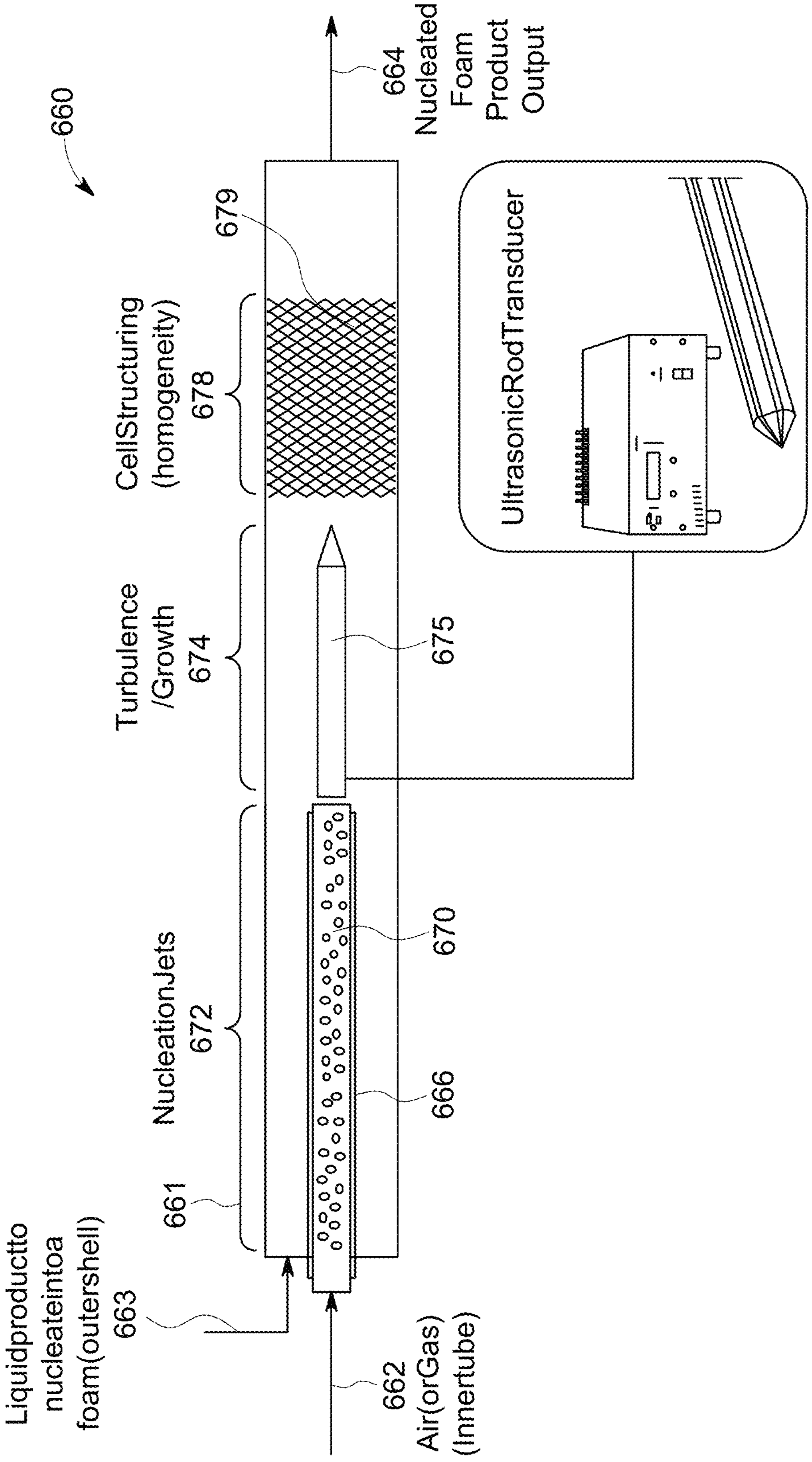

FIG. 16F shows a nucleation chamber 660 according to one embodiment of the present invention. Housing 661 includes a gas inlet 662, liquid inlet 663, and foam outlet 664, with a foam creation passageway located between the inlets and the outlet. Contained within housing 661 is a generally cylindrical gas tube 666 that receives gas under pressure from inlet 662. Although gas chamber 666 has been described as a cylindrical tube, yet other embodiments of the present invention contemplate internal gas chambers of any size and shape adapted and configured to provide a flow of gas into a flow of liquid such that a foam results.

Gas tube 666 is located generally concentrically within housing 661 (although a concentric location is not required), such that liquid from inlet 663 flows generally around the outer surface of tube 666. Tube 666 preferably includes a plurality of apertures 670 that are adapted and configured to flow gas from within tube 666 generally into the interior foam-creating passageway of housing 661. As shown in FIG. 16F, the apertures 670 are located generally along the length of tube 666, and preferably surrounding the circumference of tube 666. However, yet other embodiments of the present invention contemplate apertures 670 having locations limited to certain select portions of tube 666, such as toward the inlet, toward the outlet, generally in the middle, or any combination thereof.

The foam within nucleation chamber 660 is first created within a nucleation zone 665 that includes the initial mixing of gas and liquid streams as previously discussed. As the foam leaves this zone, it flows into a downstream growth section 674 and passes over and around an ultrasonic transducer 675. In one embodiment, transducer 675 is a rod (as shown), although in yet other embodiments it is understood that the ultrasonic transducer is adapted and configured to provide sonic excitation to the foam exiting from nucleation zone 665, and can be of any shape. For example, yet other embodiments of the present invention contemplate a transducer having a generally cylindrical shape, such that the foam flows through the inner diameter of the cylinder, and in some embodiments in which the transducer is smaller than the inner diameter of flowpath 661, the foam also passes over the outer diameter of the transducer. Further, although one embodiment includes a transducer that is excited at ultrasonic frequencies, it is understood that yet other embodiments contemplate sensors that vibrate and impart vibrations to the nucleated foam at any frequency, including sonic frequencies and subsonic frequencies.

Referring to the smaller inset figure of FIG. 16F, transducer 675 is preferably excited by an external, electronic source. In one embodiment, the source provides an oscillating output voltage that excites a piezoelectric element within transducer 675. It has been found that the use of a vibrating transducer is effective to convert a substantial amount of the provided liquid into foam. Various embodiments of the present invention contemplate exciting vibrations in transducer 675 with any type oscillating input, including one or more single frequencies, frequency sweeps over a range, or random frequency inputs over a frequency range. In one trial, a transducer provided by Sharpertek was excited at frequencies in excess of 25 kHz. Although a generally cylindrical transducer rod is shown, yet other embodiments contemplate vibrating transducers of any shape, including side mounted transducers, which can be used in a rectangularly-shaped chamber in order that the liquids and gas within the chamber flow close to the transducers for improved effect. Still further, it is understood that electronic excitation of transducer 675 is contemplated in some embodiments, whereas in other embodiments transducer 675 can be excited by other mechanical means, including by hydraulic or pneumatic inputs. Still further, yet other embodiments contemplate the use of a vibration table within cabinet 42 so as to physically shake the nucleation chamber. In such embodiments, the inlets and outlet of the nucleation chamber are coupled to other plumbing within the cabinet by flexible attachments.

As the larger foam cells exit growth section 674, they enter a cell structuring section 678 that preferably includes a material 679 within the internal foam passage of housing 661. The material 679 of cell-structuring section 678 is adapted and configured to receive a first, larger distribution of foam cell sizes from section 674, and provide to output 664 a second, smaller, and tighter distribution of cell sizes. In some embodiments, the structuring material 679 includes a mesh.

Figure 16G:
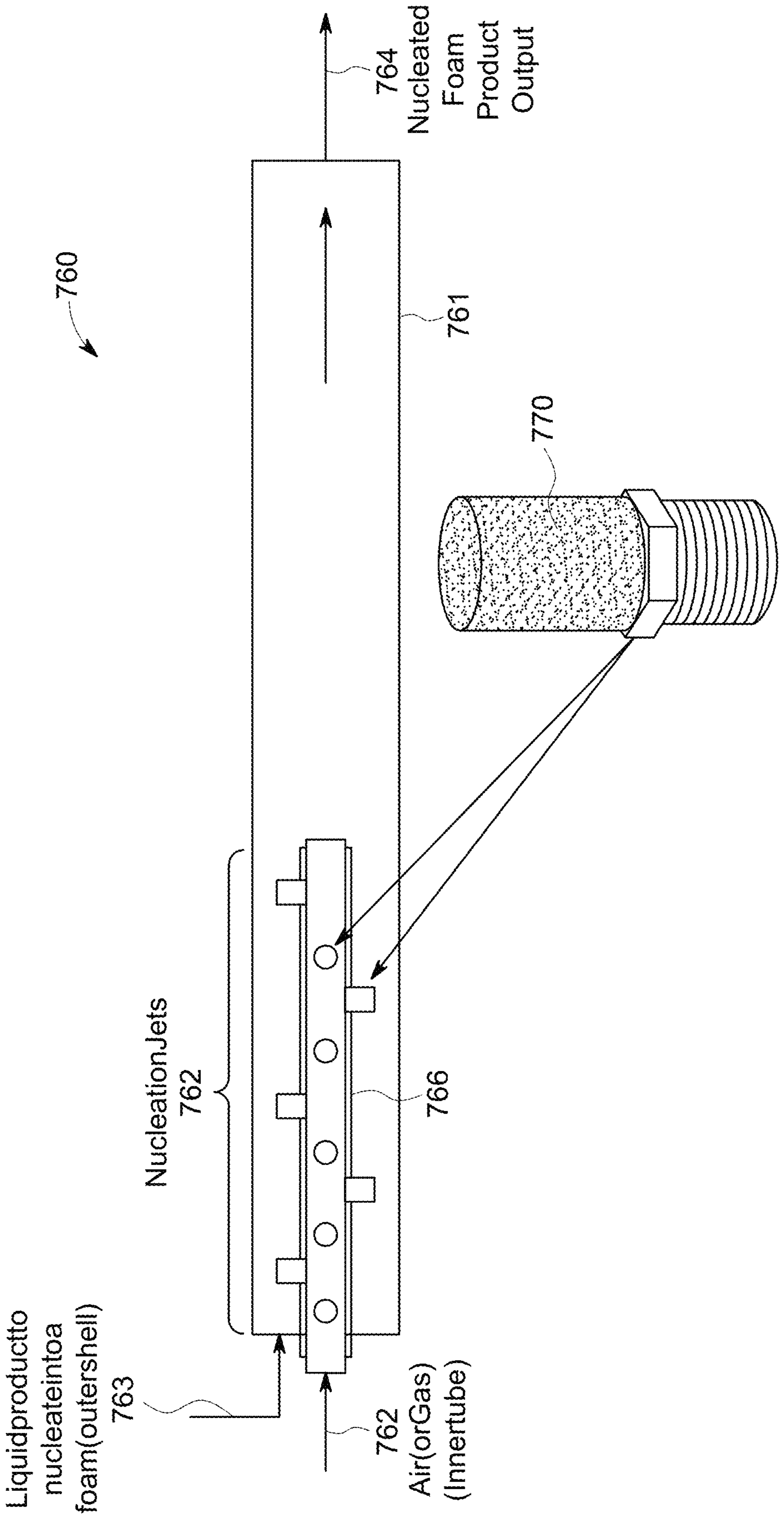

FIG. 16G shows a nucleation chamber 760 according to one embodiment of the present invention. Housing 761 includes a gas inlet 762, liquid inlet 763, and foam outlet 764, with a foam creation passageway located between the inlets and the outlet. Contained within housing 761 is a generally cylindrical gas tube 766 that receives gas under pressure from inlet 762. Although gas chamber 766 has been described as a cylindrical tube, yet other embodiments of the present invention contemplate internal gas chambers of any size and shape adapted and configured to provide a flow of gas into a flow of liquid such that a foam results.

Gas tube 766 is located generally concentrically within housing 761 (although a concentric location is not required), such that liquid from inlet 763 flows generally around the outer surface of tube 766. Tube 766 preferably includes a plurality of nucleation devices 770, each of which include a plurality of small holes for the passage of air. As shown in the inset figure of FIG. 16G, in one embodiment the device 770 is a porous metal filter-muffler, such as those made by Alwitco of North Royalton, Ohio. These devices include a porous metal member attached to a threaded member. Air is provided through the threaded member to the porous material, which in one embodiment includes a variety of holes surrounding the periphery and end of the porous member, the holes being anywhere from about ten to one-hundred microns in diameter. Still other embodiments contemplate the use of porous metal breather-vent-filters, such as those provided by Alwitco. Still further embodiments contemplate devices 770 including gas exit flowpaths similar to those of the Alwitco microminiature and mini-muff mufflers.

More generally, device 770 includes an internal flowpath that receives gas under pressure from within chamber 766. An end of the device 770 includes a plurality of holes (achieved such as by use of porous metal, or achieved by drilling, stamping, chemically etching, photoetching, electrodischarge machining, or the like) in a pattern (random or ordered) such that gas from the internal passageway of device 770 flows into the surrounding mixture of liquids and creates foam. As best seen in FIG. 16G, in some embodiments the porous end of device 770 is cylindrical and extends into the liquid flowpath, whereas in yet other embodiments, the porous end is generally flush, and in yet other embodiments can be of any shape. In some embodiments, device 770 has porosity that is directionally oriented, such that the protruding end of the device is generally nonporous on the upstream side, and the downstream side of the device is porous. In such embodiments, the foam is created in the wake of the liquids as they pass over the protruding body of device 770. As depicted in FIG. 16G, in some embodiments, there are a plurality of devices 770 located along the length and around the circumference (or otherwise extending from) the gas chamber 766.

Sill further embodiments contemplate a gas chamber 766 that is fabricated from a porous metal, such as the porous metal discussed above. In such embodiments, gas escapes from the chamber and into the liquid flowpath along the entire length of the porous structure. Still further, some embodiments contemplate gas chambers that are constructed from a material that includes a plurality of holes (formed by drilling, stamping, chemically etching, photoetching, electrodischarge machining, or the like).

Figure 16H:
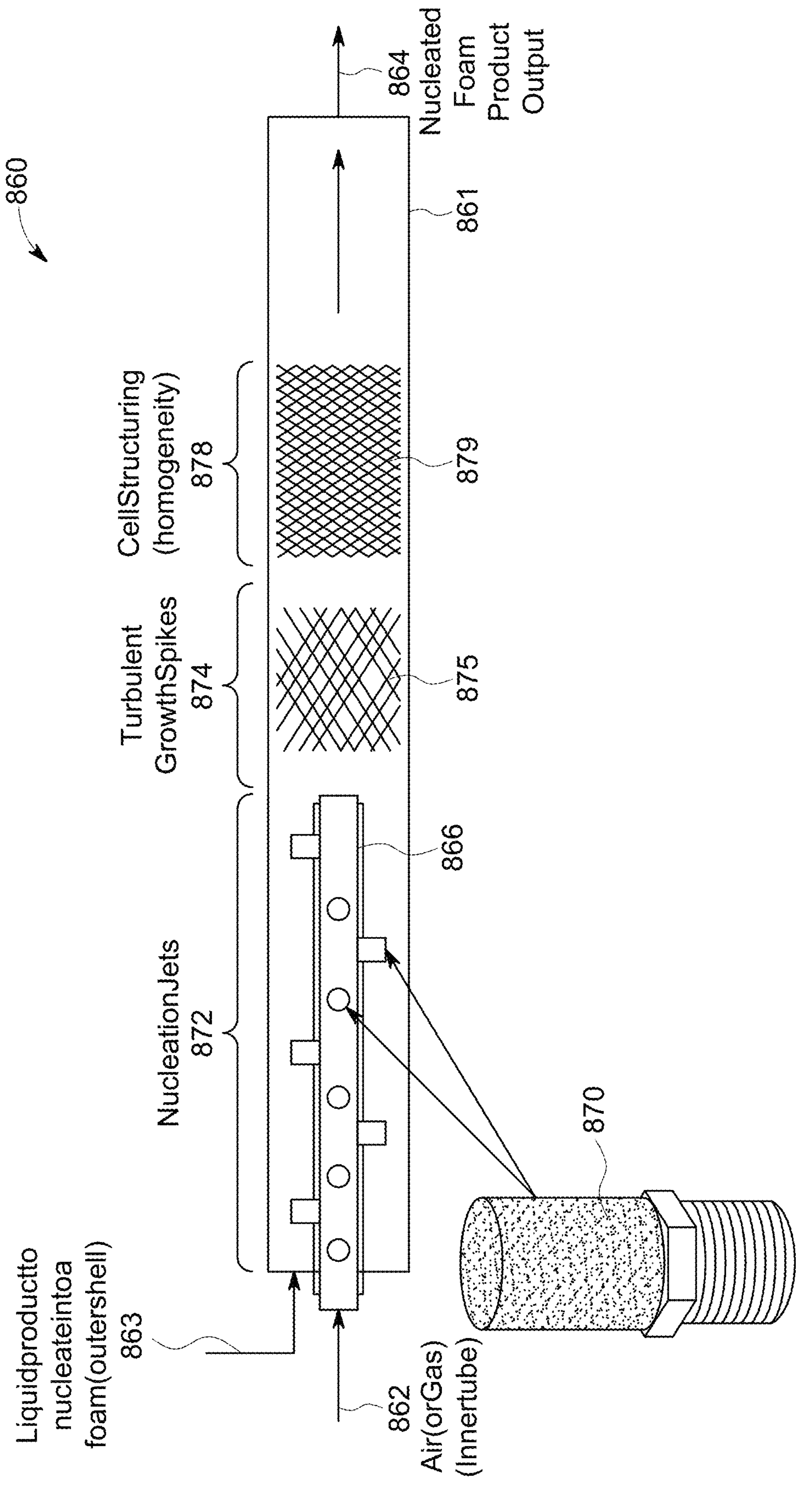

FIG. 16H shows a nucleation chamber 860 according to one embodiment of the present invention. Housing 861 includes a gas inlet 862, liquid inlet 863, and foam outlet 864, with a foam creation passageway located between the inlets and the outlet. Contained within housing 861 is a generally cylindrical gas tube 866 that receives gas under pressure from inlet 862. Although gas chamber 866 has been described as a cylindrical tube, yet other embodiments of the present invention contemplate internal gas chambers of any size and shape adapted and configured to provide a flow of gas into a flow of liquid such that a foam results.

Gas tube 866 is located generally concentrically within housing 861 (although a concentric location is not required), such that liquid from inlet 863 flows generally around the outer surface of tube 866. Tube 866 preferably includes a plurality of devices 870 similar to the nucleation jets 770 described previously.

The foam within nucleation chamber 860 is first created within a nucleation zone 872 that includes the initial mixing of gas and liquid streams as previously discussed. As the foam leaves this zone, it flows into a downstream growth section 874 and passes over a corresponding growth material 875. In some embodiments, material 875 is a mesh preferably formed from a metallic material. Plastic materials can also be substituted, provided that the organic material can withstand exposure to the liquids 822 used for cleaning. It is further contemplated by yet other embodiments that material 875 can be materials other than a mesh.

As the larger foam cells exit growth section 874, they enter a cell structuring section 878 that preferably includes a material 879 within the internal foam passage of housing 861. The material 879 of cell-structuring section 878 is adapted and configured to receive a first, larger distribution of foam cell sizes from section 874, and provide to output 864 a second, smaller, and tighter distribution of cell sizes. In some embodiments, the structuring material 879 includes a mesh formed from a metal, with the cell size of the mesh of section 878 being smaller than the mesh size of growth section 874. In one trial, a device 860 was successful in converting much of the liquids to foam.

Figure 16I:
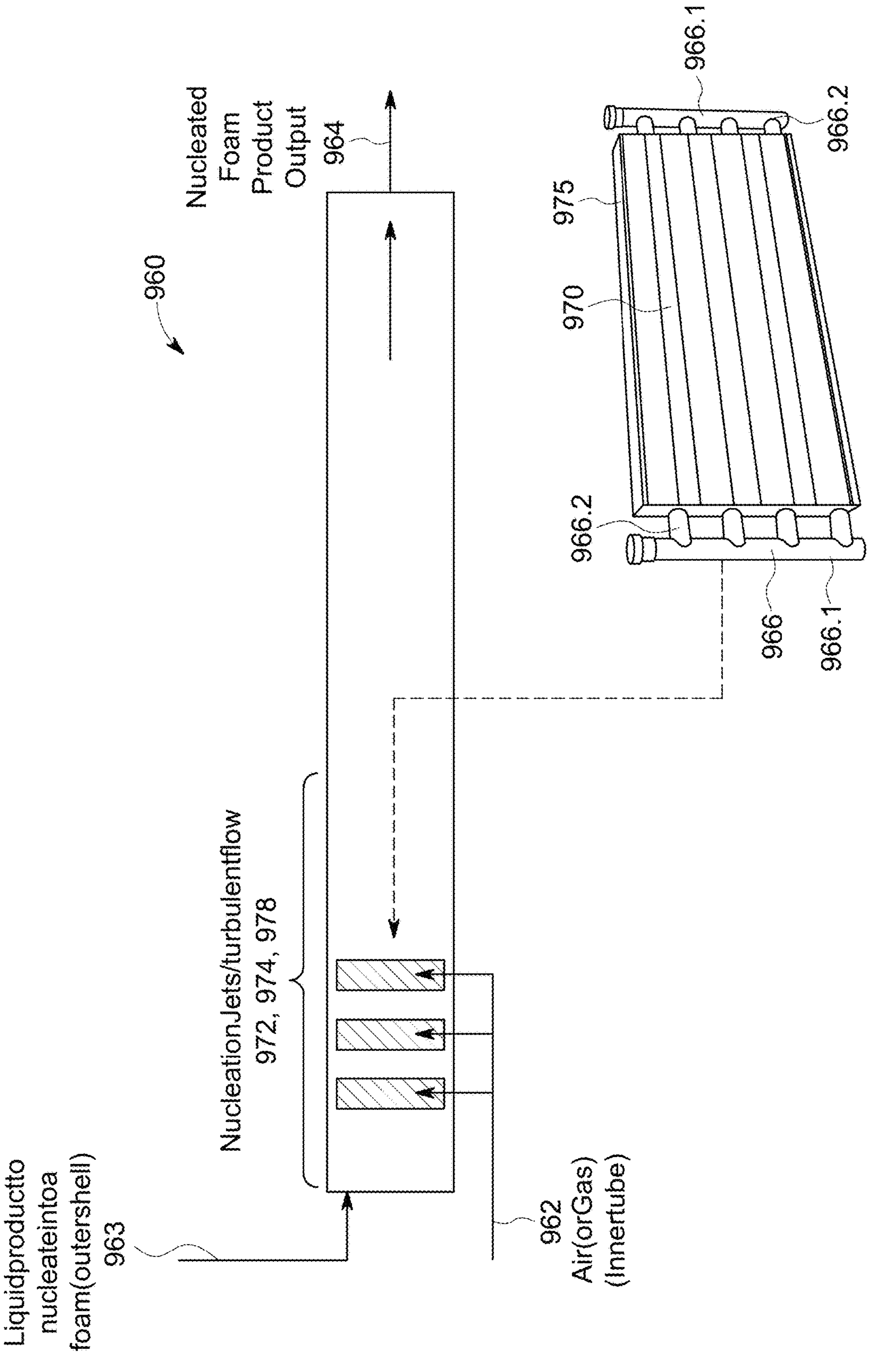

FIG. 16I shows a nucleation chamber 960 according to one embodiment of the present invention. Housing 961 includes a gas inlet 962, liquid inlet 963, and foam outlet 964, with a foam creation passageway located between the inlets and the outlet. Contained within housing 961 is a generally cylindrical chamber 966 that receives gas under pressure from inlet 962.

Gas chamber 966 is located generally within the foam flowpath of chamber 960, such that liquid from inlet 963 flows generally around the outer surfaces of chamber 966. In one embodiment and as depicted in the inset figure of FIG. 16I, chamber 966 comprises a plurality of radiator-like structures within the foam flowpath. Each structure includes one or more main feed pipes 966.1 that provide gas from inlet 962 to one or more cross tubes 966.2 that extend across the foam flowpath. Each of these cross pipes 966.2 includes a plurality of nucleation jets 970 through which gas exits into the flowing liquid. In one embodiment, the cross tubes 966.2 are generally in close contact with a plurality of fin-like member 975 that generally extend across some or all of the cross tubes 966.2. This chamber 966 therefore combines the nucleation zone 972 and growth and/or homogenizing sections 974 and 978, respectively, into a single device. The result is that liquids enter into the upstream side of device 966, and a foam exits from the downstream side of device 966. In one embodiment, device 966 is similar to a computer chip cooling radiator and heat sink.

Figure 16J:
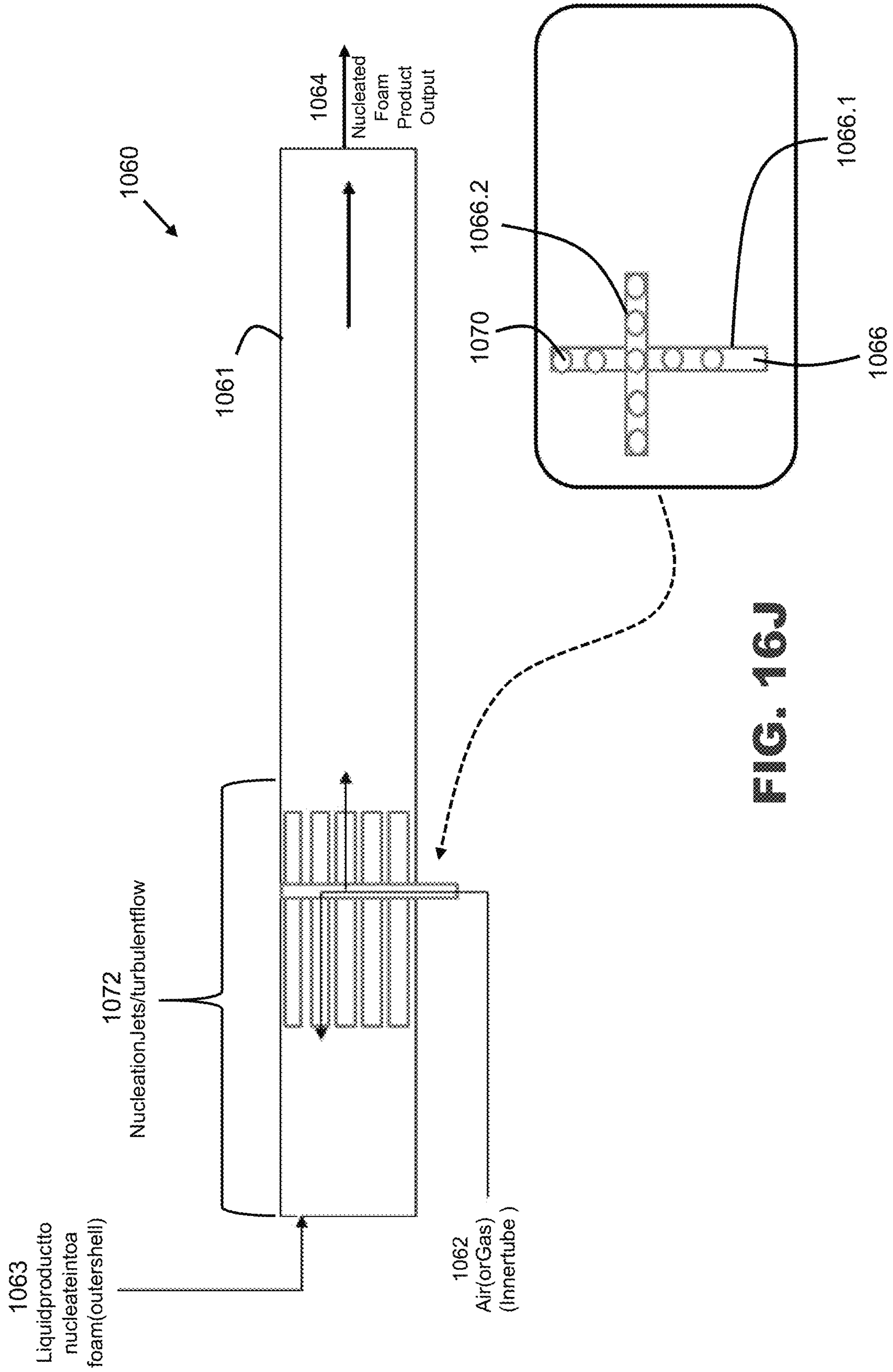

FIG. 16J shows a nucleation chamber 1060 according to one embodiment of the present invention. Housing 1061 includes a gas inlet 1062, liquid inlet 1063, and foam outlet 1064, with a foam creation passageway located between the inlets and the outlet. Contained within housing 1061 is a gas chamber 1066 that receives gas under pressure from inlet 1062.

In one embodiment, chamber 1066 includes a supply plenum 1066.1 that is in fluid communication with a plurality of longitudinally-extending tubes 1066.2. Preferably, each of tubes 1066.1 and 1066.2 extend within the flowpath of nucleation chamber 1060, and further incorporate a plurality of nucleation jets 1070. As seen in FIG. 16J, in some embodiments, the tubes 1066.2 are arranged longitudinally, such that liquid flows generally along the length of the tubes 1066.2. However, in other embodiments the tubes 1066.2 can further be arranged orthogonally, in a manner similar to the tubes 966.2 described with regards to nucleation chamber 960.

Figure 16K:
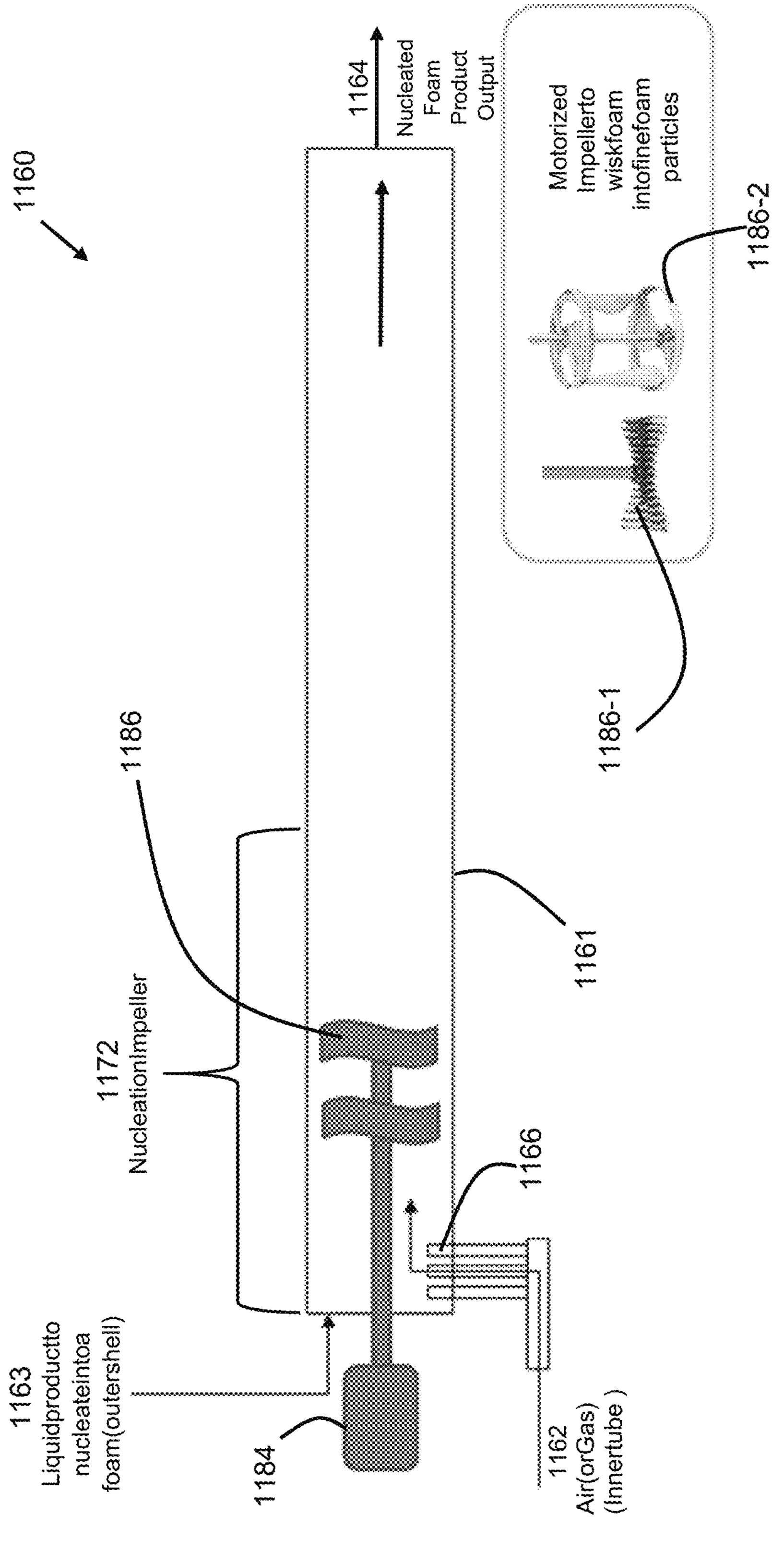
Figure 16L:
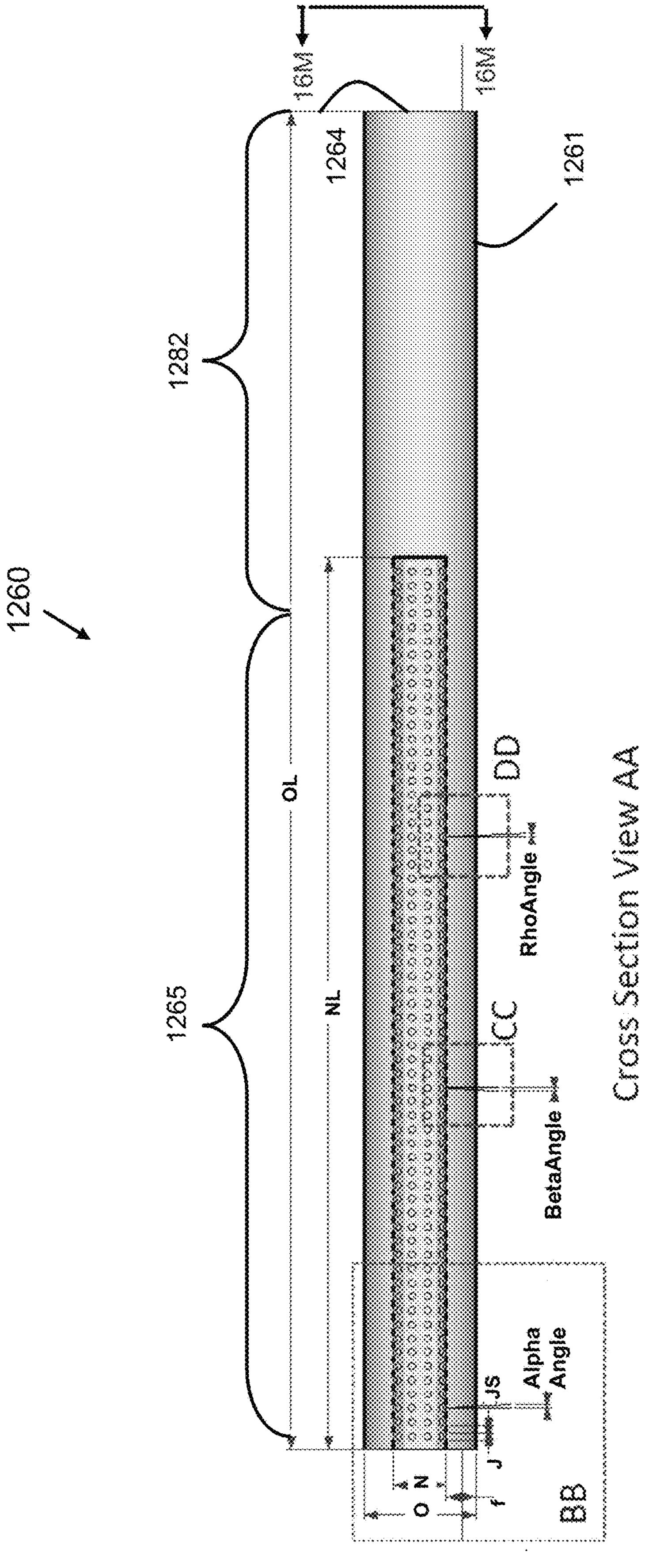
Figure 16M:
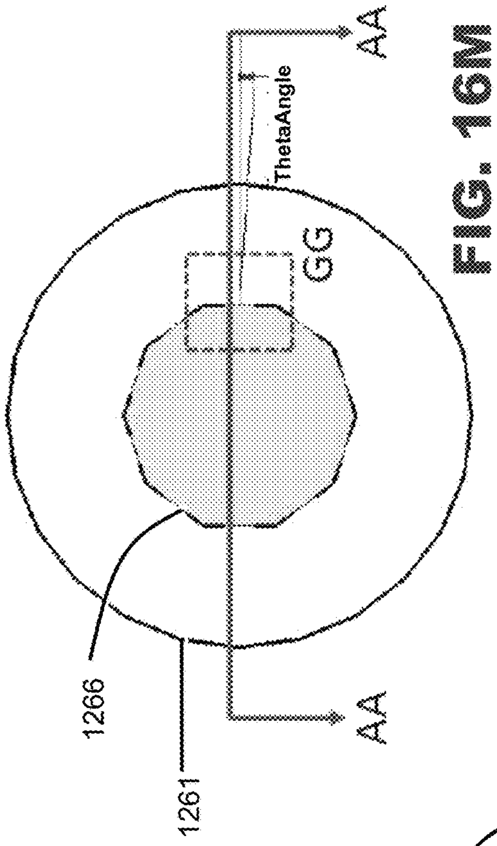
Figure 16N:
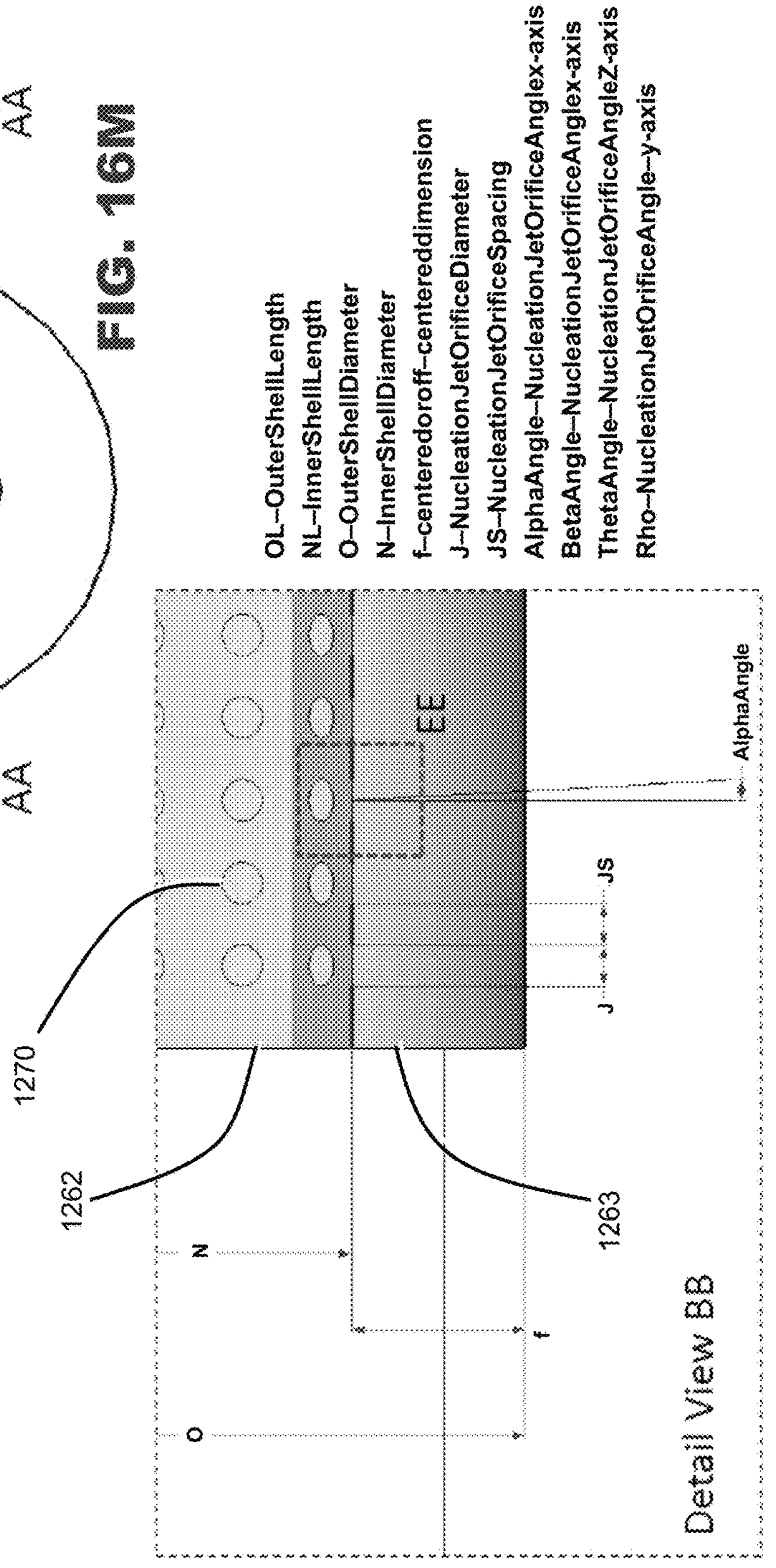

FIG. 16K shows a nucleation chamber 1160 according to one embodiment of the present invention. Housing 1161 includes a gas inlet 1162, liquid inlet 1163, and foam outlet 1164, with a foam creation passageway located between the inlets and the outlet. Contained within housing 1161 is a nucleation zone 1172 that includes both a plenum 1166 for releasing gas into the foam flowpath and a motorized mixing device that includes an impeller 1186 driven by a motor 1184. In one embodiment, impeller 1186 includes one or more curved stirring paddles connected to a shaft, and similar to a paint stirring device. Gas from an outlet tube of chamber 1166 is provided upstream of the stirring paddles. It has been found that foam created in this manner is acceptable, although with a wide variation in foam cell size. Still further embodiments include a cell structuring section 1178 (not shown) located downstream of nucleation section 1172. Still further examples of the stirring member are shown in the inset to FIG. 16K, including devices 1186-1 and 1186-2. In one application, nucleation device 1186-1 is similar to a coiled spring impeller, similar to those sold by McMaster Carr. In yet another embodiment, device 1186-2 is similar to configuration to the impeller of a hair dryer. In some embodiments, the foam prepared in chamber 1160 is preferably made with liquids 1163 provided at relatively lower flow rates.

Figures 16O, 16P, 16Q, 16R:
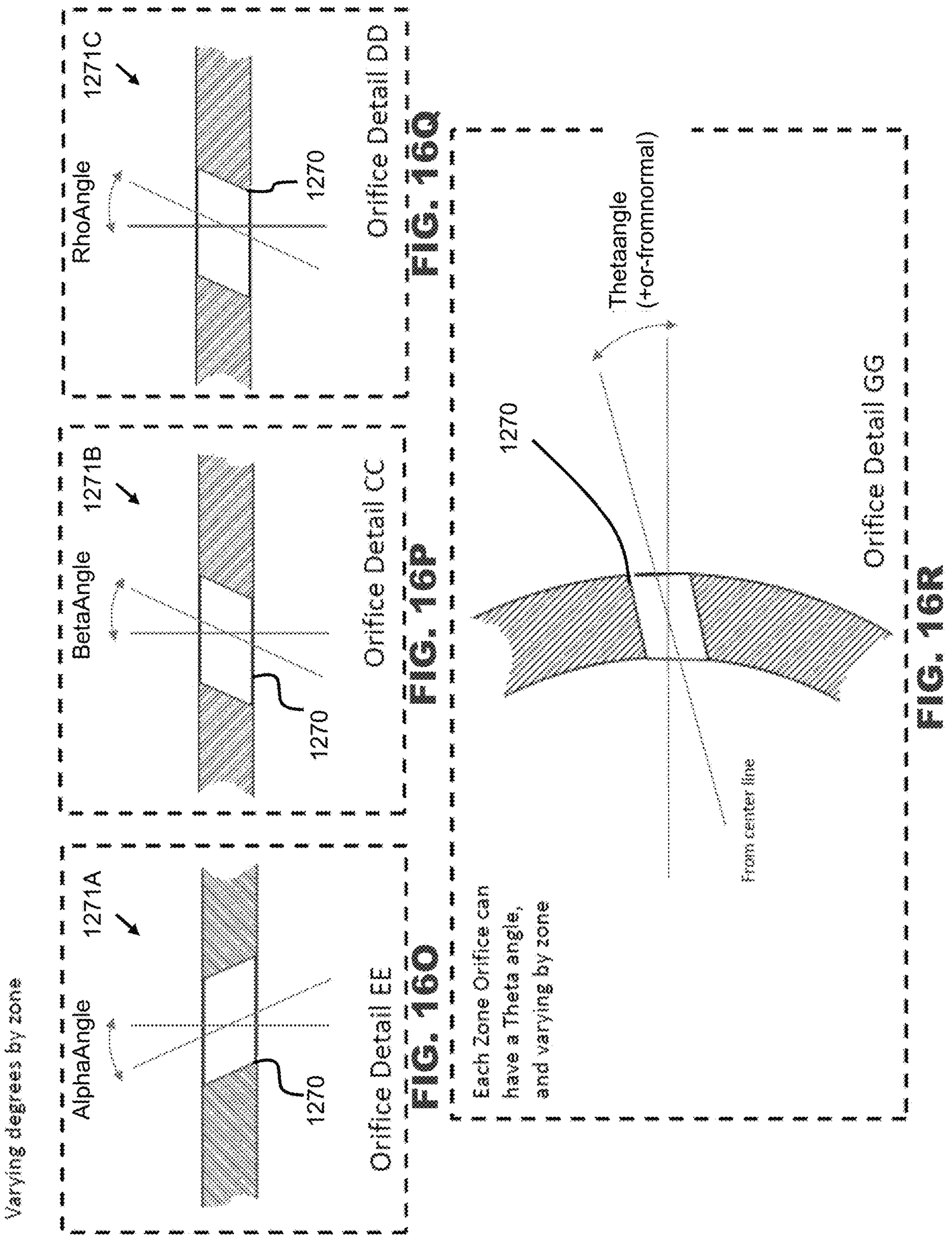
Figure 17A:
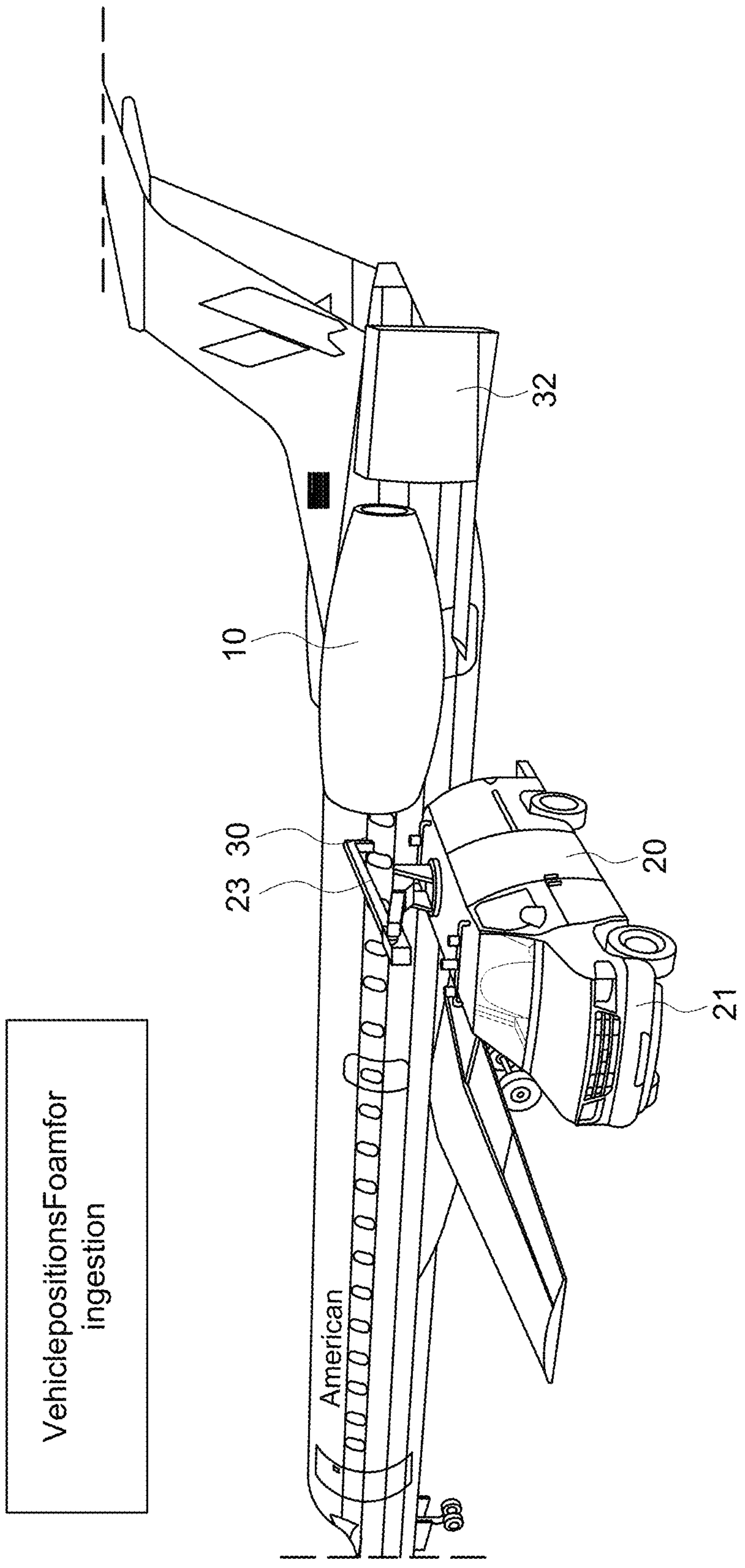
FIGS. 17A, 17B, and 17C are pictorial representations of an aircraft engine being cleaned with a system according to one embodiment of the present invention.
Figure 17B:
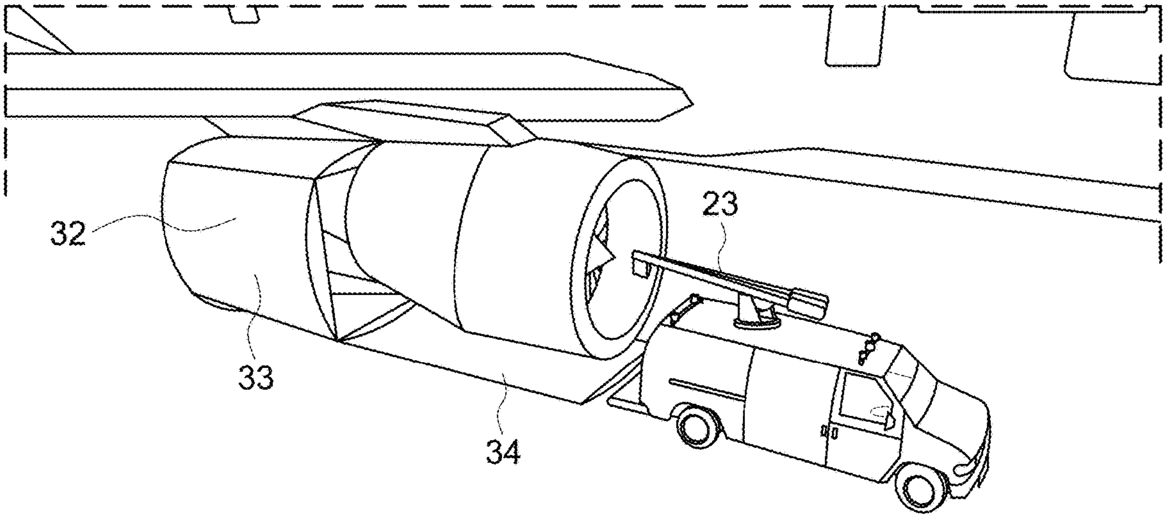
Figure 17C:
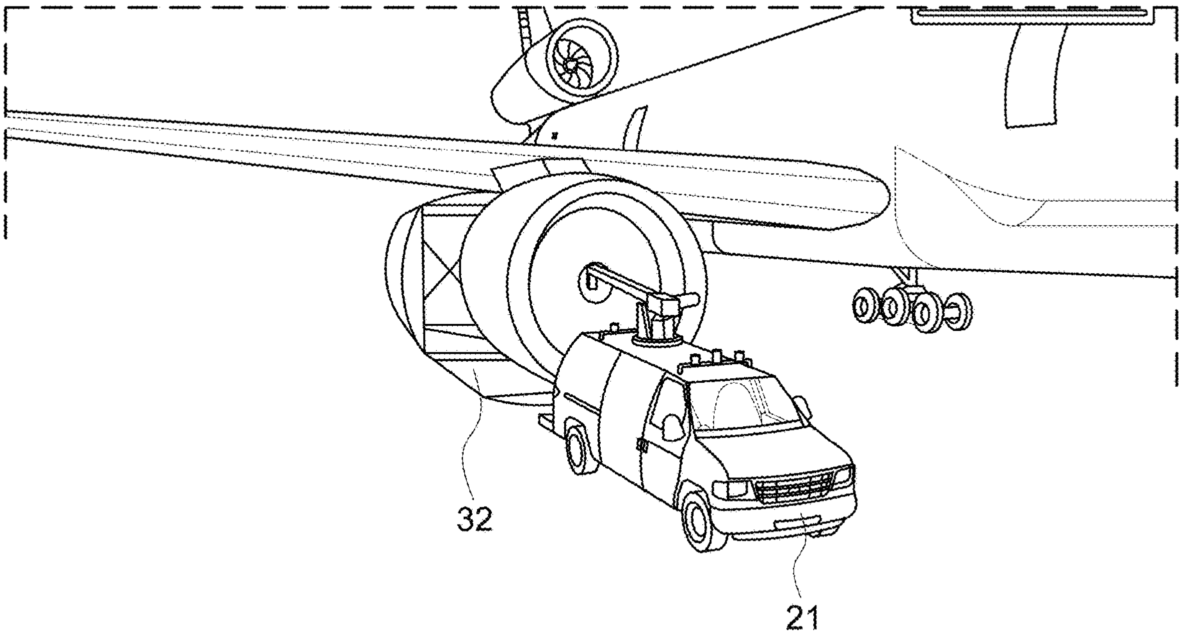
Figure 17D:
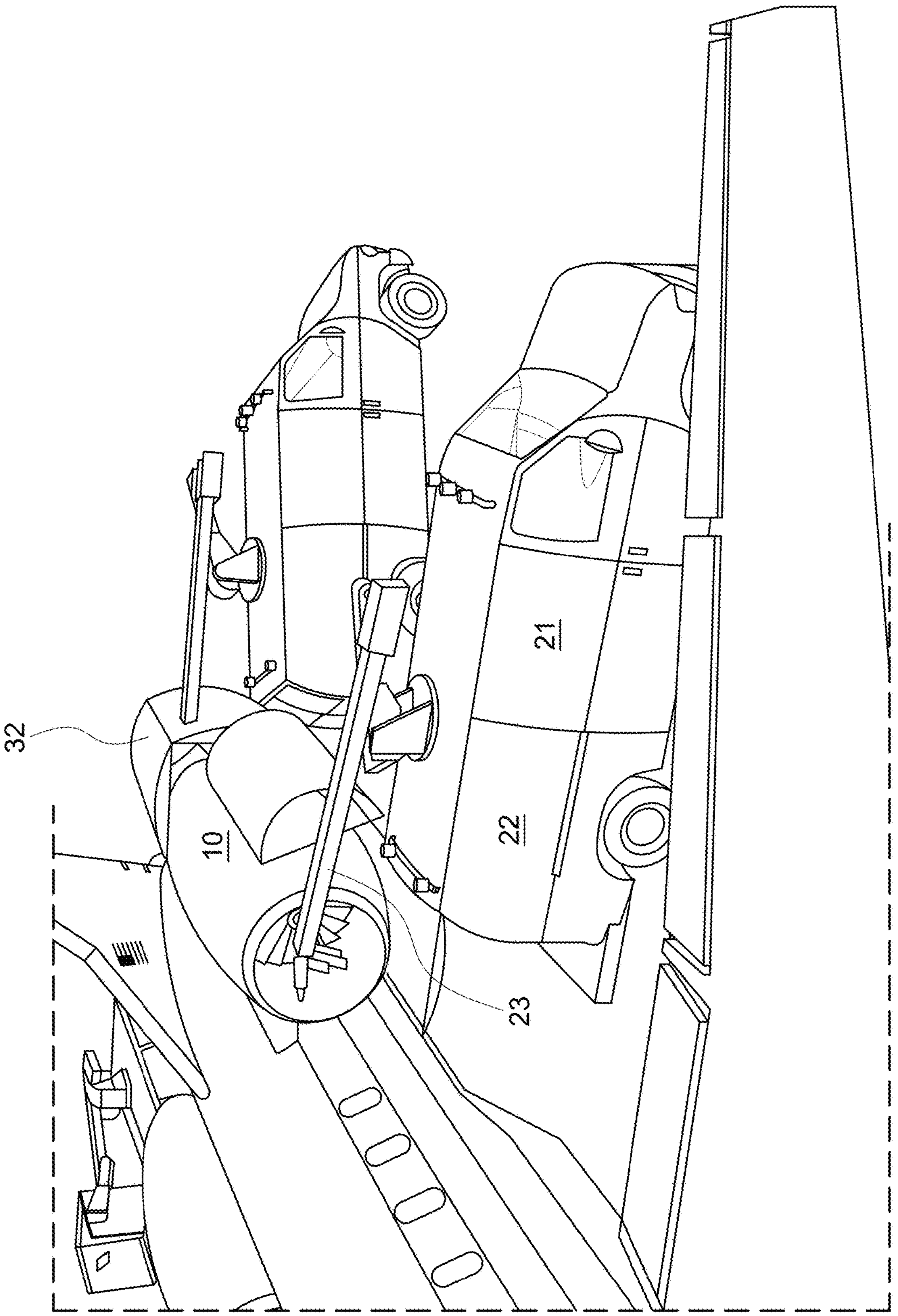
FIG. 17D is a CAD representation of an aircraft with installed engines being foam washed.
Figure 17E:
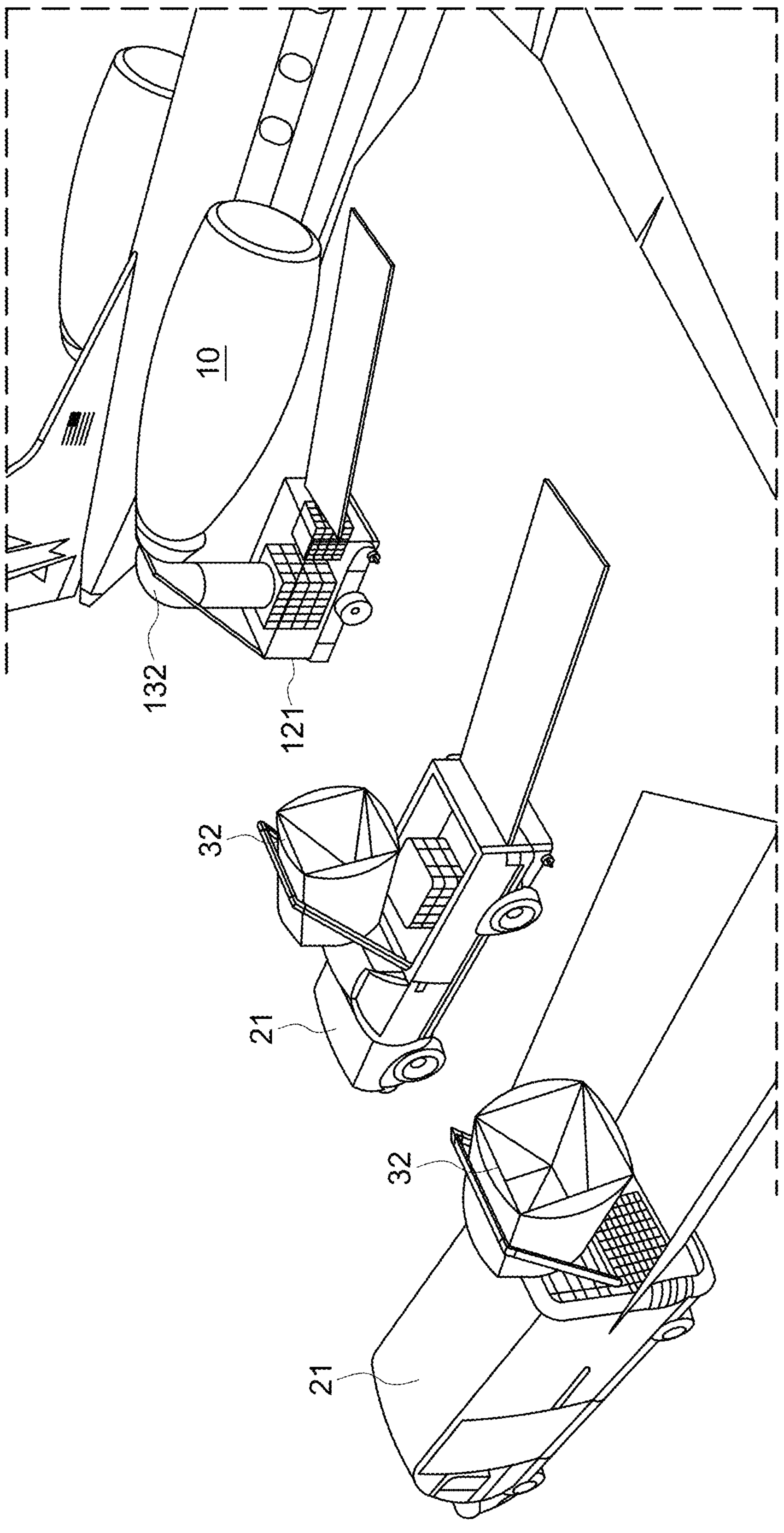
FIG. 17E is a CAD representation of a plurality of effluent collectors according to various embodiments of the present invention.

FIGS. 16L, 16M, 16N, 16O, 16P, 16Q, and 16R depict a nucleation chamber 1260 according to another embodiment of the present invention. These drawings show various angular relationships and other geometric relationships among the various components of a nucleation device 1260. FIG. 16O shows that the first zone of nucleation 1272*a* can include jets having a negative angle of attack, meaning that there can be a velocity component of the air exiting the gas plenum that is opposite to the general flow direction of the liquid flowing within the nucleation device. FIGS. 16P and 16Q show that downstream nucleation zones 1272*b* and 1272*c* can include injection angles for the air that include a velocity component in the same direction as the flow of the liquid (which is partially foamed, having already passed through the first zone 1272*a*). FIG. 16R further shows a nucleation jet 1270 that is oriented to provide swirl to the foamed mixture (i.e., rotation around the central axis of the nucleation device). It is further understood that various nucleation jets can have a combination of swirl angle as shown in FIG. 16R with any of the alpha, beta, or rho angles shown in FIGS. 16O, 16P, and 16Q, respectively.

In some embodiments of the present invention, the total flow area of all nucleation jets is in the range from about 50 percent of the cross sectional flow area N of the gas plenum, to about three times the total cross sectional flow area N of the glass plenum. In order to achieve this ratio of total nucleation jet area to total plenum cross sectional area, the length NL can be adjusted accordingly. In still further embodiments, the ratio of the cross sectional area O of the inner diameter of the nucleation device to the area N of the gas plenum should be less than about five.

FIG. 17 provide pictorial representations of the cleaning of aero engines according to various embodiments of the present invention. FIG. 17A shows a vehicle 21 parked between the wing and engine of an aircraft in the family of the DC-9. FIGS. 17A and 17C depict a vehicle 21 using a washing system 20 to clean the right engine of a DC-10 type aircraft. Vehicle 21 includes a washing system 20. A nozzle 30 is supported from an extendable boom 23 near the inlet 11 of fuselage-mounted engine 10. An effluent collector 32 is located near the exhaust 16 of engine 10. Collector 32 in one embodiment includes a housing 33 coupled to a holding member 34. Holding member 34 in some embodiments is coupled to vehicle 21 (or alternatively, to the tarmac or to other suitable restraint) so as to maintain the location of collector 32 aft of engine 10 during the cleaning process. In some embodiments, the housing 33 is inflatable with air, in a manner similar to large outdoor play equipment. In such embodiments, vehicle 21 further includes a blower for providing air under pressure to housing 33.

Foam from the nozzle 20 supported by boom 23 is provided into the inlet of engine 10, preferably as engine 10 is rotated by its starter. Foam 28 is injected into the inlet 11 as engine 10 is rotated on its starter. In some embodiments, the typical operation of the starter results in a maximum engine motoring (i.e., non-operating) speed, which is typically less than the engine idle (i.e., operating) speed. However, in some embodiments, the method of utilizing system 20 preferably includes rotating the engine at a rotational speed less than the typical motoring speed. With such lower speed operation, the cold section components of engine 10 are less likely to reduce the quality or quantity of foam before it is provided to the engine hot section. In one embodiment, the preferred rotational speed during cleaning is from about 25 percent of the motoring speed to less than about 75 percent of the motoring speed.

Figure 18A:
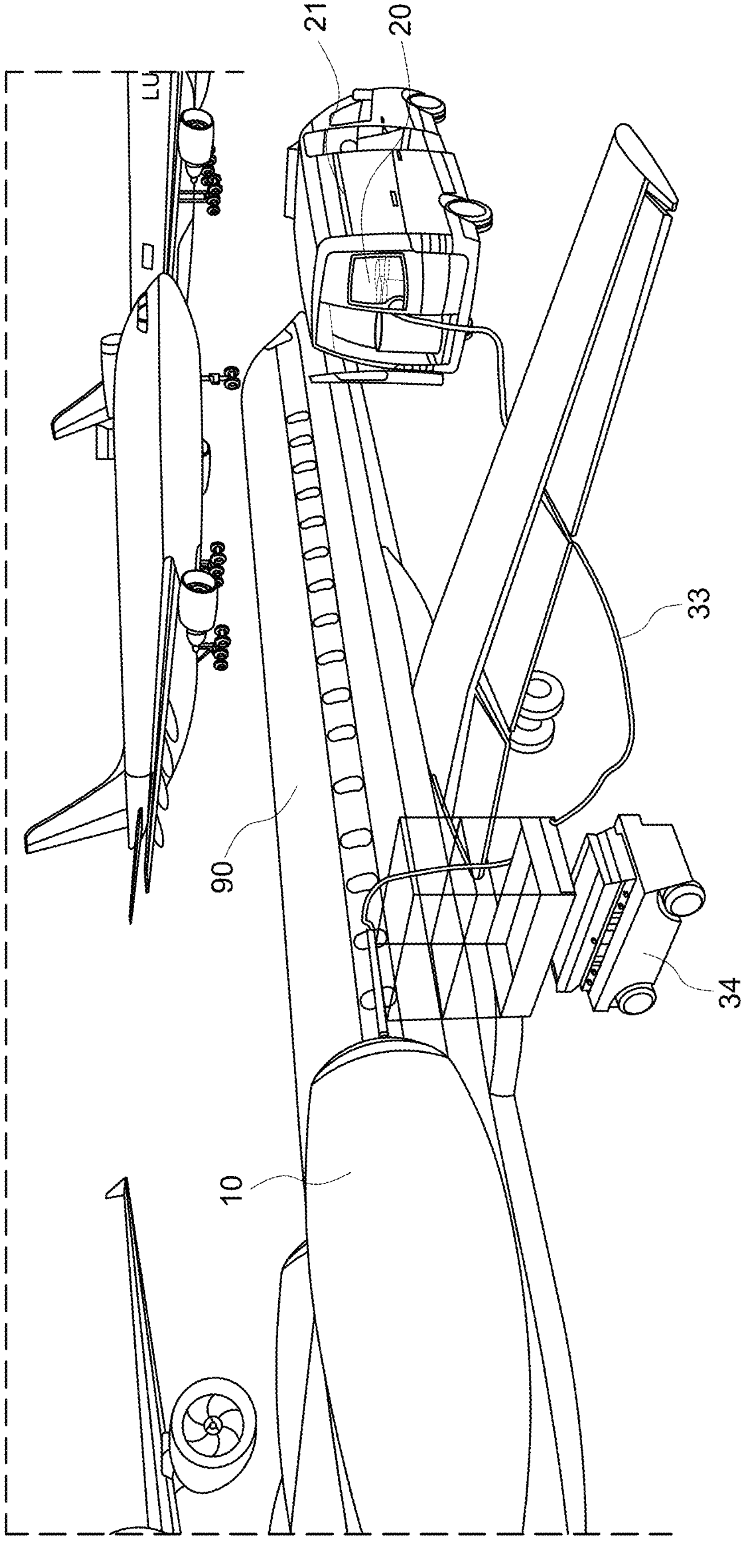
FIGS. 18A and 18B are pictorial representations of an aircraft engine being cleaned with a system according to one embodiment of the present invention.
Figure 18B:
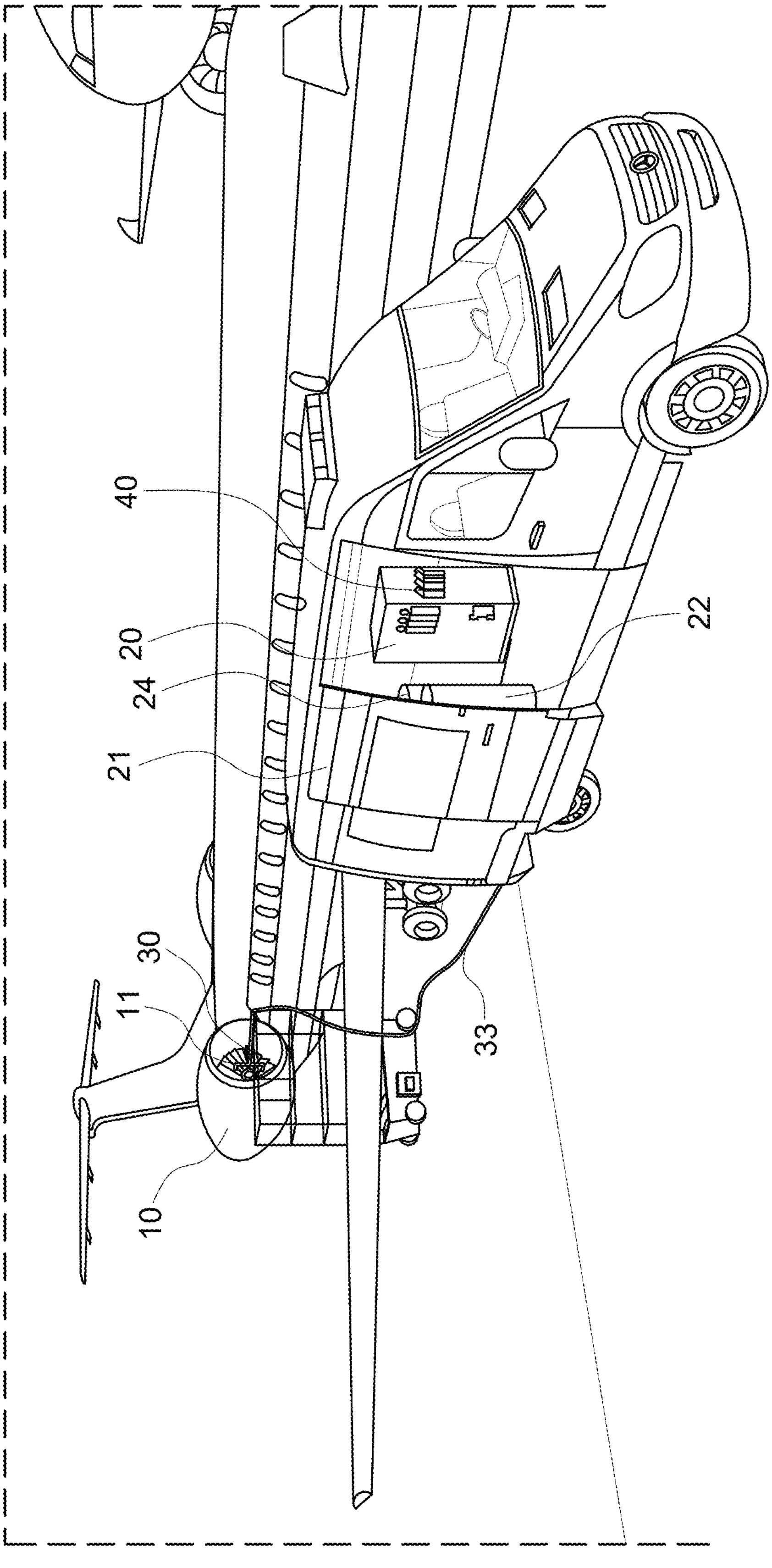

FIGS. 18A and 18B represent various representations of a washing or cleaning system 20 according to one embodiment of the present invention. Illustrated is a washing system 20 applied to the cleaning of a gas turbine engine, while it is understood that various embodiments of the present invention contemplate the cleaning of any object. Washing system 20 can be embodied inside a vehicle 21. Vehicle 21 can also take the form of a trailer, a compact cart, or dolly such that it can be rolled like vehicle 21 to a desired location varying in capacity.

FIG. 18A pictorially represent a rear-side view of an engine 10 being cleaned on wing an aircraft 90 in an airport setting. Vehicle 21 contains washing system 20 to supply cleaning foam product to engine 10 via hose 33 held up to the engine 10 by support 34. It has also been contemplated that vehicle 21 can supply a support 34 or much like a boom 23 (seen later in FIG. 19).

FIG. 18B pictorially represent the forward view of a washing system 20 being used to clean a jet engine 10. System 20 typically includes a supply 26 of gas (not shown), a supply 24 of water, a supply 22 of cleaning chemicals, and a supply of electricity (not shown) all of which are provided to a foaming system 40. Foaming system 40 accepts these input constituents, and provides an output of foam 28 (not shown) via a nozzle 30 to the inlet 11 of engine 10.

Figure 19:
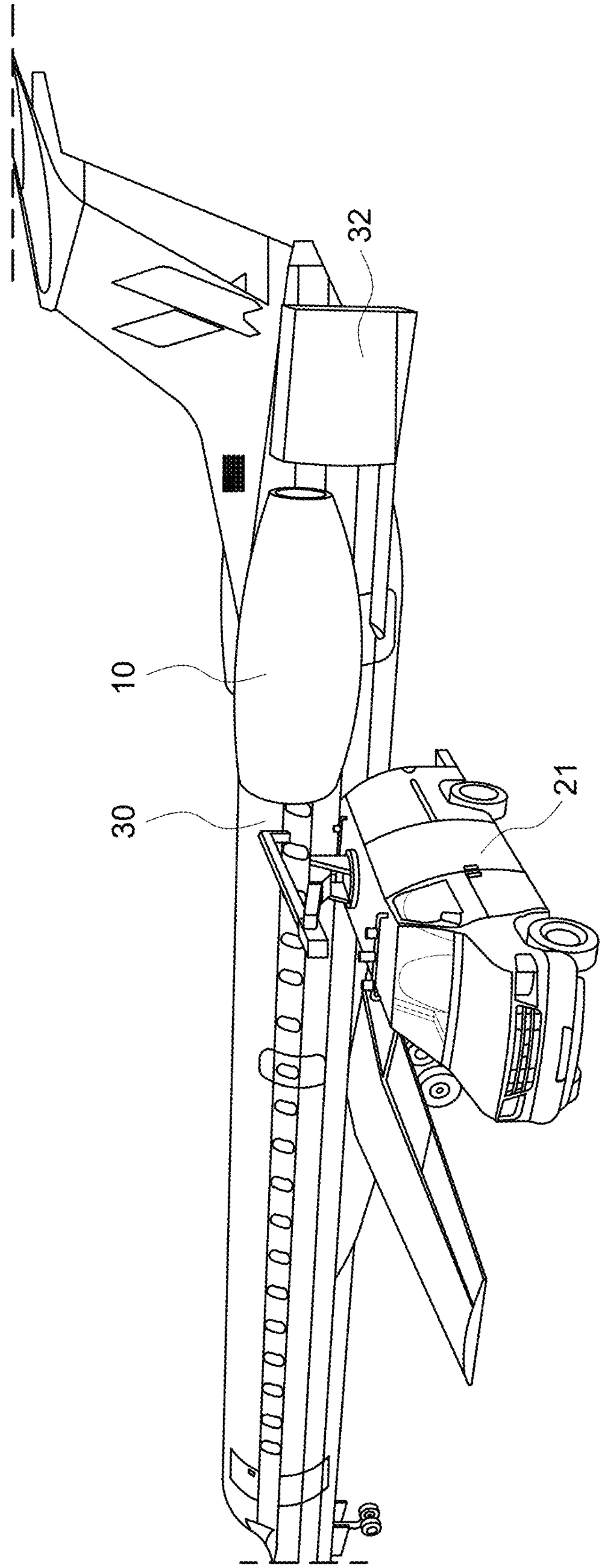
FIG. 19 is pictorial representations of an aircraft engine being cleaned with a system according to one embodiment of the present invention, and with one embodiment of effluent capturing device.
Figure 20:
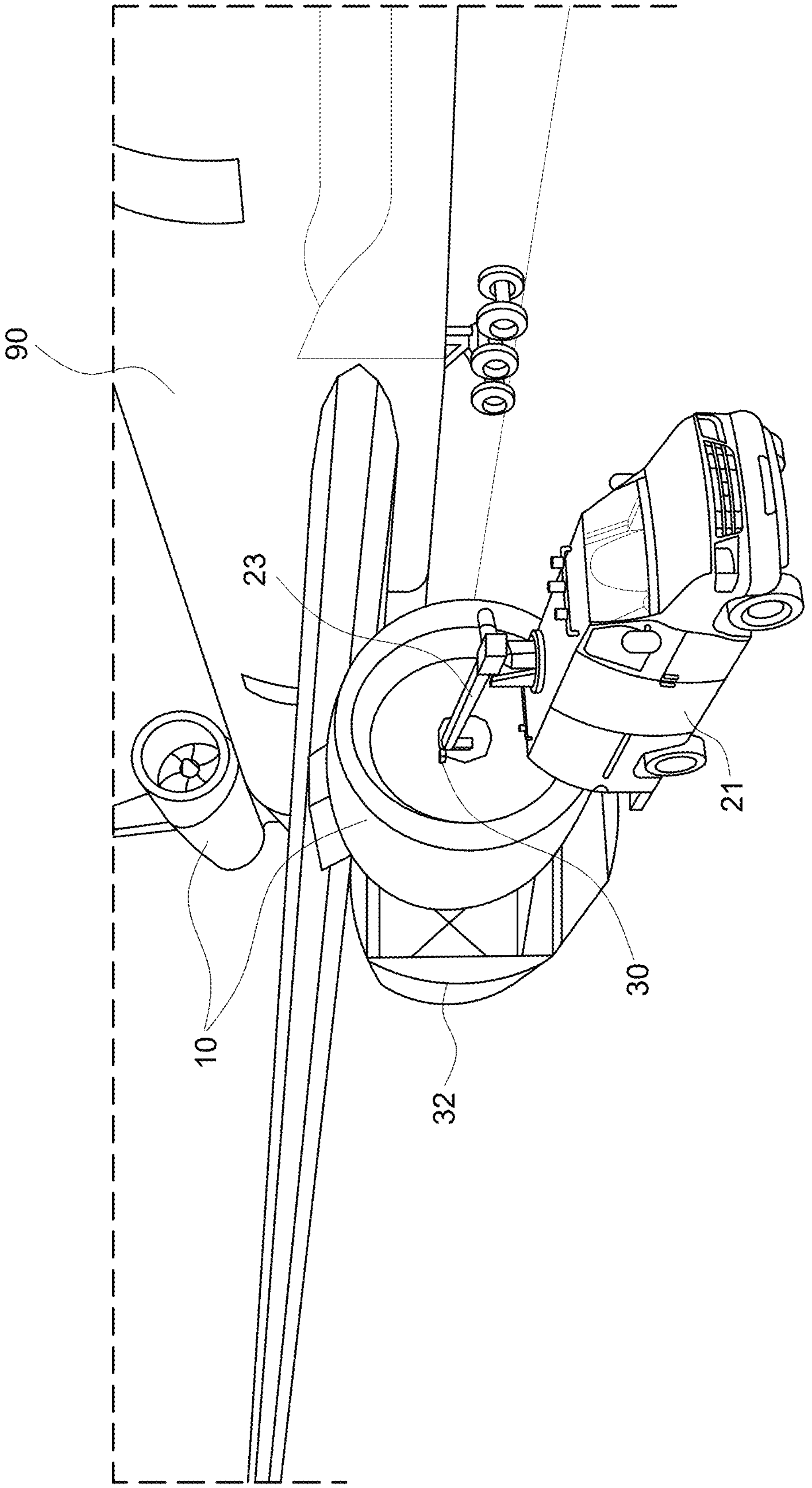
FIG. 20 is pictorial representations of an aircraft engine being cleaned with a system according to one embodiment of the present invention, and with one embodiment of effluent capturing system; according to one aircraft scenario.
Figure 21:
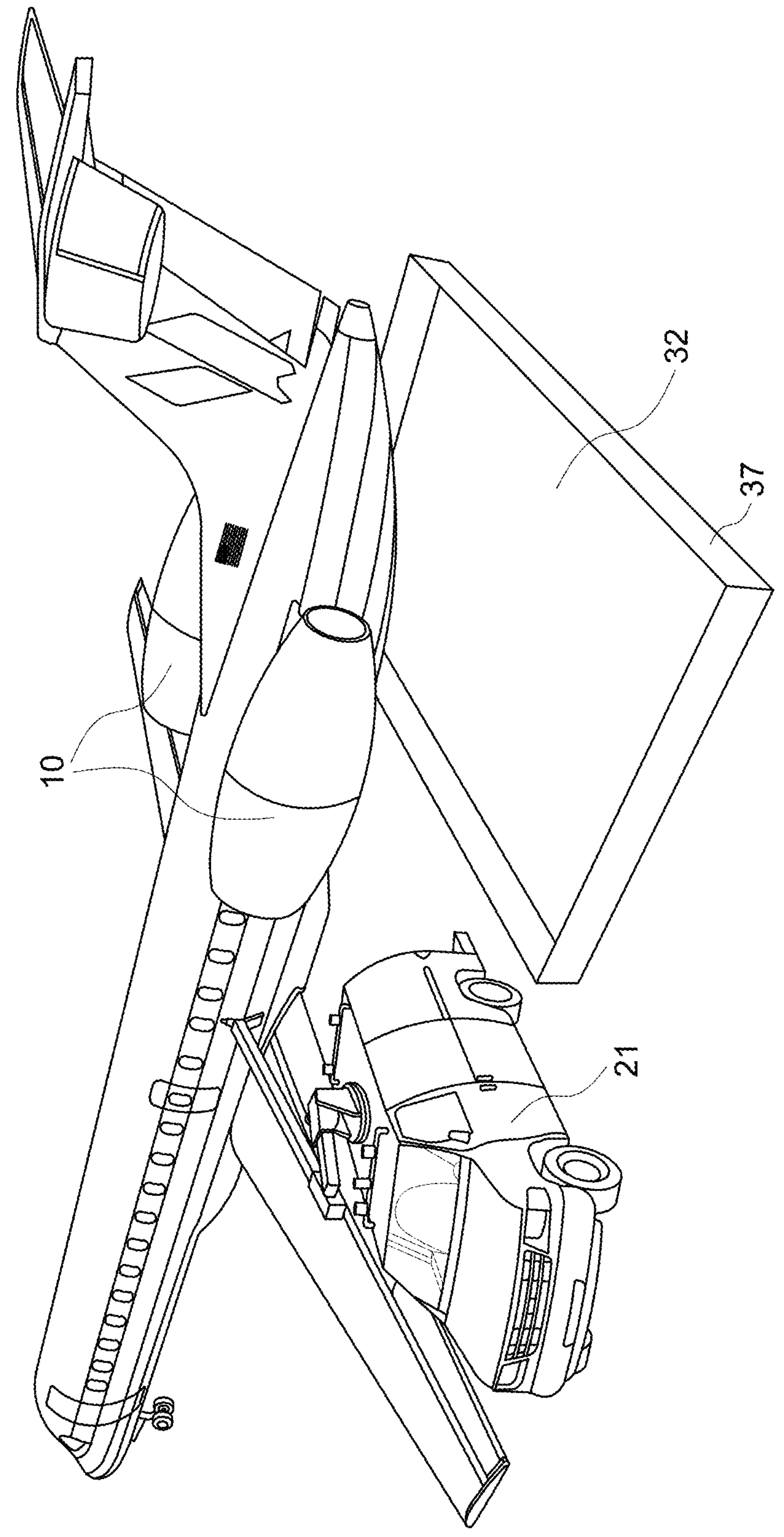
FIG. 21 is pictorial representations of an aircraft engine being cleaned with a system according to one embodiment of the present invention, with a varying foam effluent capture system.

FIGS. 19, 20, and 21 pictorially represent various embodiments of an effluent collector 32 and vehicle 21 positioning. Effluent collector 32 is designed to collect foam and effluent for post processing, recycling (processing unit 80, seen later in FIG. 23) or for disposal.

FIG. 19 pictorially represents effluent collector 32. Effluent collector 32 can be inflated, similar to outdoor recreational equipment, or similar to an airplane emergency ramp or life-raft. The effluent collector 32 in one embodiment is safe and gentle for the aircraft and structurally supporting to contain the foam, liquids and solid particulates. Additionally, vehicle 21 may contain a boom 23 to hold up nozzle 30 (more on nozzle 30 in FIG. 20). Boom 23 allows positioning the nozzle 30 for foam introduction to engine 10. Boom 23 can have a combination or range in degrees of freedom in space, in addition to but not limited to elongation, rotation, and/or angles.

FIG. 20 pictorially represents the effluent collector 32 (similar to FIG. 19) on a much larger jet engine 10. Vehicle 21 can be positioned forward of engine 10 but not limited to this one embodiment. For example, the jet engine 10 at the top rear of the aircraft 90 is sufficiently high that the position of vehicle 21 and boom 23 would reach the inlet (like in FIG. 18A). In such contemplated scenario, effluent collector 32 can be elevated by another vehicle 21 with boom 23, or by a support 34 (like in FIG. 18A).

FIG. 21 pictorially represents one embodiment of effluent collector 32. Collector 32 can be a floor mat with containment wall 37. In one example, containment wall 37 was contemplated to be held up with brackets, or be inflatable. Effluent collector 32 can be a variation of sizes and dimensions to encompass one or many engines 10 during cleaning process.

Figure 22A:
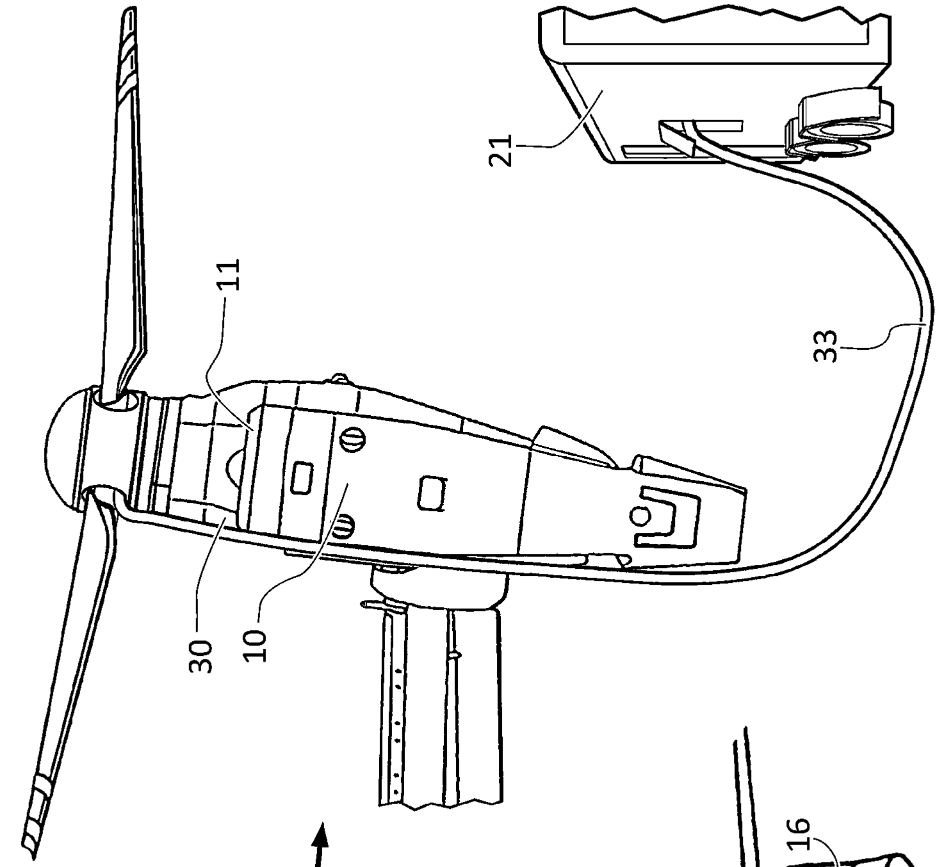
FIG. 22A is a line drawing of a photographic representation of aircraft engines being cleaned with a system according to one embodiment of the present invention.
Figure 22B:
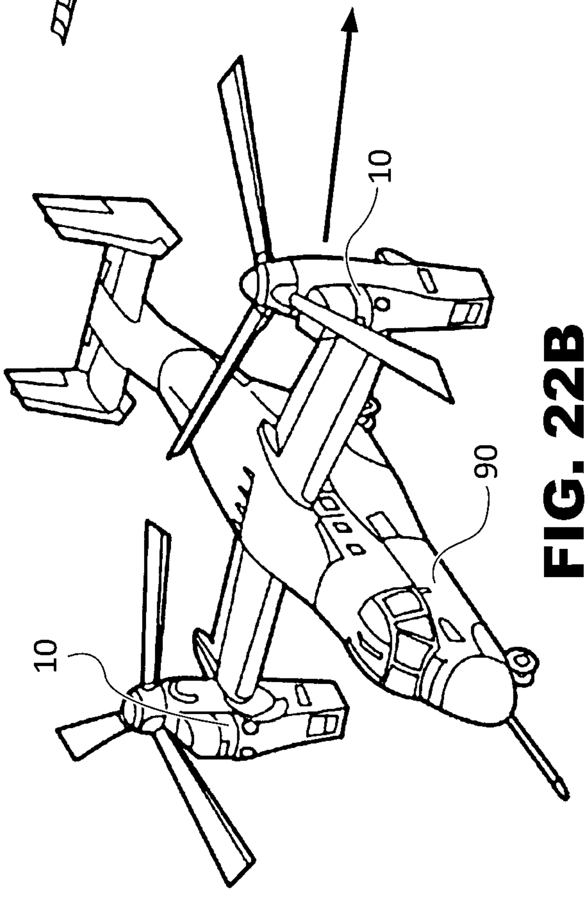
FIG. 22B is a schematic representation of an aircraft.
Figure 22C:
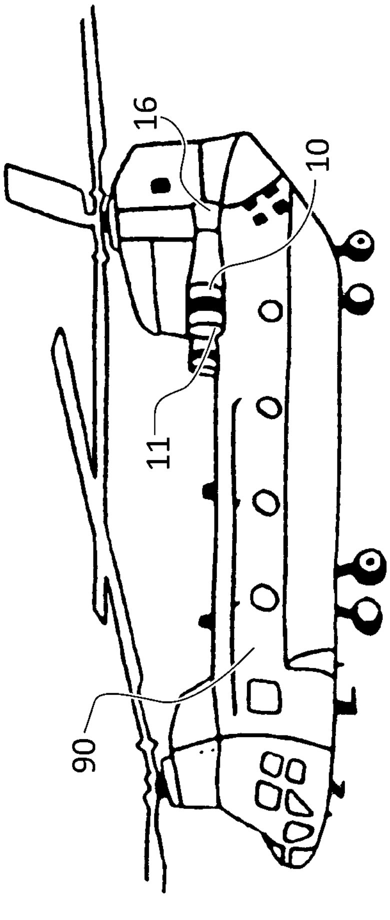
FIG. 22C is a schematic representation of an aircraft.

FIGS. 22A, 22B, and 22C show schematic and artistic photographic representations of aircraft engines 10 being cleaned with a system according to one embodiment of the present invention. The engines 10 are mounted according to aircraft 90 design; where FIG. 22C shows a dual rotor helicopter (Bell) with horizontally mounted engines 10 towards the rear, and FIGS. 22A and 22B show another design that has engines 10 mounted at the side of the wing and pivots between vertical and horizontal (V22 Osprey). The vehicle 21 demonstrated in this photographic representation embodies a trailer. The orientation of engine 10 on the V22 aircraft is vertical, where hose 33 directs foam cleaning product to nozzle 30 at the engine inlet 11. Cleaning or washing engine 10 in this format allow for engine prescription (more in FIG. 26) to possibly alternate engine 10 core components to either rotate, be stationary or both. It has been contemplated that cleaning foam products can cascade downward without agitation/rotation. The effluent then would exit at the bottom of engine 10, to be captured (similar to FIG. 21), or allowed to enter sewer.

Figure 23:
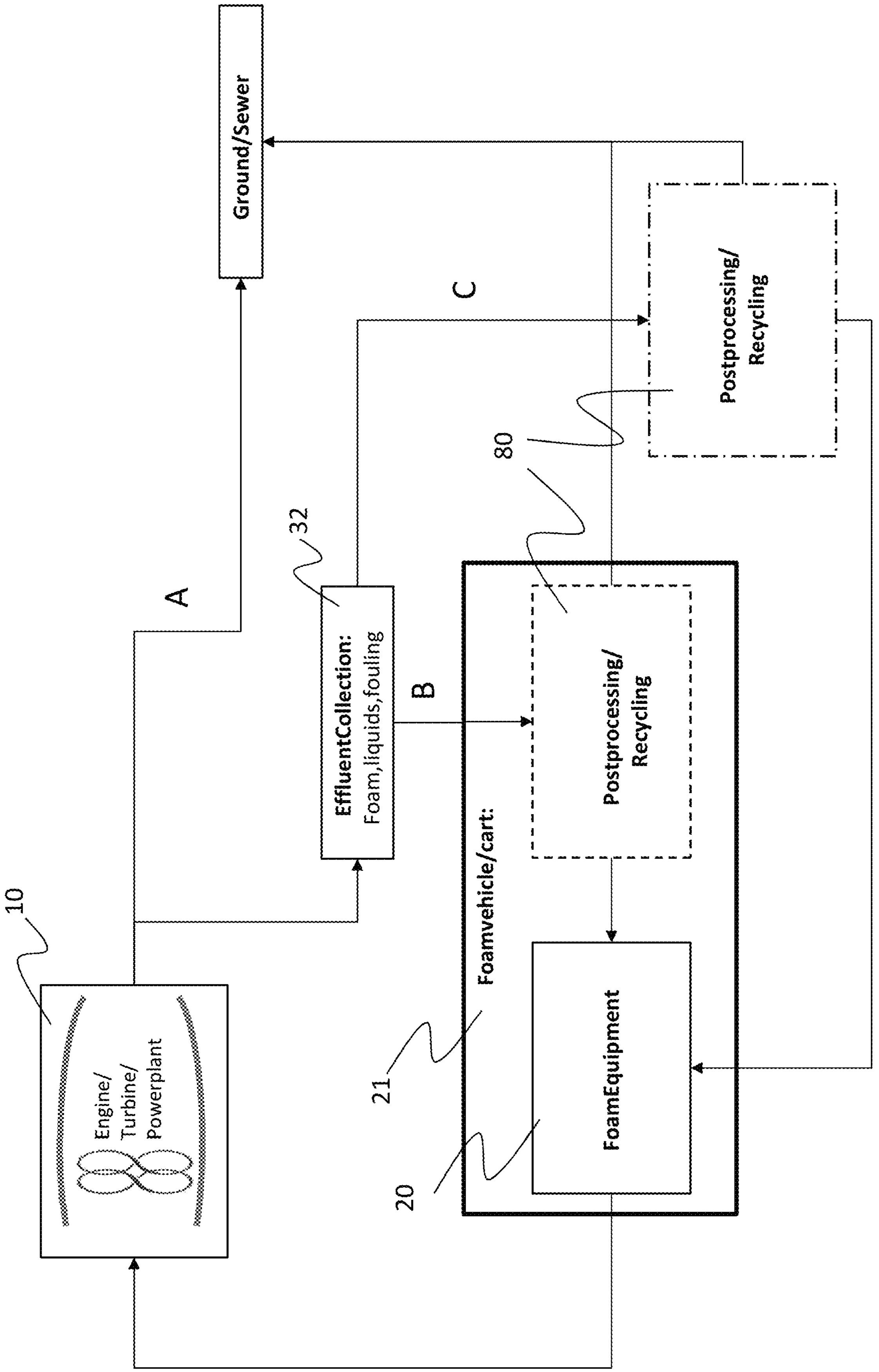
FIG. 23 is a schematic representation of a cleaning process according to the present invention.

FIG. 23 is a schematic representation of a cleaning process/method according to one embodiment of the present invention. As demonstrated in all prior figures, the invention apparatus and method can allow for versatility in the field. The schematic shows the method-path of process steps for cleaning engine 10. For explanation purposes, the process starts at vehicle 21 which contain the washing system 20. The washing system provides the foam cleaning products to clean engine 10, where dirt, contaminants, liquids and foam; the effluent exits engine 10. Because field condition and regulations vary (i.e. airports, private land, or military zones) the method and invention design contemplates incorporating modular flexibility to vehicle 21. For example, the effluent has three method routes it can take, path A, B or C. First, path A, the effluent can go directly to the sewer or ground. Secondly, because of the effluent collector 32 system, the foam, liquids, and fouling material can be recycled and/or processed by processing unit 80, shown by Path B or C. Vehicle 21 can accommodate a processing unit 80 as shown in path B. Whereas in path C, the processing unit 80 can be handled separately from vehicle 21. Processing unit 80 can be a prebuilt module similar to those sold by AXEON Water Technologies.

Figure 24B:
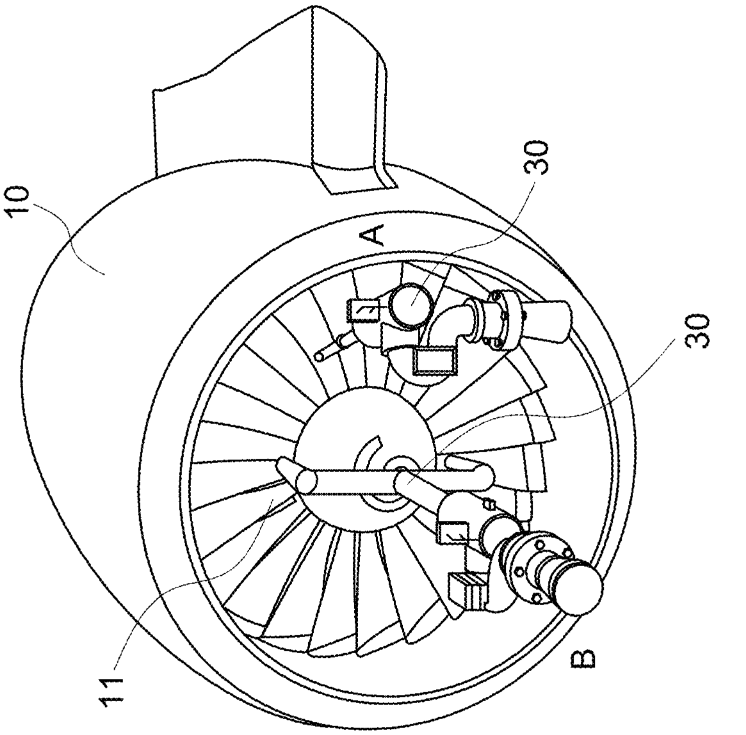
FIGS. 24A and 24B are schematic representations of an engine depicting a foam injection system according to one embodiment of the present invention.
Figure 24A:
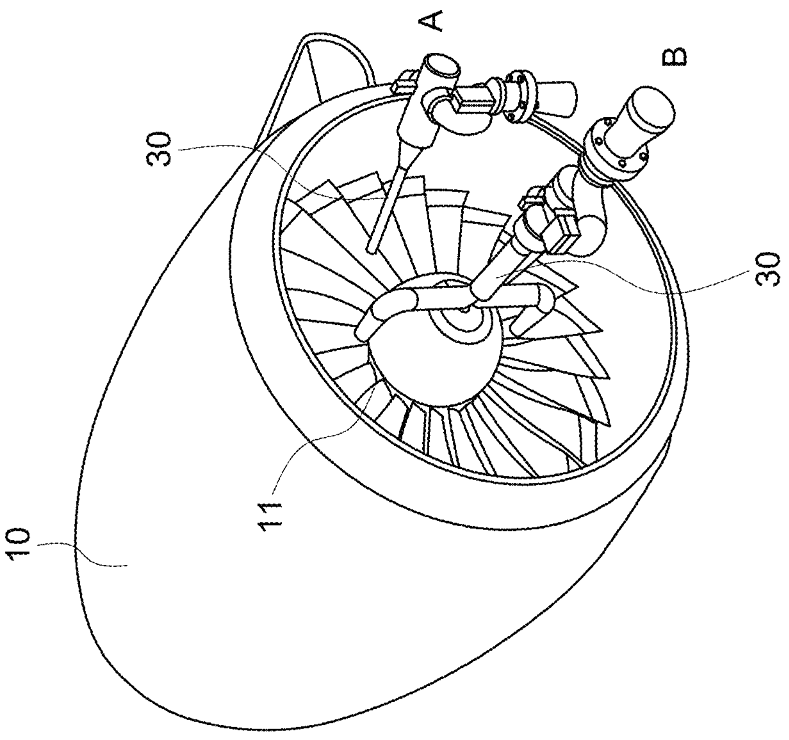

FIGS. 24A and 24B are similar schematic representation of an engine depicting a foam injection system according to one embodiment of the present invention. The schematic depicts a closer forward view of engine 10 with inlet 11 of the fan and compressor section. The two figures are shown to bring clarity to the perspective view particularly to nozzle 30 in relation to engine 10. Nozzle 30 can be a plurality of nozzles, and/or nozzles that articulate in position, angle, and/or rotation. For example, point A in both figures, illustrate an articulating nozzle (i.e. Robot or monitor sold by Task Force Tips, Remote controlled monitor Y2-E11A) with an elongated tube (not limiting in size) where cleaning foam product can reach and target the engine 10 compressor inlet 11. Similarly, point B, in both figures, illustrate the articulating nozzle, having a “Y” shaped nozzle exit (but not limiting in design), positioned along the axis of engine 10 core rotation of where nozzle 30 can rotate axially along compressor inlet 11 zone.

Figure 25A:
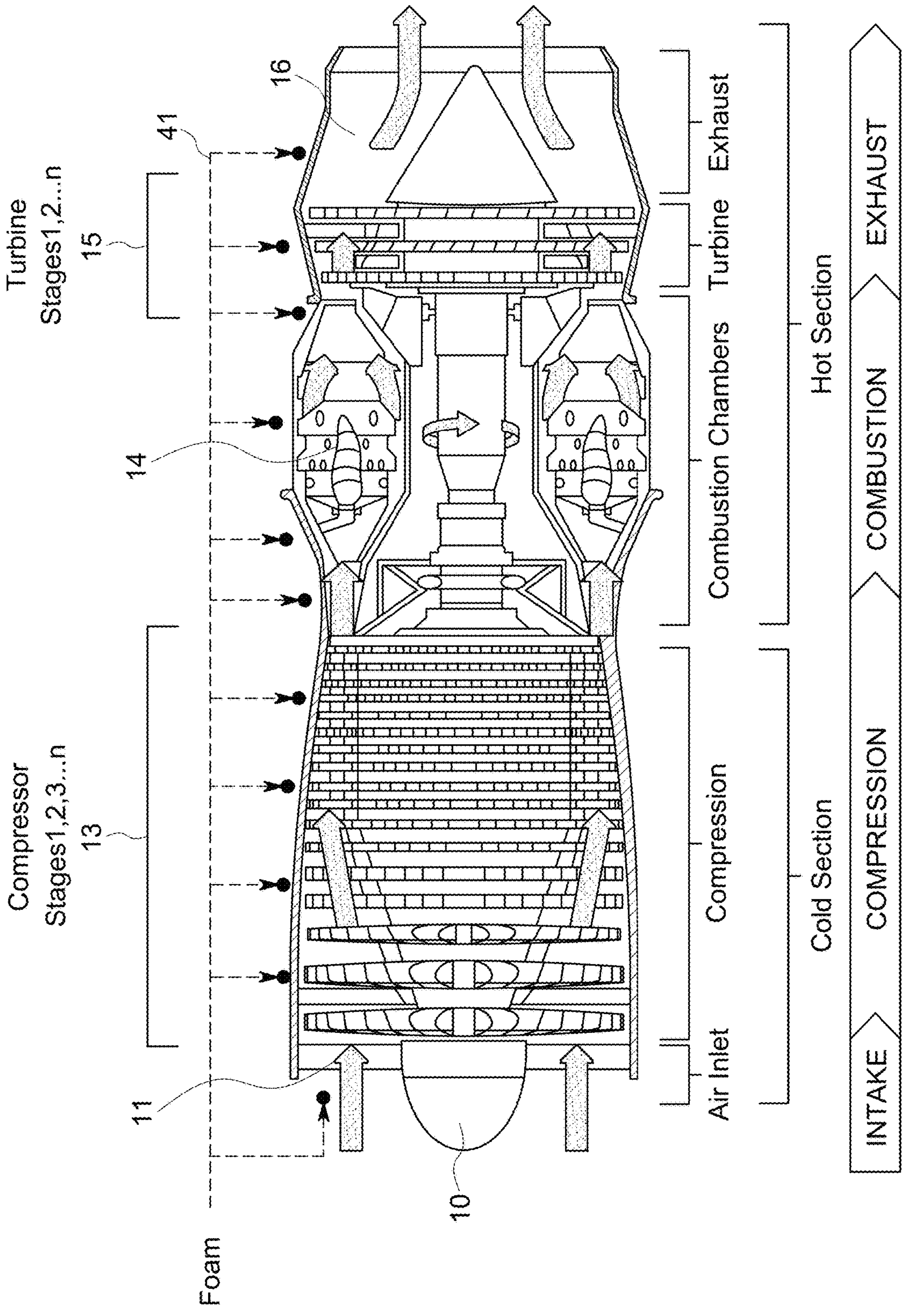
FIG. 25A is a schematic representation of an engine cutaway and internal view depicting a foam connection system according to one embodiment of the present invention.
Figure 25B:
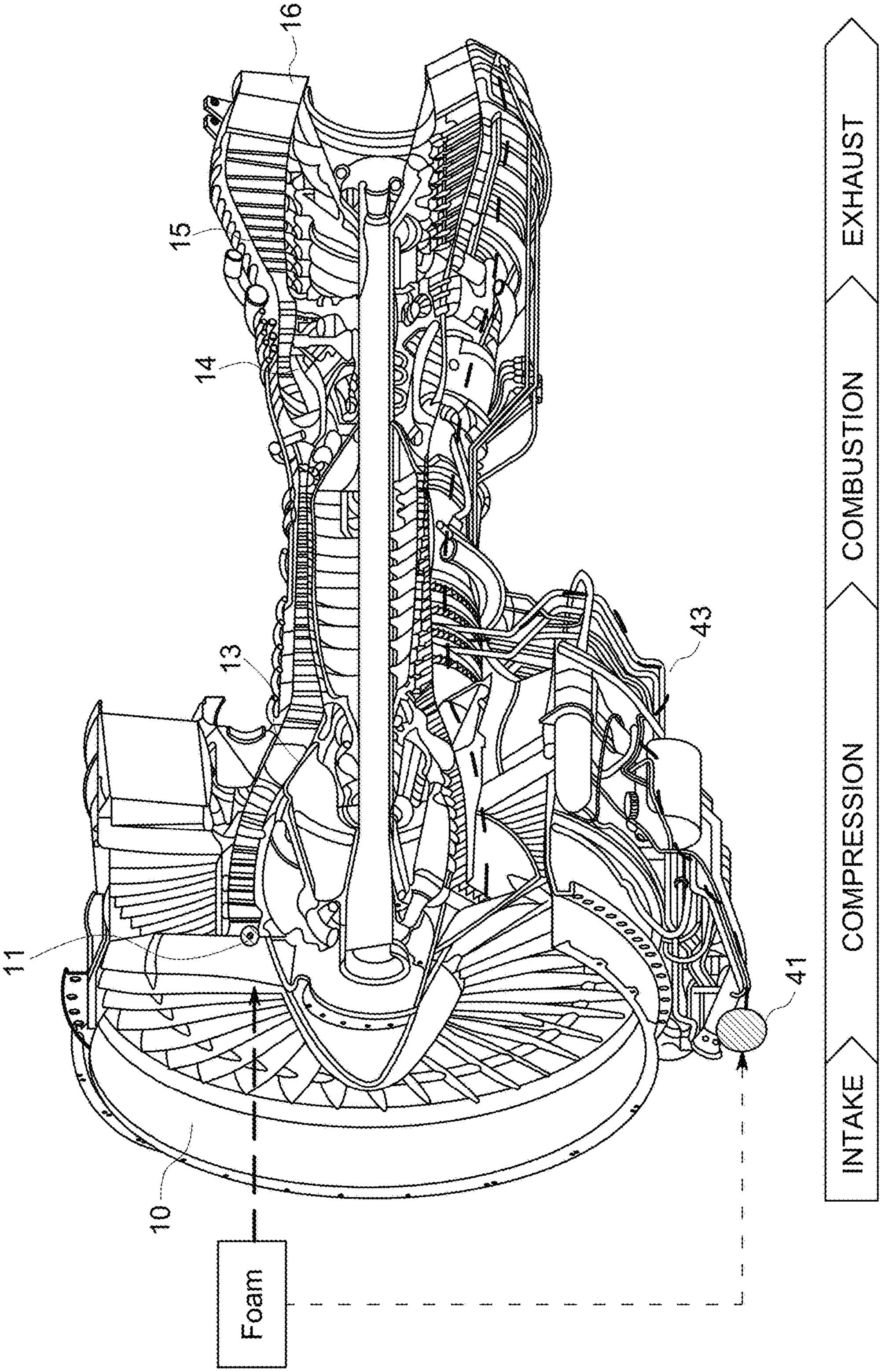
FIG. 25B is a schematic representation of an engine cutaway with internal and external components depicting a foam connection-system according to one embodiment of the present invention.

FIG. 25B is a schematic representation of an engine cutaway and internal view depicting a foam connection 41 system according to one embodiment of the present invention. Engine 10 typically includes a cold section including an inlet 11, a fan 12 (not shown) and one or more compressors 13. Compressed air is provided to the hot section of engine 10, including the combustor 14, one or more turbines 15, and an exhaust system 16. Because different engines exhibit variations in wear and tear due to fouling engine 10 manufacturers have dedicated tubing 42, connections, or passages designed for water wash procedures. Because the present invention shows that the cleaning system by foam has improvements, in reference to FIGS. 22A, 22B, and 22C, nozzle 30 or hose 33 can also connect directly to one or many of the (dotted line) foam connection 41 points, targeting specific, some or all engine sections.

As one example, some compressor sections are known to include one or more manifolds or pipes that carry compressed air, such as for providing bleed air to the aircraft or providing relatively cool compressed air for cooling of the engine hot section. In some embodiments, cleaning foam is provided to the engine through these manifolds or pipes. This foam can be provided while the engine is being rotated, or while the engine is static. Further, engine hot sections are known to include pipes or manifolds that receive cooler, compressed air for purposes of cooling the hot section, and blanked-off ports used for boroscope inspections or other purposes. Yet other embodiments of the present invention contemplate the introduction of foam into such pipes and ports, either in a static engine or a rotating engine.

FIG. 25B is a schematic representation of an engine cutaway with internal and external components illustrating a foam connection-system according to one embodiment of the present invention. In similar fashion to FIG. 25A, the engine 10 cutaway has an inlet 11, a fan 12, a compressor 13 section, a combustor 14 section, a turbine 15 section, and an exhaust 16 section. Tubing 43, passages, connections, whether existing or in future engine manufacturing engineering changes, can be used to deliver foam for cleaning engine 10 sections. In reference to FIG. 18B, because Ihose 33 is meant to connect to nozzle 30, alternatively hose 33 can directly connect to engine 10 to one or iterations of connections 41.

Figure 26:
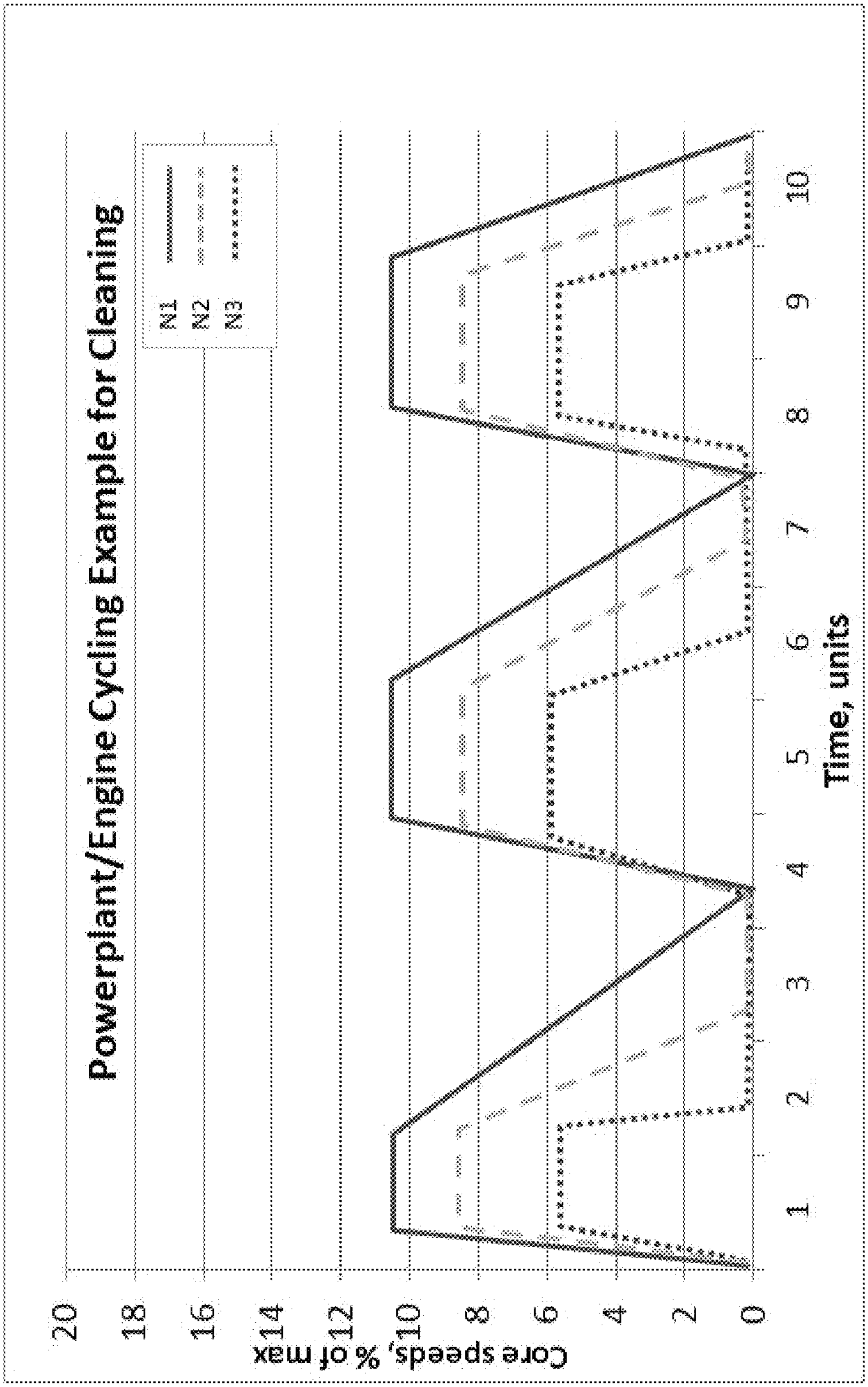
FIG. 26 is a graphical representation of an engine cleaning cycle prescription in accordance with one embodiment/method of the present invention.

FIG. 26 is a graphical representation of an engine cleaning rotational-cycle prescription in accordance with one embodiment/method of the present invention. As demonstrated in most prior figures, engines 10 can be mounted in many forms (i.e. horizontal, vertical) and engines come in many shapes and sizes. With this in mind, the foam cleaning procedure can work more effectively at prescribed engine 10 core speeds (the compressor 13 sections, and the turbine 15 sections). By way of example, this graphical representation has three types of core speeds (three individual—compressor 13 to turbine 15 linked via shaft) shown as N1, N2, and N3. The y-axis is the rotational speed of max allowed (actual values not shown, scale by way of example). The x-axis is the time (not to scale, example only). The purpose of the engine cleaning prescription is to rotate and agitate the foam that flooded the gas-path inside engine 10. Foam will contact, scrub and remove fouling. Foam has different fluid dynamic properties at the different rotational (agitation) speeds. Thus, by cycling engine 10 in various ranging speeds, cleaning efficacy can be attained. The chart shows that the engine 10 is cranked 3 times (3 cycles) but not limited to this frequency. By evaluating the first cycle, it is evident that N1, N2, and N3 behave in accordance with the amount of inertia. At time zero, N1, N2, N3 is zero, when engine is cranked for 1 unit, N1, N2, N3 reaches a ceiling of about 10.5%, 8.5%, 5.8% respectively. The flooded foam product inside the engine 10, forces N3 to stop quicker by way of hydrodynamic friction, while comparatively, N1 can sustain longer rotation. It is preferred to cycle one or many times in prescription, but engine 10 can also be cleaned without rotation by injecting and flooding the gas path as discussed in FIG. 22. Temperature of foam is useful to the frequency and amplitude of the cycling prescription. Vehicle 21 can house a heater 38 to regulate and positively impact effectiveness of cleaning prescription.

Figure 27:
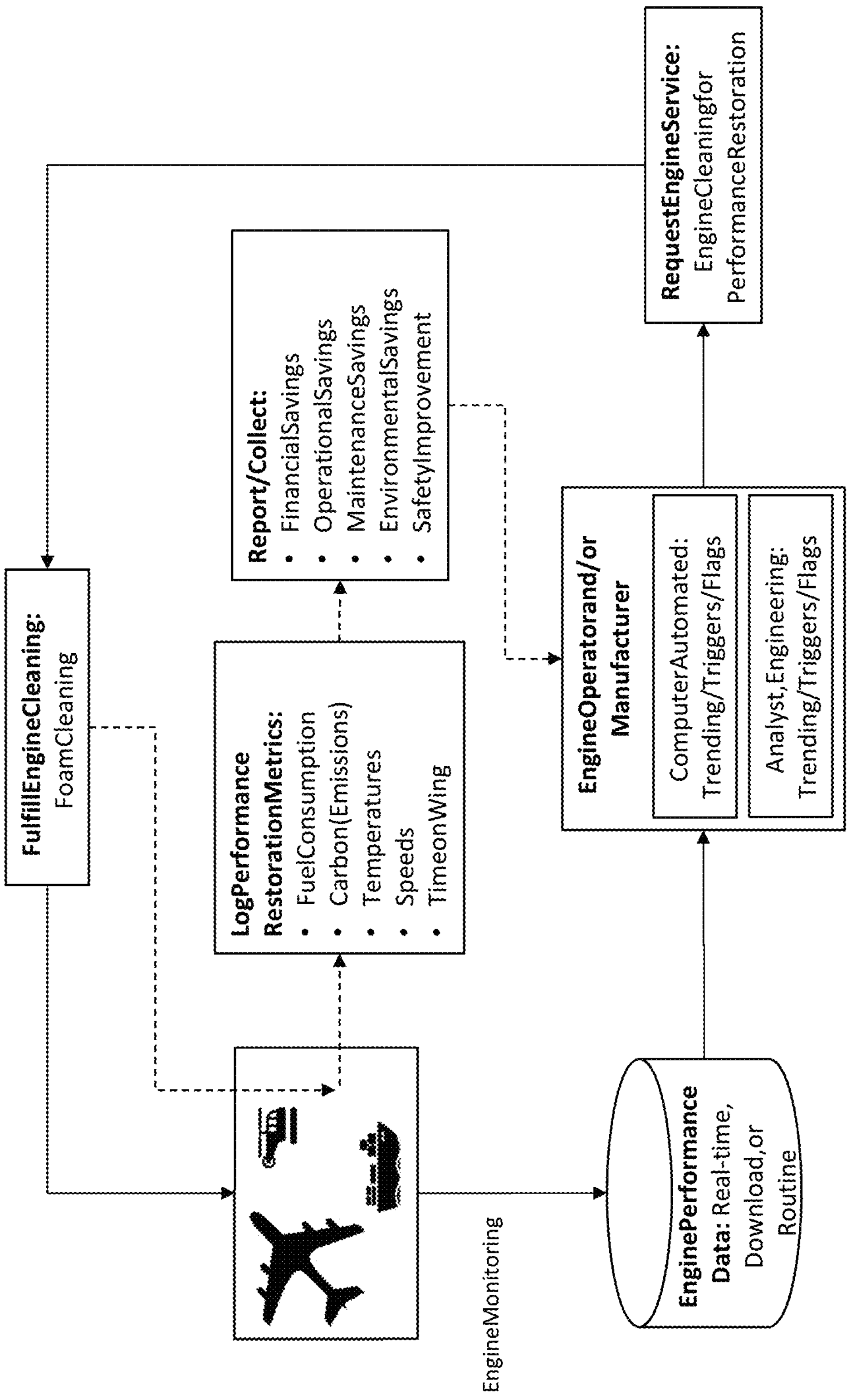
FIG. 27 is a graphical representation of one method for engine monitoring and quantifying benefits in accordance with one embodiment/method of the present invention.

FIG. 27 is a graphical representation of one method of the present invention; for engine monitoring and quantifying benefits. The positive effects and benefits of properly cleaning an engine 10 can further be quantified into the invention. By use of diagnostic or telemetry tools to obtain financial, operational, maintenance, environmental (i.e. carbon credits, time on wing, fuel savings, etc.). Data analysis tools are scientific methods for enhancing engine 10 life and safety. As shown in FIG. 27, one embodiment of the present invention includes a method. For example, an engine 10 in an aircraft or boat transmits information to a data center. Next, the engine operator or manufacturer by way of computer automation, separately or in conjunction with a professional trained person request a foam engine cleaning method. Upon fulfilling a foam cleaning method in conjunction with this monitoring method, performance restoration metrics can log improvements. These quantified improvements can be collected for financial goals, carbon credits, engine life extension, and/or safety.

Figure 28A:
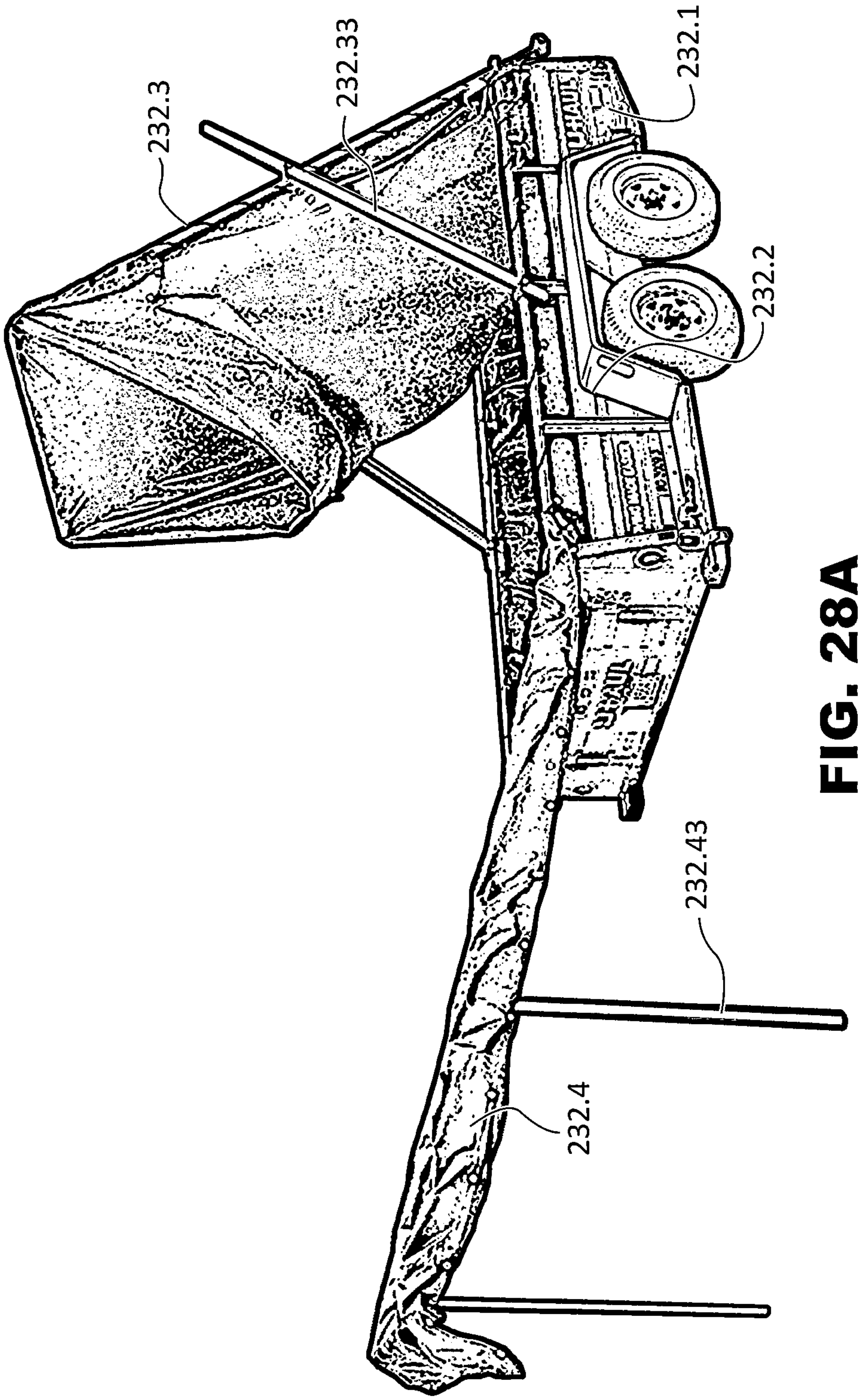
FIG. 28A is a line drawing of a photographic representation of an effluent collector according to one embodiment of the present invention.
Figure 28B:
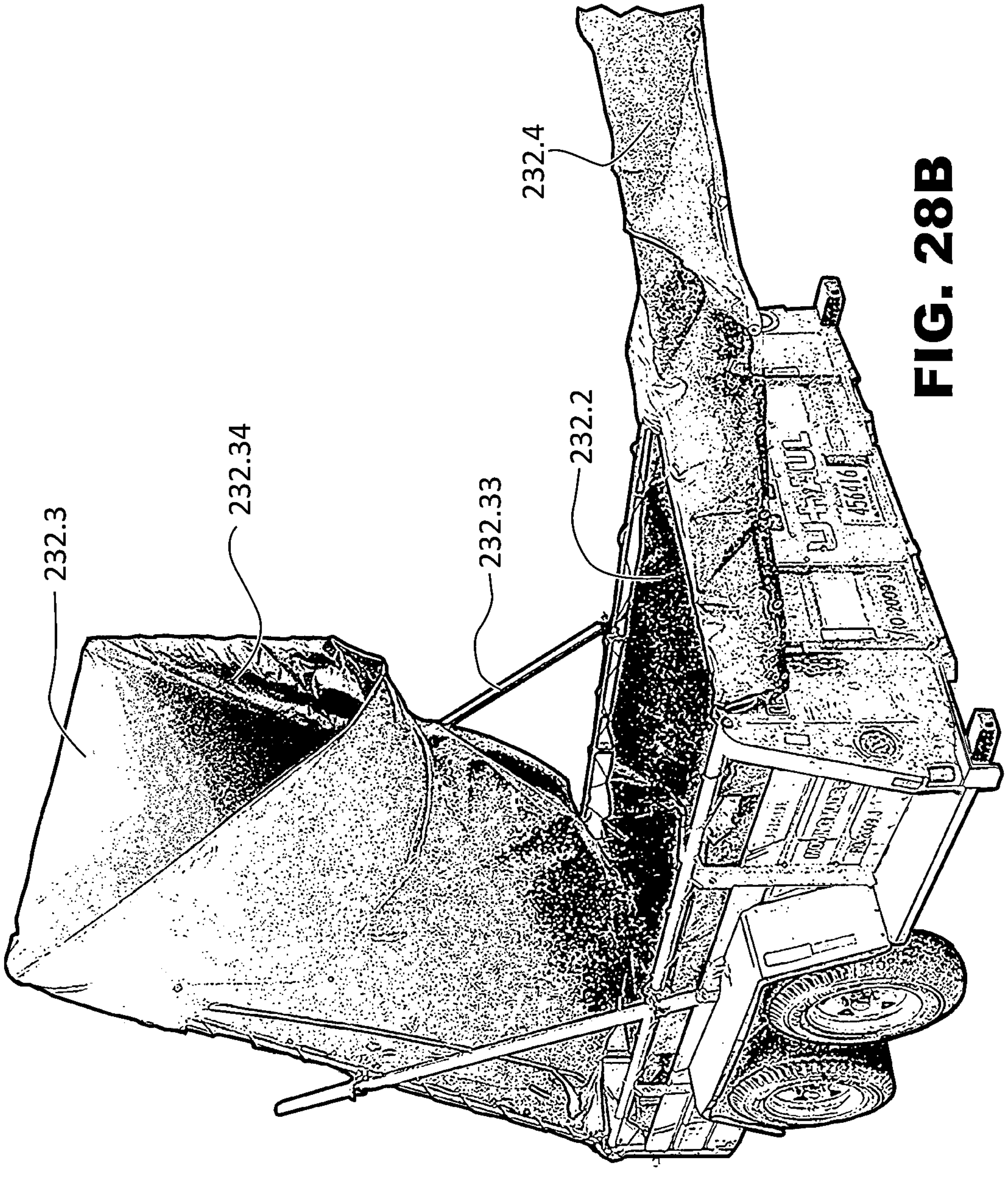
FIG. 28B is a front view looking aft of the apparatus of FIG. 28A.
Figure 28C:
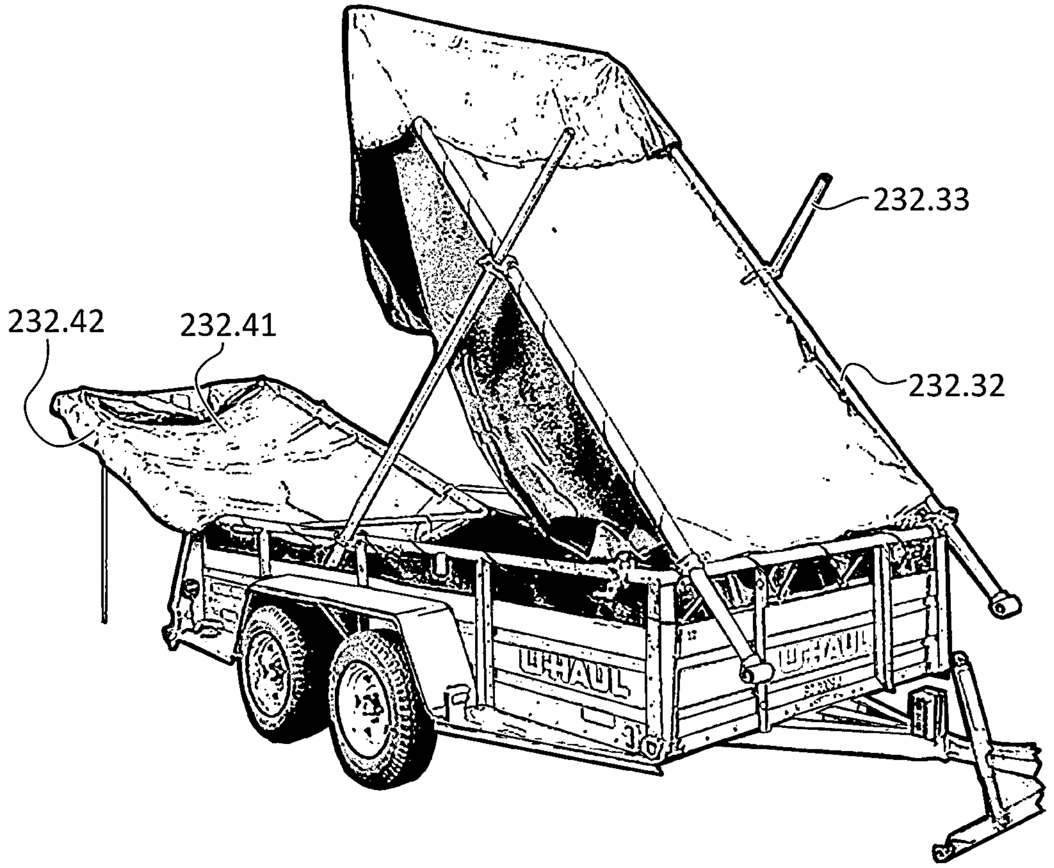
FIG. 28C is a rearview looking forward of the apparatus of FIG. 28A.

FIG. 28 show various embodiments of a portable effluent collector according to one embodiment of the present invention. The effluent collector includes a trailer 232.1 having a plurality of wheels supporting it from the ground, and preferably also including a trailer hitch for towing by another vehicle. The trailer includes a cargo compartment that can be adapted and configured to support and contain foam effluent during an engine cleaning process. As shown in these figures, the cargo compartment is lined with a plastic, waterproof and watertight flexible sheet, so as to form a collection pool 232.2 supported generally by the wheels.

The trailer preferably includes a plurality of collection devices that can be conveniently folded down into a compact shape for transport. These devices can also be extended and supported in an upright condition for collection of foam during the cleaning process.

FIG. 28 show the trailer and collection devices in the extended condition, suitable for collecting foam during a cleaning process. An exhaust collector 232.3 is formed by a flexible sheet that is waterproof and watertight, and separated by a pair of spaced apart ribs 232.34. Each of the support ribs are located on opposite sides of the trailer, and each of them are pivotally coupled to the forward end of trailer 232.1. Preferably, the sheet is sufficiently large, and also loosely draped on the ribs, such that in the vertically-supported condition the sheet forms an enclosure 32.31 having an inlet 232.34 for collection of foam coming out of the exhaust of the engine. The enclosure 232.31 forms a gravity-assisted flowpath from the inlet to a drain that is located proximate to the pool 232.2. Any foam received in the inlet flows downward within the enclosure and into the pool by way of the drain. A pair of vertical supports 232.33 are provided on either side of the enclosure. Each of the vertical supports couples at one end to a side of the trailer, and at the other end to a corresponding rib. The rib and the corresponding vertical supports are locked together in the extended condition (as shown in FIG. 28), to maintain the enclosure in an upright state. When the ribs and vertical supports are unlocked, the ribs fold toward the back of the trailer, and the vertical supports can fold toward the front of the trailer, or be removed for purposes of transport.

The aft end of trailer 232.1 includes a collector 232.4 that is adapted and configured to catch runoff from the inlet of the washed engine, and also from underneath the engine if nacelle doors are open. Collector 232.4 extends from the forward end of trailer 232.2, and when supported by vertical supports 232.43 presents an upward angle toward the inlet of the engine being cleaned. Any foam coming out of the engine inlet or out from the engine nacelle falls upon the drainage path created by the support of a sheet 232.41 between a pair of spaced apart, substantially parallel support ribs 232.42. Each of these ribs is pivotally connected to the forward end of the trailer. The vertical supports 232.43 each attach to a rib, and contact the ground. Any foam that falls onto the drain path of concave sheet 232.41 moves by way of gravity toward pool 232.2.

Various aspects of different embodiments of the present invention are expressed in paragraphs X1, X2, X3, X4, X5, X6 and X7 as follows:

X1. One aspect of the present invention pertains to an apparatus for foaming a water soluble liquid cleaning agent, comprising a housing having multiple foam manipulating portions or regions arranged sequentially, said housing having a gas inlet, a liquid inlet for the water soluble cleaning agent, and a foam outlet; one region or portion includes a pressurized gas injection device having a plurality of apertures, the interior of said housing forming a mixing region receiving liquid from the liquid inlet and receiving gas expelled from the apertures and creating a foam of a first average cell size and a first range of cell sizes; another foam manipulation portion receives cells having a first range of distribution and first average size, and flows them over a cell attachment and growth member that provides surface area for attachment and merging of cells to create a foam having a second, larger average cell size; yet another foam manipulation region or portion receives foam having a first range of cell sizes and flows this foam through a foam structuring member adapted and configured to reduce the range of sizes of the foams and provide a more homogenous foam output.

X2. Another aspect of the present invention pertains to a method for foaming a liquid, comprising mixing the liquid and a pressurized gas to form a foam; flowing the foam over a member and increasing the size of the cells; and subsequently flowing the foam through a plurality of apertures or a grating to decrease the size of the cells.

X3. Yet another aspect of the present invention pertains to a system for providing an air-foamed water soluble liquid cleaning agent, comprising an air pump providing air at pressure higher than ambient pressure; a liquid pump providing the water soluble liquid at pressure; a nucleation device having an air inlet receiving air from the air pump, a liquid inlet receiving liquid from the liquid pump, and a foam outlet, said nucleation device turbulently mixing the pressurized air and the liquid to create a foam; and a nozzle receiving the foam through a foam conduit, the internal passageways of said nozzle and said conduit being adapted and configured to decrease the turbulence of the foam, said nozzle being adapted and configured to deliver a low velocity stream of foam.

X4. Still another aspect of the present invention pertains to a method for providing an air-foamed water soluble liquid cleaning agent to the inlet of a jet engine installed on an airplane, comprising providing a source of a water soluble liquid cleaning agent, a liquid pump, an air pump, a turbulent mixing chamber, and a non-atomizing nozzle; mixing pressurized air with pressurized liquid in the mixing chamber and creating a supply of foam; placing the nozzle in front of the installed inlet; and streaming the supply of foam into the installed inlet from the nozzle.

X5. Another aspect of the present invention pertains to an apparatus for foaming a water soluble liquid cleaning agent, comprising means for mixing a pressurized gas with a flowing water soluble liquid to create a foam; means for growing the size of the cells of the foam; and means for reducing the size of the grown cells.

X6. Yet another aspect of the present invention pertains to a method for scheduling a foam cleaning of a jet engine, comprising quantifying a range of improvement to an operational parameter of a family of jet engines achievable by foam washing of a member of the family; operating a specific engine of the family installed on an aircraft for a period of time; measuring the performance of the specific engine during said operating; determining that the specific engine should be foam washed; and scheduling a foam cleaning of the specific engine.

X7. Still another aspect of the present invention pertains to an apparatus for foam cleaning of a gas turbine engine, comprising a multiwheeled trailer having a cargo compartment, the compartment having a waterproof liner; an exhaust foam effluent collector including a first sheet supported by a first pair of spaced apart ribs, the first ribs being pivotably coupled to one end of said trailer, the ribs and sheet cooperating to provide an enclosed flowpath, one end of the flowpath having an inlet for receiving foam, the other end of the flowpath having a drain adapted and configured to provide foam effluent to the liner; and an inlet foam collector including a second sheet supported by a second pair of spaced apart ribs, the second ribs being pivotably coupled to the other end of said trailer, the ribs and sheet cooperating to provide a drain path to the liner.

Yet other embodiments pertain to any of the previous statements X1, X2, X3, X4, X5, X6 or X7, which are combined with one or more of the following other aspects. It is also understood that any of the aforementioned X paragraphs include listings of individual features that can be combined with individual features of other X paragraphs.

Wherein the first flow portion, the second flow portion, and the third flow portion have substantially the same flow area.

Wherein the housing has an internal wall and an internal axis, and the direction of the internal flowpath is from the axis toward the internal wall.

Wherein at least two of the first, second, and third flow portions are concentric, or the third flow portion is outermost from the first or second portions, or the first flow portion is innermost of the second or third portions.

Wherein the first, second, and third flow portions are concentric, and the second flow portion is between the first portion and the second portion.

Wherein the direction of the internal flowpath is from the liquid inlet toward the foam outlet.

Wherein said growth member includes a wire mesh.

Wherein the wire mesh has a first mesh size, and said structuring member includes a wire mesh having a second mesh size smaller than the first mesh size.

Wherein said mesh comprises a plastic material or a metallic material.

Wherein said structuring member includes an aperture plate, grating, or fibrous matrix.

Wherein said flowing the first foam over a member increases the turbulence of the first foam.

Which further comprises flowing the third foam within a chamber having an inlet and an outlet, the chamber being adapted and configured to decrease the turbulence of the third foam.

Wherein the chamber is adapted and configured to provide more laminar flow of the third foam between the inlet and the outlet.

Wherein said mixing includes flowing the liquid in a first direction and injecting the gas in a second direction that has a velocity component at least partly opposite to the first direction.

Wherein said flowing the second foam is at a velocity, and which further comprises flowing the third foam at substantially the same velocity onto an object and cleaning the object.

Wherein said nozzle is adapted and configured to provide the stream of foam to a bleed air duct of a jet engine.

Wherein said nozzle is adapted and configured to provide the stream of foam to a manifold of tubing mounted to a jet engine.

Wherein the stream has a substantially constant diameter.

Wherein the nozzle has a first flow area, the conduit has a second flow area, and the first flow area is about the same as the second flow area.

Wherein the foam outlet has a first flow area, the conduit has a second flow area, and the first flow area is about the same as the second flow area.

Wherein the nozzle is one or more nozzles having a total flow area, the foam outlet has an outlet area, and the outlet area is about the same as the total flow area.

Wherein said nucleation device includes an air-pressurized plenum having a plurality of airflow apertures and located within a chamber provided with a flow of the liquid, the apertures expelling air into the flowing liquid to create the foam.

Wherein the air received by said nucleation device has a pressure more than about ten psig and less than about one hundred and twenty psig, and the liquid received by said nucleation device has a pressure more than about ten psig and less than about one hundred and twenty psig.

Wherein the streamed supply is at a velocity greater than about three feet per second and less than about fifteen feet per second.

Wherein the streamed supply is a unitary stream of substantially constant diameter.

Wherein said providing includes a cell growth chamber downstream of the mixing chamber and which further comprises growing the size of the foam cells after said mixing and before said streaming.

Wherein said providing includes a turbulence-reducing chamber downstream of the mixing chamber and which further comprises reducing the turbulence of the mixed foam after said mixing and before said streaming.

Wherein the installed engine is substantially vertical in orientation, and wherein said streaming is into the installed inlet without rotation of the engine.

Wherein said growing means includes a growing mesh, said reducing means includes a reducing mesh, and the mesh size of the reducing mesh is smaller than the mesh size of the growing mesh.

Wherein said growing means is adapted and configured to provide surface area for attachment and merging of cells of the foam from said mixing means.

Wherein said growing means includes a plurality of first passageways, and said reducing means is adapted and configured to reduce the size of at least some of the grown cells by passing the grown cells through a plurality of second passageways smaller than the first passageways.

Wherein said mixing means is the injection of the gas from within a tube into flowing liquid.

Wherein said mixing means is by providing the pressurized gas into flowing liquid through a porous metal filter.

Wherein said mixing means includes a motorized rotating impeller.

Wherein said mixing means imparts swirl into the flowing liquid by injection of the gas.

Wherein said growing means is a vibrating rod, or is an ultrasonic transducer.

Which further comprises providing the measured performance of the specific engine to the owner of the engine, and said determining is by the engine owner.

Wherein the operational parameter is the start time.

Wherein the operational parameter is the specific fuel consumption of the engine.

Wherein the operational parameter is the carbon or oxides of nitrogen emitted by the engine.

Wherein said measuring is during commercial passenger operation.

Which further comprises a vertical support attached at one end to the trailer and at the other end to one of said first ribs, wherein said vertical support maintains the enclosed flowpath in an upright condition to facilitate gravity-induced drainage from the inlet to the drain.

Which further comprises a vertical support attached at one end to the trailer and at the other end to one of said second ribs, wherein said vertical support maintains the drain path at an upward angle to facilitate gravity-induced flow toward the liner.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

The invention claimed is:

1. A method for foaming a water soluble liquid cleaning agent, comprising:

mixing the water soluble liquid cleaning agent and a pressurized gas to form a first foam;

flowing the first foam over a member and increasing the size of the cells of the first foam to form a second foam; and flowing the second foam through a structure and decreasing the size of the cells of the second foam to form a third foam.

2. The method of claim 1 wherein said flowing the first foam over a member increases the turbulence of the first foam.

3. The method of claim 1 which further comprises flowing the third foam within a chamber having an inlet and an outlet, the chamber being adapted and configured to decrease the turbulence of the third foam.

4. The method of claim 3 wherein the chamber is adapted and configured to provide laminar flow of the third foam between the inlet and the outlet.

5. The method of claim 1 wherein said mixing includes flowing the liquid in a first direction and injecting the gas in a second direction that has a velocity component at least partly opposite to the first direction.

6. The method of claim 1 wherein said flowing the second foam is at a velocity, and which further comprises flowing the third foam at substantially the same velocity onto an object and cleaning the object.

7. The method of claim 1 wherein the cells of the first foam have a first average cell size, the cells of the second foam have a second average cell size, and the second average is greater than the first average.

8. The method of claim 1 wherein the cells of the second foam have a second average cell size, the cells of the third foam have a third average cell size, and the second average is greater than the third average.

9. The method of claim 1 wherein the cells of the first foam have a first range of cell sizes, the cells of the third foam have a third range of cell sizes, and the third range has a reduced range of sizes relative to the first range.

10. The method of claim 1 wherein said member includes a growing mesh, said structure includes a reducing mesh, and the mesh size of the reducing mesh is smaller than the mesh size of the growing mesh.

11. The method of claim 1 wherein said member is adapted and configured to provide surface area on which cells of the first foam attach and merge.

12. The method of claim 1 wherein said member includes a plurality of first passageways, and said structure is adapted and configured to reduce the size of at least some of the cells of the second foam by passing the cells of the second foam through a plurality of second passageways smaller than the first passageways.

13. The method of claim 1 wherein said mixing includes flowing the pressurized gas through a porous metal member and into the liquid cleaning agent.

14. The method of claim 1 which further comprises operating a housing defining an internal flowpath, the flowpath having first, second, and third flow portions arranged sequentially, said housing having a gas inlet, a liquid inlet for the water soluble cleaning agent, and a foam outlet, the housing having an internal wall and an internal axis, the direction of the internal flowpath being from the axis toward the internal wall, and said mixing occurring in the first flow portion.

15. The method of claim 14 wherein said flowing the first foam occurs in the second flow portion, said flowing the second foam occurs in the third flow portion, and at least two of the first, second, and third flow portions are concentric.

16. The method of claim 15 wherein the third flow portion is outermost from the first or second portions.

17. The method of claim 15 wherein the first flow portion is innermost of the second or third portions.

18. The method of claim 15 wherein the first, second, and third flow portions are concentric, and the second flow portion is between the first portion and the second portion.

* * * * *